United States Patent
Koenig

(10) Patent No.: US 11,889,004 B2
(45) Date of Patent: Jan. 30, 2024

(54) PUF-FILM AND METHOD FOR PRODUCING THE SAME

(71) Applicant: Fraunhofer-Gesellschaft zur Foerderung der angewandten Forschung e.V., Munich (DE)

(72) Inventor: Martin Koenig, Munich (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 0 days.

(21) Appl. No.: 17/816,315

(22) Filed: Jul. 29, 2022

(65) Prior Publication Data
US 2022/0384368 A1 Dec. 1, 2022

Related U.S. Application Data

(62) Division of application No. 16/375,081, filed on Apr. 4, 2019, now Pat. No. 11,411,748.

(30) Foreign Application Priority Data

Apr. 6, 2018 (EP) ..................................... 18166138

(51) Int. Cl.
*H04L 9/32* (2006.01)
*G06F 21/72* (2013.01)
(Continued)

(52) U.S. Cl.
CPC ............ *H04L 9/3278* (2013.01); *G06F 21/72* (2013.01); *G06F 21/75* (2013.01); *G06F 21/86* (2013.01);
(Continued)

(58) Field of Classification Search
CPC ... H04L 9/3278; H04L 9/0861; H04L 9/0866; H04L 2209/12; G06F 21/72; G06F 21/75;
(Continued)

(56) References Cited

U.S. PATENT DOCUMENTS

| 3,594,770 A | 7/1971 | Ham et al. |
|---|---|---|
| 4,743,275 A | 5/1988 | Flanagan |

(Continued)

FOREIGN PATENT DOCUMENTS

| DE | 102013108017 A1 | 1/2014 |
|---|---|---|
| EP | 0509567 A2 | 10/1992 |

(Continued)

OTHER PUBLICATIONS

"LTC6252 / LTC6253 / LTC6254", Linear Technology Corporation, 2012, 2012.

(Continued)

*Primary Examiner* — Timor Karimy
(74) *Attorney, Agent, or Firm* — Perkins Coie LLP; Michael A. Glenn

(57) ABSTRACT

A method for producing a PUF-film includes printing a layer of dielectric material on a film substrate, such that a variable thickness of the layer is obtained by the printing. The method includes arranging a structured electrode layer on the dielectric material such that the structured electrode layer is influenced with respect to an electric measurement value due to the variable thickness.

14 Claims, 37 Drawing Sheets

(51) Int. Cl.
| | |
|---|---|
| *H04L 9/08* | (2006.01) |
| *H01L 23/00* | (2006.01) |
| *H01L 21/00* | (2006.01) |
| *G06F 21/75* | (2013.01) |
| *G06F 21/86* | (2013.01) |
| *H01L 49/02* | (2006.01) |

(52) U.S. Cl.
CPC .............. *H01L 21/00* (2013.01); *H01L 23/57* (2013.01); *H01L 23/573* (2013.01); *H01L 28/60* (2013.01); *H04L 9/0861* (2013.01); *H04L 9/0866* (2013.01); *H04L 2209/12* (2013.01)

(58) Field of Classification Search
CPC ......... G06F 21/86; H01L 21/00; H01L 23/57; H01L 23/573; H01L 28/60
See application file for complete search history.

(56) References Cited

U.S. PATENT DOCUMENTS

| | | | |
|---|---|---|---|
| 4,972,175 | A | 11/1990 | Macpherson |
| 5,448,111 | A * | 9/1995 | Ohkura ............. H01L 21/76819 257/E21.243 |
| 5,539,379 | A | 7/1996 | Macpherson |
| 5,858,500 | A | 1/1999 | Macpherson |
| 6,512,454 | B2 | 1/2003 | Miglioli et al. |
| 6,895,509 | B1 | 5/2005 | Clark |
| 6,929,900 | B2 | 8/2005 | Farquhar et al. |
| 6,957,345 | B2 | 10/2005 | Cesana et al. |
| 7,005,733 | B2 | 2/2006 | Koemmerling et al. |
| 7,947,911 | B1 | 5/2011 | Pham et al. |
| 8,525,169 | B1 | 9/2013 | Edelstein et al. |
| 9,501,664 | B1 | 11/2016 | Hamlet |
| 10,056,905 | B1 | 8/2018 | Bowers et al. |
| 10,706,177 | B2 | 7/2020 | Watanabe et al. |
| 2001/0033012 | A1 | 10/2001 | Koemmerling et al. |
| 2003/0005193 | A1 | 1/2003 | Seroussi et al. |
| 2006/0038257 | A1 | 2/2006 | Anzai |
| 2006/0104042 | A1 | 5/2006 | Hsu |
| 2006/0231633 | A1 | 10/2006 | Farooq et al. |
| 2007/0029384 | A1 | 2/2007 | Atherton |
| 2011/0050620 | A1 | 3/2011 | Hristov |
| 2011/0254141 | A1 * | 10/2011 | Roest ....................... G06F 21/73 257/E29.342 |
| 2013/0233608 | A1 | 9/2013 | Feng et al. |
| 2013/0307578 | A1 | 11/2013 | Ostertun et al. |
| 2014/0033331 | A1 | 1/2014 | Salle et al. |
| 2015/0007353 | A1 * | 1/2015 | Franciscus Widdershoven .......... H01L 23/576 726/34 |
| 2015/0199552 | A1 | 7/2015 | Du et al. |
| 2016/0092680 | A1 | 3/2016 | Hennig et al. |
| 2016/0191255 | A1 | 6/2016 | Haensch et al. |
| 2016/0334449 | A1 | 11/2016 | Teper |
| 2017/0206383 | A1 | 7/2017 | Suwald |
| 2018/0025996 | A1 | 1/2018 | Renaudin et al. |
| 2018/0337791 | A1 | 11/2018 | Ammo et al. |
| 2019/0028283 | A1 | 1/2019 | Sharifi et al. |
| 2019/0168445 | A1 * | 6/2019 | Jara Rodelgo ....... H10N 30/077 |
| 2020/0076622 | A1 | 3/2020 | Best |

FOREIGN PATENT DOCUMENTS

| | | | |
|---|---|---|---|
| EP | 1273997 | A2 | 1/2003 |
| EP | 1804557 | A1 | 7/2007 |
| EP | 2230794 | A2 | 9/2010 |
| EP | 2186036 | B1 | 9/2013 |
| EP | 2819049 | A1 | 12/2014 |
| EP | 17382812 | | 1/2017 |
| FR | 17382812.0 | * | 12/2017 |
| WO | 9711442 | A1 | 3/1997 |
| WO | 2004086202 | A1 | 10/2004 |
| WO | 2005098950 | A1 | 10/2005 |
| WO | 2008063320 | A2 | 5/2008 |
| WO | 2009128946 | A1 | 10/2009 |
| WO | 2010076733 | A1 | 7/2010 |
| WO | 2014154504 | A2 | 10/2014 |
| WO | 2017050911 | A1 | 3/2017 |
| WO | 2017086157 | A1 | 5/2017 |

OTHER PUBLICATIONS

"Payment Card Industry (PCI)—Hardware Security Module (HSM)", Security Requirements Version 1.0 , Apr. 2009.

"THS4551 Low-Noise, Precision, 150-MHz, Fully Differential Amplifier", Texas Instruments, 2017, 2017.

Babu, Harsha Umesh , "Reflective-Physically Unclonable Function based System for Anti-Counterfeiting", , Dec. 10, 2013.

Baxter, Larry K , "Capacitive Sensors", IEEE Press Series , 2000 , pp. 48-49, 54-61, 64-65, 164-169.

Brist, Gary , "Design Optimization of Single-Ended and Differential Impedance PCB Transmission Lines", PCB West Conference Proceedings, 2004.

Cover, Thomas M, et al. , "Elements of Information Theory", 2nd ed. New York: John Wiley & Sons, 2006 , 2006.

Delvaux, Jeroen , et al. , "Helper Data Algorithms for PUF-Based Key Generation: Overview and Analysis", IEEE Transactions on Computer-Aided Design of Integrated Circuits and Systems, 2015.

Eren, Halit , et al. , "Fringe-Effect Capacitive Proximity Sensors for Tamper Proof Enclosures", Sensors for Industry Conference, 2005, , pp. 22-26.

Esbach, Thomas , et al. , "A New Security Architecture for Smartcards Utilizing PUFs", ISSE Conference, 2012.

Gassend, Blaise , et al. , "Silicon Physical Random Functions", in ACM CCS, 2002.

GGB Industries Inc. , "Picoprobe Model 19C".

Goertzel, Gerald , "An Algorithm for the Evaluation of Finite Trigonometric Series", The American Mathematical Monthly, vol. 65, No. 1 , pp. 34-35.

Helfmeier, Clemens , et al. , "Breaking and Entering through the Silicon", ACM Conference on Computer and Communications Security (CCS), 2013.

Herder, Charles , et al. , "Physical Unclonable Functions and Applications: A Tutorial", Proceedings of the IEEE, vol. 102, No. 8, Aug. 2014.

IBM , "IBM 4765 Cryptographic Coprocessor Security Module".

Immler, Vincent , et al. , "B-TREPID: Batteryless Tamper-Resistant Envelope with a PUF and Integrity Detection", IEEE International Symposium on Hardware Oriented Security and Trust (HOST), 2018.

Immler, Vincent , et al. , "Practical Aspects of Quantization and Tamper-Sensitivity for Physically Obfuscated Keys", Cryptography and Security in Computing Systems (CS2), 2016.

Immler, Vincent , et al. , "Variable-Length Bit Mapping and Error-Correcting Codes for Higher-Order Alphabet PUFs", Security, Privacy, and Applied Cryptography Engineering (SPACE), 2017.

Isaacs, Phil , et al. , "Tamper Proof, Tamper Evident Encryption Technology", SMTA, 2013.

Konigsmark, S.T. Choden, et al., "CNPUF: A Carbon Nanotube-based Physically Unclonable Function for Secure Low-Energy Hardware Design", IEEE Conference Proceedings.

Maes, Roel, et al., "A Discussion on the Properties of Physically Unclonable Functions"Trust, 2010.

Merli, Dominik, et al., "Semi-invasive EM Attack on FPGA RO PUFS and Countermeasures" , Proceedings of the Workshop on Embedded Systems Security, ACM, 2011 , p. 2.

Obermaier, Johannes, et al., "A Measurement System for Capacitive PUF-Based Security Enclosures", 55th ACM/EDAC/IEEE Design Automation Conference (DAC), Jun. 2018.

Samyde, David , et al. , "On a New Way to Read Data from Memory", in Proceedings of the First International IEEE Security in Storage Workshop, 2002.

(56) References Cited

OTHER PUBLICATIONS

Skorobogatov, Sergei P, "Semi-invasive attacks—A new approach to hardware security analysis", Tech. Rep. UCAM-CL-TR-630, Apr. 2005, Jun. 2005.

Spain, Merrielle, et al., "Robust Keys from Physical Unclonable Functions", IEEE International Symposium on Hardware-Oriented Security and Trust (HOST), 2014, pp. 88-92.

Tuyls, Pim, et al., "Read-Proof Hardware from Protective Coatings", International Workshop on Cryptographic Hardware and Embedded Systems, Springer, 2006, vol. 4249, pp. 369-383.

Vai, Michael, et al., "Secure Architecture for Embedded Systems", IEEE High Performance Extreme Computing Conference (HPEC), 2015.

Wei, Lingxiao, et al., "BoardPUF: Physical Unclonable Functions for Printed Circuit Board Authentication", IEEE/ACM International Conference on Computer-Aided Design (ICCAD), 2015, pp. 152-158.

Weingart, Steve H, "Physical Security Devices for Computer Subsystems: A Survey of Attacks and Defenses", CHES, 2000.

\* cited by examiner

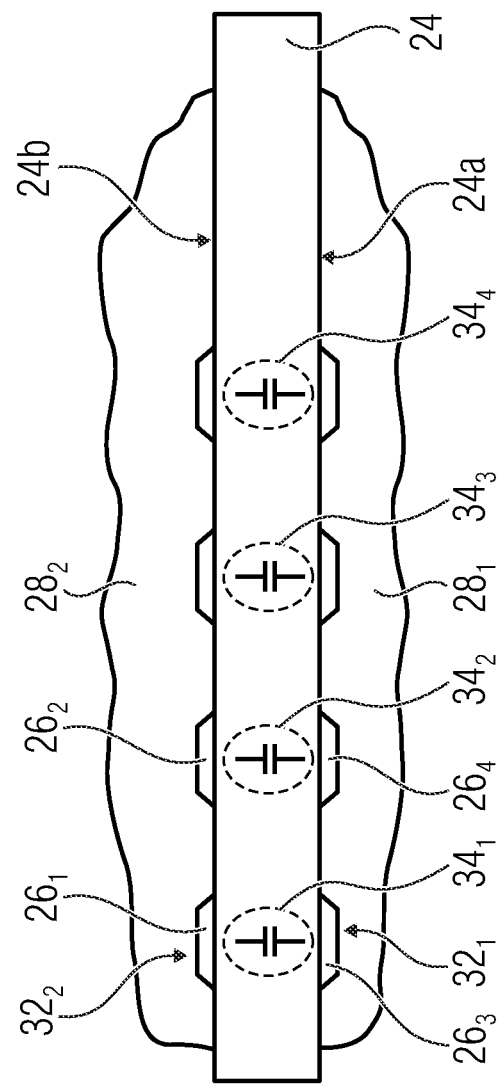

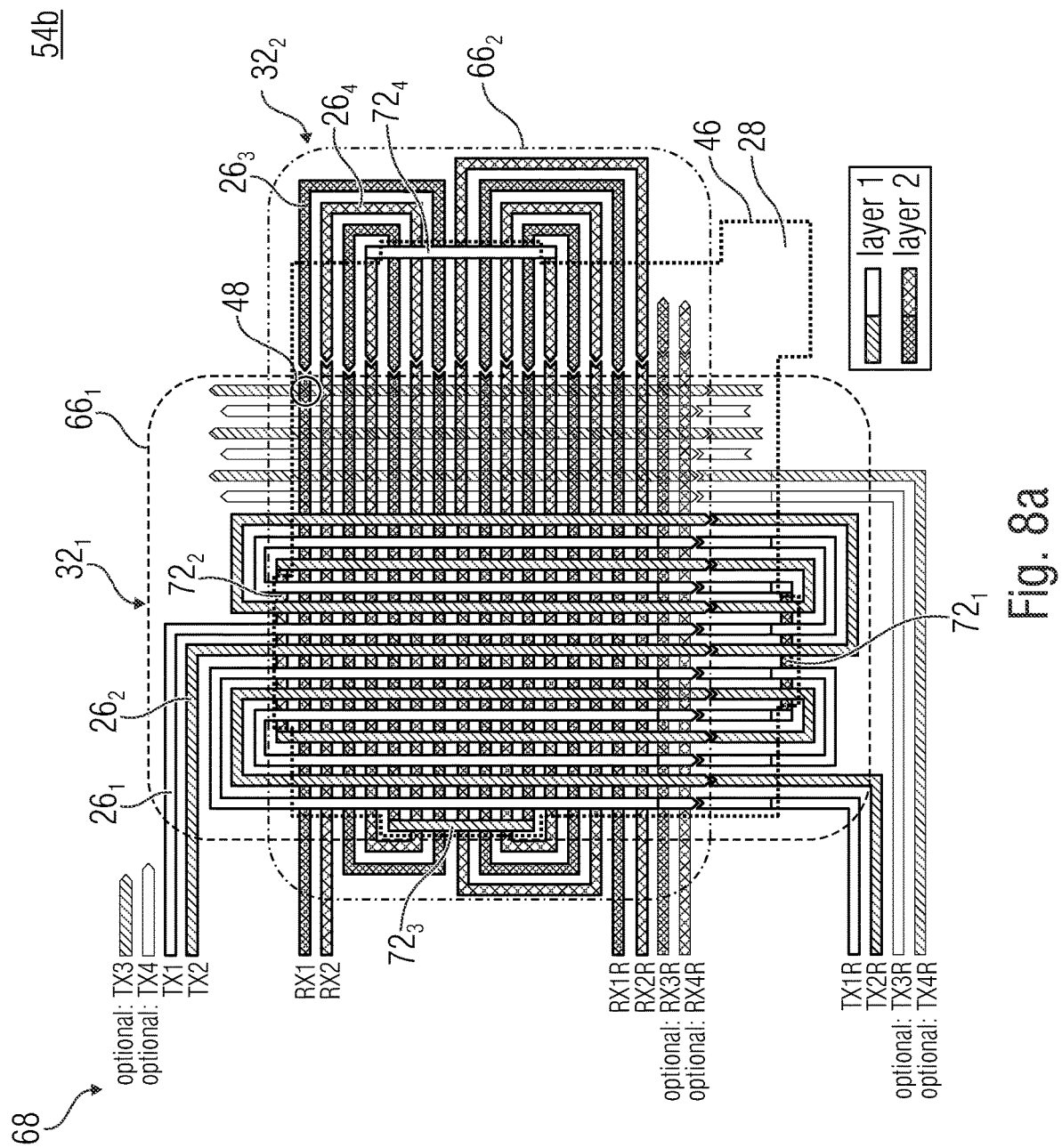

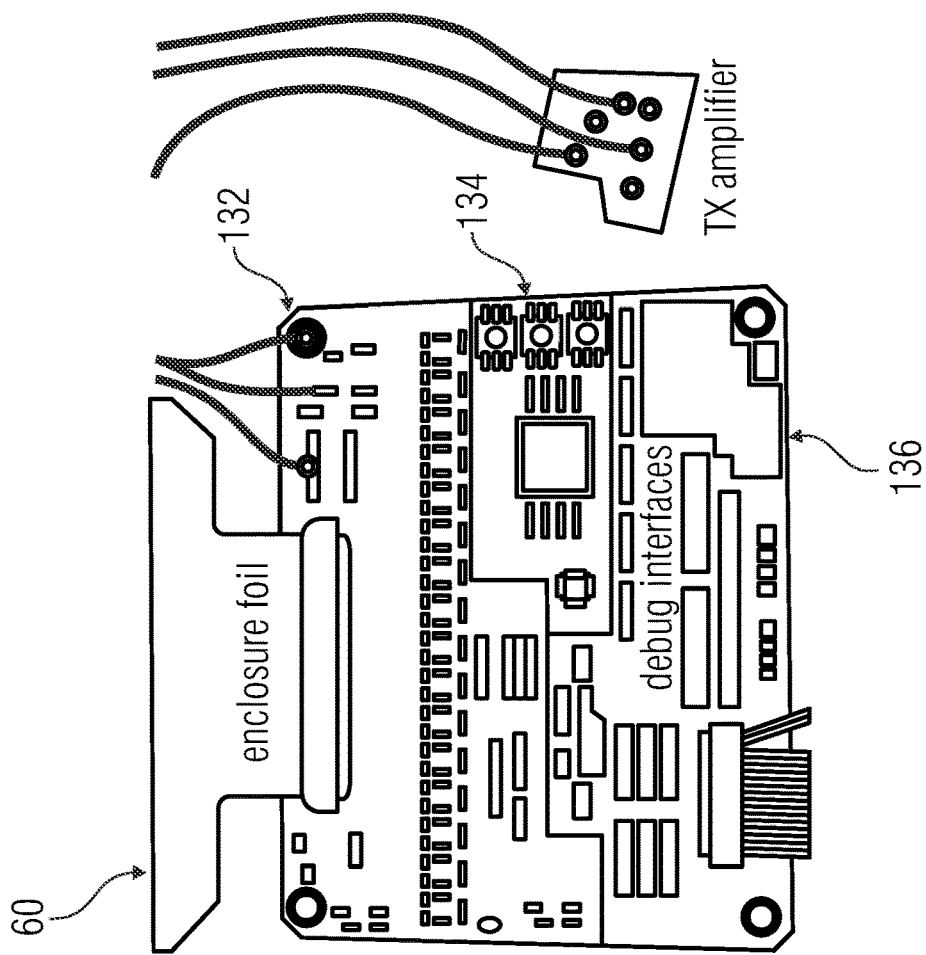
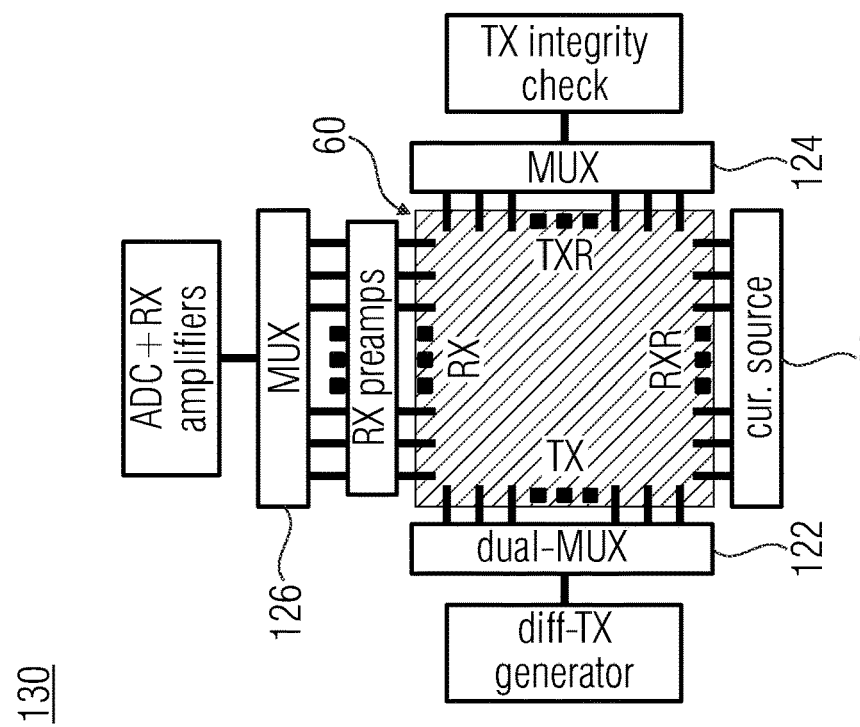
Fig. 13b
Fig. 13a

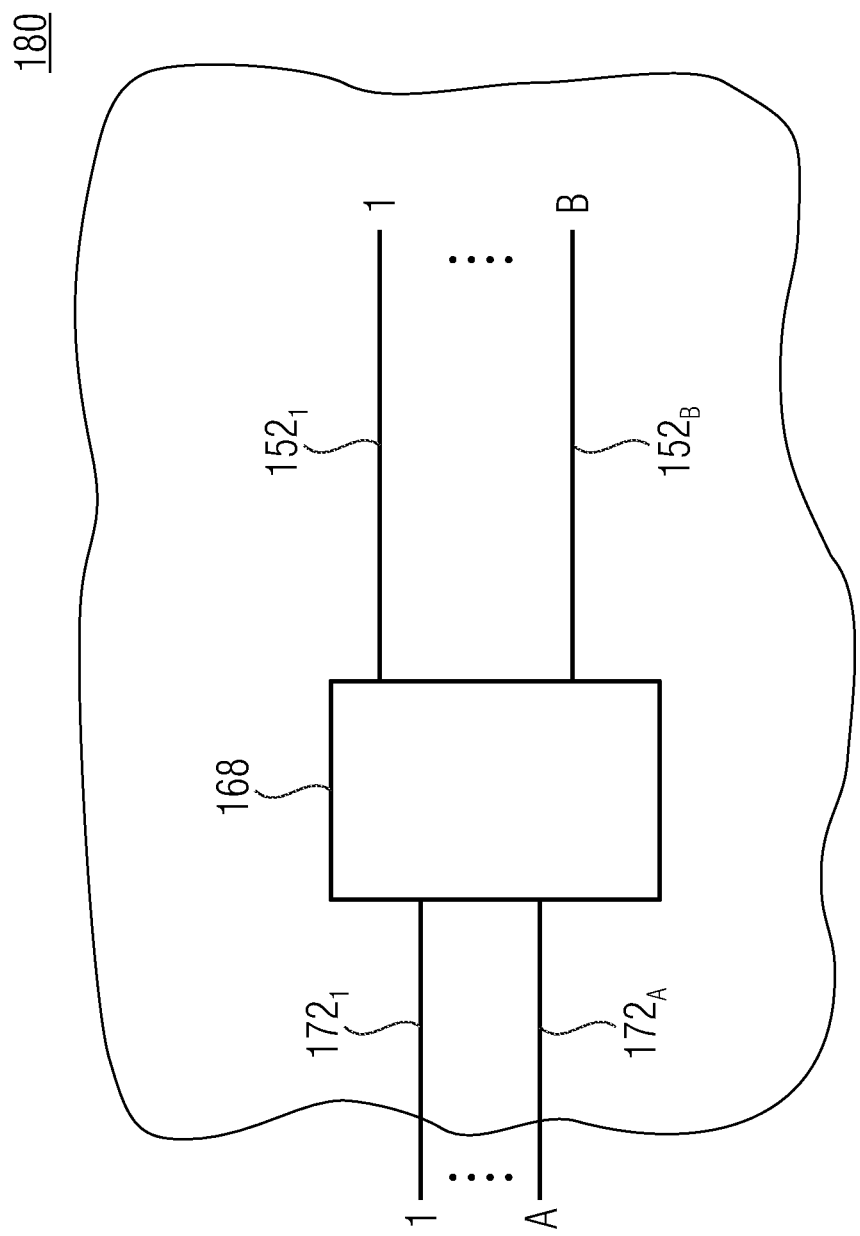

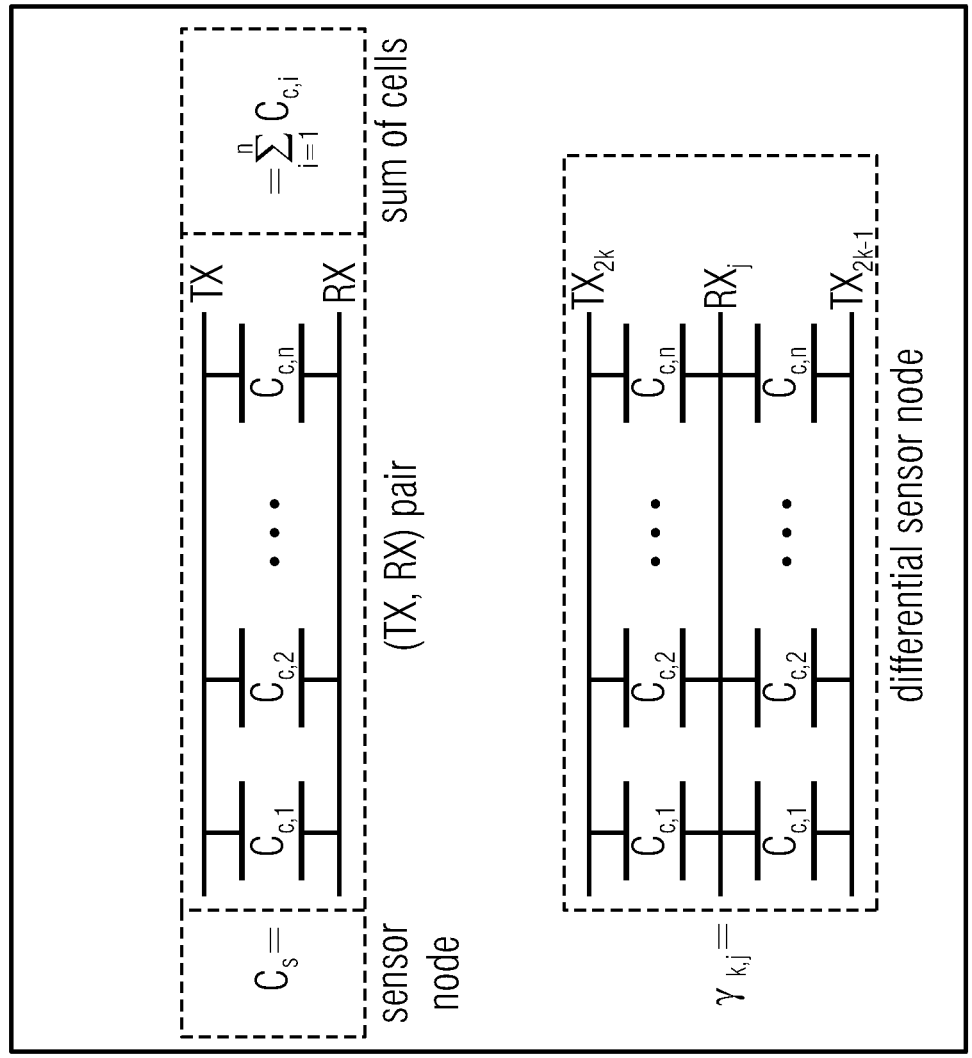

PUF-FILM AND METHOD FOR PRODUCING THE SAME

CROSS-REFERENCE TO RELATED APPLICATIONS

This application is a divisional of U.S. patent application Ser. No. 16/375,081, filed Apr. 4, 2019, which claims priority from European Patent Application No. 18166138.0, filed Apr. 6, 2018, which are incorporated by reference herein in their entirety.

The present invention relates to PUF-films and to a method for producing the same. The present invention further relates to a method for producing a capacitive foil array using a dielectric layer effecting a capacitive variation and, at the same time, enables a via-free foil architecture. The present invention further relates to a circuit concept for monitoring a protective housing on a basis of a capacitive PUF-structure with a further possibility for integrity checks. The present invention further relates to a concept for a protective housing on a basis of a capacitive PUF-structure with a possibility for integrity checks including an optional embedding of a security sensor and layout randomization. Security enclosures that are permanently monitored for penetration and tampering are common solutions for providing physical integrity to multiple-chip embedded systems. While known concepts employ battery-backed key-storage and continuous sensing, recent battery-less technologies use enclosures evaluated as Physical Unclonable Functions (PUF).

BACKGROUND OF THE INVENTION

Locally stored sensitive information in devices such as VPN (virtual private network) end points or in payment systems has to be well-protected against unauthorized access. In critical applications, the development of physically secured systems is enforced by standards, such as PCI-HSM [1]. Hardware Security Modules (HSMs) can provide this level of security, as the embedded device is fully covered by a physical security enclosure. Security enclosures can be classified into two major types: enclosures are either based on trace resistance monitoring [2] or alternatively on PUFs [3], [4]. The first system verifies the integrity of the enclosure by detecting open and short circuits. This may also be referred to as tamper-sensitive. As a drawback, the battery-backed system is in operation at all times (i.e., during storage and transport). In contrast, tamper-evident PUF-based enclosures provide inherent security without a battery. These battery-less technologies are based on the repeatable generation of a system-individual cryptographic key from the enclosure's unique physical properties. The key encrypts either the critical security parameters or the entire system. As any intrusion destroys parts of the enclosure, the cryptographic key is permanently lost and the HSM's data cannot be decrypted by the adversary after intrusion. The resistance-based Gore-envelope [2] system is one example for an integrity-only solution. It verifies the enclosure's integrity but does not provide PUF readout. Since its integrity verification method is based on a Wheatstone bridge, it can hardly be integrated into a PUF measurement system as both methods would interfere with each other. Another tamper detection system is the fringe-effect proximity sensor enclosure [3]. Despite employing capacitive sensing for detecting intruding objects, it cannot extract capacitive PUF properties. Several other solutions exist which perform capacitive sensing to measure PUF responses. One example is the Coating-PUF [4] that protects a single-chip system using capacitive sensors integrated into the coated silicon chip. Despite that this circuit concept can extract PUF properties, it is not compatible with a large-scale enclosure and also does not support integrity verification. Similar issues are observed for the BoardPUF [5] which uses a capacitive PUF, implemented in the printed circuit board (PCB) but has no means for integrity verification.

Resistance-based concepts need a conductor to be damaged so as to detect an attack.

Furthermore, protecting embedded devices against physical attacks is a challenging task since the attacker has control of the device in a hostile environment. To address this issue, current countermeasures typically use the named battery-backed tamper-respondent envelope enclosing the entire device to create a trusted compartment. However, the battery affects the system's robustness and weight and also leads to difficulties with the security mechanism while shipping the device.

When referring again to secure communication and data storage for banking or governmental purposes, such secure communication relies on electronic systems that guarantee the integrity and confidentiality of the data. This is enforced by security standards such as FIPS 140-2, PCI-HSM or certain protection profiles of Common Criteria (CC). Compliant devices are needed to implement physical security countermeasures to prevent unauthorized access to Critical Security Parameters (CSPs), such as cryptographic keys. Hence, they have to withstand a wide range of invasive, semi-invasive, and non-invasive attacks to make successful attacks improbable [6], [7]. While single-chip devices such as smartcards can be protected in silicon, multiple-chip embedded systems on Printed Circuit Boards (PCBs) can only be secured with an additional physical security boundary that separates the secure and insecure domains of a system. These boundaries can be created from security covers, housings, envelopes, etc., to protect the device against physical attacks, such as drilling, grinding, etching or probing [2], [3].

The current approach is based on an envelope with a mesh that wraps around the Module Under Protection (MUP) [2]. Attempts to penetrate the mesh are very likely to destroy its tracks and result in open circuits. A continuous measurement from inside the system detects these open circuits and triggers an alarm that causes the zeroization of CSPs (i.e., tamper-detection and response). However, a battery is needed for its monitoring mechanism whenever the supplementing carrier system is powered off. Additionally, the CSPs are stored in a volatile Battery-Backed Random-Access Memory (BBRAM) to enable instantaneous zeroization. This approach has significant practical drawbacks: adding a battery to the system increases bulk and weight, it lowers its robustness with regard to the operating temperature range, and prohibits prolonged storage. When the battery is fully discharged, the CSPs are lost and physical integrity can no longer be guaranteed [8]. Moreover, storing CSPs in a BBRAM leaves room for the zeroization circuit to fail. However, storing a key in a non-volatile memory is also not an option, as its contents can be extracted while the system is powered off [9]. Alternatively, Physical Unclonable Functions (PUFs) can be used [10]. Once the device is running, this security primitive derives a cryptographic key from the device (as inherent manufacturing variations). As long as the device is powered off, extracting these parameter is supposedly difficult.

Since most PUFs are implemented in Integrated Circuits (IC), it is impossible to use them for aftermarket protection of Commercial-Off-The-Shelf (COTS) components. Furthermore, silicon based PUFs typically do not have the property of tamper-evidence [11]. I.e., once powered on, they cannot verify if an attack was executed on the system while powered off. Even worse, they are incapable of detecting online attacks that extract values during runtime [12].

Thus, there is a need for robust and reliable device protection.

SUMMARY

According to an embodiment, a method for producing a PUF-film may have the steps of: printing a layer of dielectric material on a film substrate, such that a variable thickness of the layer is obtained by the printing; and arranging a structured electrode layer on the dielectric material; such that the structured electrode layer is influenced with respect to an electric measurement value due to the variable thickness.

Another embodiment may have a PUF-film having a layer stack, the layer stack having a film substrate, a printed dielectric layer having a varying layer thickness in the dielectric material and a structured electrode layer being arranged at the dielectric layer, wherein the structured electrode layer is influenced with respect to an electric measurement value due to the variable thickness.

According to a first aspect, the inventors have found that printing a dielectric material using printing process, a variation in a thickness of the dielectric material may be obtained and that such a variation influences an electric measurement value. Based on the randomness of the variation due to the printing process such an architecture is suitable as PUF-film.

According to an embodiment of the first aspect, a method for producing a PUF-film comprises printing a layer of dielectric material on a film substrate, such that a variable thickness of the layer is obtained by the printing. The method comprises arranging a structured electrode layer on the dielectric material. The method is executed such that the structured electrode layer is influenced with respect to an electric measurement value due to the variable thickness. This allows for generating a PUF by use of a printing process so as to obtain simple and robust PUF-films using reliable processes.

According to an embodiment of the first aspect, the electric measurement value comprises one of an electric capacitance value, an electric impedance value, an electric resistance value and an electric inductance value. The method is thus suitable for single, differential measurement of electrical values or combinations thereof.

According to an embodiment of the first aspect, the printing of the layer of dielectric material is carried out such that a relative position of a surface profile of the dielectric layer with respect to the structured electrode layer underlies a stochastic distribution. This allows for a randomness between different PUF-films being produced by the method.

According to an embodiment of the first aspect, the dielectric material comprises at least one granule material, wherein the granule material comprises a different dielectric constant when compared to the dielectric material. This allows for producing robust and reliable PUF-films as drilling through the PUF-film destroys the granule leading to defects being difficult to be repaired.

According to an embodiment of the first aspect, the structured electrode layer is a first structured electrode layer. A second structured electrode layer is arranged at the film substrate. The dielectric material is printed onto the second structured electrode layer, such that the dielectric material covers the second structured electrode layer in a first region and does not cover the second structured electrode layer in a second region, such that a material edge of the dielectric material extends between the first region and the second region. The first structured electrode layer is arranged in the first region and in the second region such that the first structured electrode layer extends over the material edge and such that the first structured electrode layer is spaced from the second structured electrode layer in the first region by the dielectric material and is galvanically connected to the second structured electrode layer or arranged in a common plane with the second structured electrode layer in the second region. This allows for a simple manufacturing process because drilling of holes and/or generating vias or the like may be avoided for implemented interconnections between layers.

According to an embodiment of the first aspect, the second region is enclosed by the first region or is adjacent to the first region and forms an edge region of the first region. This allows for simple implementation of layouts of the PUF-film.

According to an embodiment of the first aspect, the first structured electrode layer and the second structured electrode layer are arranged such that the first structured electrode layer and the second structured electrode layer are connectable in a common connector layer. For example, by extending over one or more material edges, lines of the structured electrode layers may be arranged in a common plane and/or towards a common connector and therefore simplifying a later connection of the PUF-film.

According to an embodiment of the first aspect, the structured electrode layer is a first structured electrode layer, wherein the film substrate comprises a second structured electrode layer having a plurality of second conductive traces, wherein the dielectric material is printed onto the second structured electrode layer. The first structured electrode layer is arranged such that the first structured electrode layer comprises a plurality of first conductive traces overlapping with the second conductive traces in a plurality of overlapping regions so as to form capacitive elements in the overlapping regions. This allows for reliably generating PUF functionalities such as capacitances by forming them with conductive traces so as to generate a comparable function when compared to dedicated capacitive elements such as capacitors.

According to an embodiment of the first aspect, the printing of the dielectric material is implemented as additive process. Additive processes allow for reliable PUF-films produced therewith because dirt or the like generated by subtractive processes may be avoided.

According to an embodiment of the first aspect, the printing of the dielectric material comprises execution of a silkscreen process, a rotary printing process, an offset printing process, a pad printing process and a spin coating process. Those processes are executable with a high precision and thus allow for PUF-films with a high quality.

According to an embodiment of the first aspect, the dielectric material is a photosensitive material. The method comprises exposing the photosensitive material in an exposure region so as to develop the dielectric material in the exposing region and so as to define a mask of the dielectric material. This allows for precisely defining regions in which the dielectric material is arranged. Photosensitive materials may allow for a higher resolution when compared to printing processes and thus for increasing a precision of structures.

According to an embodiment of the first aspect, the method further comprises arranging an electric shield at the PUF-film, e.g., at the substrate, so as to shield the structured electrode layer. This allows for a precise detection of the electric measurement value.

According to an embodiment of the first aspect, a PUF-film comprises a layer stack, the layer stack having a film substrate, a printed dielectric layer having a varying layer thickness in the dielectric material and a structured electrode layer being arranged at the dielectric layer. The structured electrode layer is influenced with respect to an electric measurement value due to the variable thickness. Such a PUF-film is robust and reliable.

According to an embodiment of the first aspect, the restructured electrode layer is a first structured electrode layer. The film substrate comprises a second structured electrode layer having a plurality of second conductive traces. The dielectric material is printed onto the second structured electrode layer. The first structured electrode layer is arranged such that the first structured electrode layer comprises a plurality of first conductive traces overlapping with the second conductive traces in a plurality of overlapping regions so as to form capacitive elements in the overlapping regions. The electric capacitance values of the capacitive elements varies stochastically based on the variation of the thickness of the dielectric layer due to the printing of the dielectric material. This allows for PUF-films providing for a high security.

According to a second aspect, the inventors have found that by using a circuit structure with a plurality of circuit elements having electric resistance values and having electric capacitance values between the circuit elements, by exploiting both, the electric capacitance values and the electric resistance values, a reliable and robust device protection may be obtained because the capacitance values may be used as PUFs, wherein the electric resistance values may be used for integrity checks, i.e., for determining proper operation of the protecting device itself.

According to an embodiment of the second aspect, a PUF-film comprises a circuit structure having a plurality of circuit elements, wherein the circuit structure is evaluable with respect to a plurality of electric capacitance values being arranged between the plurality of circuit elements. The circuit structure is further evaluable with respect to a plurality of electric resistance values of the plurality of circuit components. Thus, the PUF-film allows for reliable and robust protection.

According to an embodiment of the second aspect, the circuit structure comprises a first multitude of conducting traces being arranged in a first trace layer of the PUF-film, and comprises a second multitude of conducting traces being arranged in a second trace layer of the PUF-film. The first multitude of conducting traces and the second multitude of conducting traces overlaps in a plurality of overlap regions in which first multitude of conductive traces is separated from the second multitude of conductive traces by a dielectric so as to form a corresponding plurality of capacitor structures in the overlap regions, wherein each electric capacitance value of the circuit structure is based on at least a first and a second capacitor structure. I.e., each trace overlaps at least a first and a second time with other traces. The plurality of electric resistance values is arranged between ends of the circuit elements, i.e., the conductive traces. This allows for simple structures to be used, namely the conductive traces, wherein robustness and reliability is obtained by the layout of the conductive traces so as to overlap with each other.

According to an embodiment of the second aspect, the plurality of conducting traces is meandered and covers a first film region. The second plurality of conducting traces is meandered and covers a second film region. The first film region and second film region overlap with each other. This allows for a high density of conductive traces in a sensor region being defined by the overlap of the first film region and the second film region.

According to an embodiment of the second aspect, the plurality of circuit elements comprises a plurality of conductive traces, wherein each conductive trace of the plurality of conductive traces comprises a first section and a second section being spaced from the first section. The first section and the second section are accessible for a measurement of an electric resistance value of the conductive trace between the first section and the second section. Thereby, the conductive traces used for forming the electric capacitance values may be subjected to a dual-use by also evaluating their electric resistance values.

According to an embodiment of the second aspect, the PUF-film has a dielectric material being arranged between the plurality of circuit elements. The dielectric material comprises a granule material which is arranged in a stochastic distribution in the dielectric material so as to influence the plurality of electric capacitance values. This allows for a randomization of capacitance values between different PUF-films and further allows for a high robustness. Invasive attacks such as a drilling attack removes parts of the dielectric material and thus the granule material. Repairing such a damage is hampered because also knowledge about the granule material, i.e., size, density and/or position of a granule or pellet is needed for a proper repair.

According to an embodiment of the second aspect, the PUF-film comprises a layered structure in which a dielectric foil substrate is arranged between a first trace layer and a second trace layer so as to form the plurality of electrical capacitance values in overlapping regions of the first and second trace layer. One or both of the first and second trace layer is at least covered with a printed dielectric material which allows for a high entropy of the architecture.

According to an embodiment of the second aspect, an apparatus comprises a PUF-film and an evaluation unit configured for differentially evaluating the electric capacitance values so as to obtain a first evaluation result. The evaluation unit is further configured for evaluating the plurality of electric resistance values so as to obtain a second evaluation result. This allows for an apparatus configured for monitoring the functionality and/or integrity of the PUF-film.

According to an embodiment of the second aspect, the evaluation unit is configured for evaluating an electric capacitance values of the plurality of electric capacitance values between a first circuit element and a second circuit element of the plurality of circuit elements for differentially evaluating the electric capacitance value of the first and second circuit element. This allows for a concrete information of the condition of the PUF-film as a mutual condition between the circuit elements is monitored.

According to an embodiment of the second aspect, the plurality of circuit elements comprises at least a first conductive trace, a second conductive trace and a third conductive trace, wherein the first conductive trace overlaps with the third conductive trace and wherein the second conductive trace overlaps with the third conductive trace. A first electric capacitance value is present between the first conductive trace and the third conductive trace, in particular, at a region where both conductive traces overlap. A second electric capacitance value is arranged between the second conductive trace and the third conductive trace, in particular, in a region where the traces overlap. The evaluation unit is configured for applying a first excitation signal to the first conductive trace and to simultaneously apply a second excitation signal to the second conductive trace. The evaluation unit is configured for receiving a response signal from the third conductive trace so as to differentially evaluate a first electric capacitance value between the first conductive trace and the third conductive trace and second electric capacitance value between the second conductive trace and the third conductive trace. This allows for a high amount of information because a signal to be applied to one or more specific traces and a trace to be selected for receiving a signal from it may be varied which may lead to different results containing information.

According to an embodiment of the second aspect, the evaluation unit configured for providing the second excitation signal so as to be in antiphase with respect to the first excitation signal. This allows for cancelling out the absolute capacitances between the first and third as well as between the second conductive trace and the third conductive trace to obtain only the difference in their capacitance accurately.

According to an embodiment of the second aspect, the differentially evaluated electric capacitance value is a differential electric capacitance value such as previously mentioned. The first conductive trace and the second conductive trace comprise absolute electric capacitance values with respect to a reference electrode. The differential electric capacitance value is smaller by a factor of at least 100 (i.e., at most 0.01) when compared to the absolute electric capacitance value. The evaluation unit is configured for evaluating changes in the differential electric capacitance value being smaller by a factor of at least 20 when compared to the differential electric capacitance value. This allows for evaluating even minor changes in the PUF-film.

According to an embodiment of the second aspect, the evaluation unit is configured for compensating measurement errors in the first evaluation result and/or in the second evaluation result for an environmental parameter. The compensation may be performed by use of additional information such as temperature and/or by use of absolute values of the capacitance for compensating the differential measurement. This allows for further enhancing the results by avoiding errors due to the environmental parameter and thus allows for a high robustness.

According to an embodiment, the evaluation unit is further configured for evaluating an absolute electric capacitance value between a pair of traces of the circuit structure at a first instance of time and for evaluating the absolute electric capacitance value between the pair of traces at a second instance of time, wherein the evaluation unit is configured for comparing the absolute capacitance value evaluated at the first instance of time and at a second instance of time so as to obtain an absolute capacitance evaluation result and to compensate the first evaluation result for an environmental effect using the absolute capacitance evaluation result.

According to an embodiment of the second aspect, the plurality of circuit elements is a plurality of conductive traces. The evaluation unit is configured for obtaining the second evaluation result based on an evaluation of the electric resistance value of the plurality of conductive traces. This allows for a simple integrity check, in particular in view of open circuits or short circuits between traces.

According to an embodiment of the second aspect, the evaluation unit is configured for determining an attack of the PUF-film based on the first evaluation result and the second evaluation result. By combining both information, a robust determination of the condition of the PUF-film may be obtained.

According to an embodiment of the second aspect, the evaluation unit is configured for determining a first cryptographic key based on the plurality of electric capacitance values at a first instance of time. The evaluation unit is configured for encrypting data for operating the apparatus using the first cryptographic key so as to obtain encrypted data, and for storing the encrypted data. The evaluation unit is configured for deleting the first cryptographic key, e.g., by actively or passively resetting memory cells. The evaluation unit is configured for determining a second cryptographic key based on the plurality of electric capacitance values at a second instance of time and for reading the encrypted data and decrypting the encrypted data using the second cryptographic key. This allows for a battery-less implementation of a PUF-based security module.

According to an embodiment of the second aspect, the evaluation unit is configured for deleting data or for deactivating a function of the device in case of detecting altering of the circuit structure or the PUF-film.

According to an embodiment of the second aspect, the evaluation unit comprises a transimpedance amplifier being configured for providing a voltage signal based on a current signal received from a circuit element. This allows for evaluating a received current whilst maintaining a precision of processing voltage signals.

According to a third aspect of the present invention, the inventors have found that by combining a capacitive measurement of a PUF with an electric shield, reliable measurements may be performed resulting in reliable measurement data which are even robust in harsh environments such as an environment in which the device is exposed to interference such as strong electric fields.

According to an embodiment of the third aspect, a PUF-film comprises a flat circuit structure comprising a plurality of circuit elements. The PUF-film comprises a flat electric shield, wherein the circuit structure is evaluable with respect to a plurality of electric capacitance values being arranged between the plurality of circuit elements. The electric shield at least partially covers the circuit structure and provides a common reference electrode for the plurality of electric capacitance values.

The electric shield may act as an electrode and may thus influence the capacitance of capacitive elements, wherein said influence may be common for all of the shielded capacitive elements. This allows for robust measurements.

According to an embodiment of the third aspect, the electric shield is formed by a metallic mesh or a sprayed conductive layer. This allows for shielding topographic devices having edges or the like. Alternatively or in addition, this allows for bending or wrapping the PUF-film around a housing whilst obtaining or maintaining the shielding effect.

According to an embodiment of the third aspect, the circuit elements are covered at least partially with an at least partially opaque material being adapted in view of a transmission or absorption in a visible wavelength range and/or in an x-ray wavelength range. The material may be opaque but may also comprise a within a tolerance range of 10% a same absorption coefficient when compared to the conductive traces at least in the relevant optical regions such as X-ray or optical wavelength. This allows for further protection as avoiding an inspection by sight, i.e., by optically analyzing circuit structures or the like. As such an opaque material may optionally be non-conductive, such a material may be combined with a shield being formed by a metallic mesh or being a sprayed conductive layer such that such a material may be covered with the electric shield although being non-conductive or semi-conductive. Alternatively, a conductive material may be used, for example, a silver paste or the like. Silver paste may allow for an opaqueness but may be formed conductive based on the degree of filling of the silver in the paste. Alternatively, the opaque material may comprise PEDOT/PSS, inks comprising carbon nanotubes or the like as well as thin metal layers.

According to an embodiment of the third aspect, the plurality of circuit elements comprises a multitude of conductive traces, wherein the PUF-film is evaluable with respect to an electric capacitance value between a first conductive trace and a second conductive trace. The PUF-film comprises a capacitive element being galvanically connected to the first conductive trace and the second conductive trace, wherein both ends of each trace are accessible by the evaluation unit. This allows for a reliable determination of an integrity of the circuit structure as an interruption of a conductive trace may thus lead to a varying resistance within the trace but also to a varying capacitance value detectable in different traces.

According to an embodiment of the third aspect, the PUF-film comprises a layer stack in which a first electric shield layer, a first substrate layer, a first trace layer comprising a first part of the plurality of circuit elements, a first dielectric layer, a second trace layer comprising a second part of the plurality of circuit elements, a second dielectric layer and a second shield layer are arranged in this order. Thus, the circuit elements may be sandwiched between two shield layers providing for the electric shield such that a shielded PUF-film may be obtained.

According to an embodiment of the third aspect, the first dielectric layer and/or the second dielectric layer comprises a granule material being arranged in a stochastic distribution so as to influence the plurality of electric capacitance values. The granule material allows for a high degree of protection because of hampering repairing the PUF-film.

According to an embodiment of the third aspect, the first dielectric layer partially covers the first trace layer such that the conductive traces of the first trace layer are uncovered from the first dielectric layer in a contact region. Conductive traces of the second trace layer extend beyond an edge of the dielectric layer into the contact region and are arranged in a layer of the conductive traces of the first trace layer in the contact region. Thereby, the traces of the first trace layer are led over the edge of the dielectric layer into a different layer whilst avoiding an implementation of vias.

According to an embodiment of the third aspect, the plurality of circuit elements comprises a plurality of conductive traces, wherein first conductive traces of the plurality of conductive traces are arranged in a first trace layer and wherein second conductive traces of the plurality of conductive traces are present in a second trace layer. An electric capacitance value is at least partially arranged in an overlap area in which one of the first conductive traces overlaps with one of the second conductive traces. This allows for generating capacitive structures using conductive traces which may be arranged or generated in a simple manner.

According to an embodiment of the third aspect, the plurality of circuit elements comprises a plurality of conductive traces being arranged in at least a first trace layer and a second trace layer, wherein conductive traces arranged in the first layer and conductive traces arranged in the second layer are arranged in an interleaved manner such that a conductive trace is exclusively neighbored by a different conductive trace along an axial course of the trace. This allows for obtaining a reliable and robust structure in which a short circuit between different sections of a same trace is avoided as the trace is exclusively neighbored by different conductive traces.

According to an embodiment of the third aspect, the plurality of circuit elements comprises a first plurality of conductive traces arranged in a first trace layer and a second plurality of conductive traces arranged in a second layer. The PUF-film comprises an interconnecting circuit being configured for providing a configurable, e.g., a factory-configurable connection within the first plurality of conductive traces and/or within the second plurality of conductive traces. This allows for utilizing a high number of conductive traces by a low number of control interfaces, i.e., traces to be controlled by a controlling unit.

According to an embodiment of the third aspect, the plurality of circuit elements is evaluable with respect to a plurality of electric capacitance values and a plurality of electric resistance values. This allows for a further increase of robustness and reliability.

According to an embodiment of the third aspect, an apparatus comprises a PUF-film and an evaluation unit configured for differentially evaluating the plurality of electric capacitance values based on an antiphasic excitation of neighbored circuit elements. The antiphasic excitation of neighbored circuit elements allows for a compensation of absolute capacitive effects.

According to an embodiment of the third aspect, the evaluation unit is configured for antiphasically exciting a first circuit element and a second circuit element of the plurality of circuit elements at an instance of time and for not exciting a third, i.e., da different circuit element of the plurality of circuit elements at the instance of time. By selectably exciting only subsets of circuit elements, a single isolated measurement result of the selected node is obtained while other nodes are ignored.

According to an embodiment of the third aspect, the apparatus comprises a housing. The PUF-film comprises a sensor region being formed by an overlap region of first circuit elements in a first trace layer and second circuit elements in a second trace layer. The housing is completely covered by the sensor region. This allows for a high security of the apparatus. According to an embodiment of the third aspect, the PUF-film comprises a carbon material at least partially covering the circuit elements, wherein the PUF-film is covered with an electric shield comprising a metallic mesh or a sprayed conductive layer. The carbon material may comprise a same or within a tolerance range of 10% same absorption coefficient when compared to the conductive traces and/or the shield at least in the relevant optical regions such as X-ray and/or visible wavelength. This allows for hampering diversification of structures because the traces become hardly or impossibly distinguishable from the carbon material such that the traces may become invisible. The carbon material may optionally allow for at least a degree of opaqueness in the visible wavelength range and the x-ray wavelength range. The low conductive property may be at least partially compensated with the electric shield so as to maintain the preciseness of the measurements.

BRIEF DESCRIPTION OF THE DRAWINGS

Embodiments of the present invention will be detailed subsequently referring to the appended drawings, in which:

FIG. 6b shows a schematic side view of a PUF-film according to an embodiment of the second aspect according to which the structured electrode layers are separated by a film substrate;

FIG. 8a shows a schematic top view of a further circuit structure according to an embodiment of the second aspect;

FIG. 8b shows a schematic block diagram of an equivalent circuit of the circuit structure of FIG. 8a;

FIG. 9 shows a schematic top view of a further circuit structure according to an embodiment of the second aspect, comprising a comparatively larger sensoric region when compared with the concept according to FIG. 8a;

FIG. 13a shows a schematic block diagram of an apparatus according to an embodiment of the second aspect, in which multiplexors, e.g., analog multiplexors may be included;

FIG. 13b shows a schematic photography of an experimental setup, of the apparatus of FIG. 13a;

FIG. 18 shows a schematic top view on a PUF-film according to an embodiment of the third aspect, comprising a number of circuit elements arranged in the PUF-film;

FIG. 23a a schematic block diagram of a sensor node according to an embodiment of the third aspect;

FIG. 23b a schematic block diagram of a differential sensor node according to an embodiment of the third aspect;

FIG. 27b shows a graph of changed symbols in the example of FIG. 27a;

DETAILED DESCRIPTION OF THE INVENTION

Figure 1:
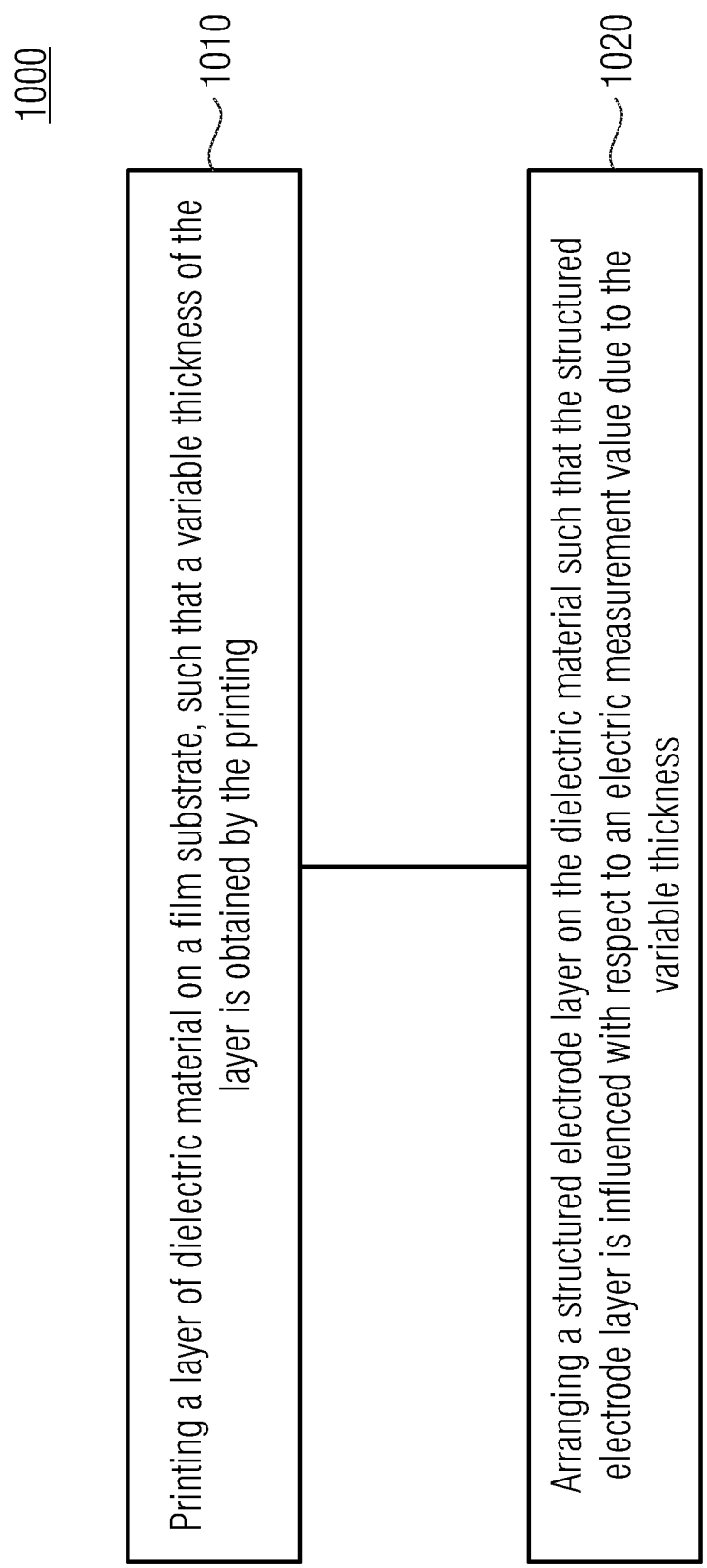
FIG. 1 shows a schematic flowchart of a method according to an embodiment of the first aspect.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

In the following, reference is made to Physically Unclonable Functions (PUFs). In connection with the embodiments described hereinafter, PUFs are understood as electrically evaluable parameters such as resistances, complex impedances, capacitances, inductances and/or impedances being suitable, as a single parameter or as a combination of parameters, e.g., as a pattern, for identifying the device carrying the PUFs and/or for evaluating, monitoring/surveying the intactness or integrity of the device.

Some of the embodiments described hereinafter relate to PUF-films. A PUF-film may also be understood as PUF-foil, i.e., as a comparatively thin structure along a thickness direction (z) when compared to dimensions of the structure along other possibly lateral or axial directions such as a length and/or a width, simply directions x and y. Although some of the embodiments described hereinafter are configured and/or suitable for being bended or folded, the embodiments described herein are not limited hereto. In particular, the term PUF-film does not necessarily imply that the film is repeatedly foldable or bendable. For example, a PUF-film may comprise a metallic substrate and/or a semiconductor substrate having a high stiffness and/or not being configured to be bendable. Thus, embodiments also refer to PUF-films being rigid structures.

FIG. 1 shows a schematic flowchart of a method 1000 according to an embodiment of the first aspect. Method 1000 comprises a step 1010 in which a layer of dielectric material is printed on a film substrate such that a variable thickness of the layer is obtained by the printing. The film substrate may comprise one or more layers of insulating or dielectric material such as a plastic material, a glass material or the like. The film substrate may be understood as a substrate for receiving the dielectric material. It is thus possible but not mandatory that the film substrate exclusively comprises insulating materials. For example, the film substrate may comprise conductive materials and/or structures such as circuit structures, e.g., conductive traces and/or circuit elements. Alternatively or in addition, such structures may be arranged on or at the film substrate prior to printing the layer of dielectric material in the step 1010. Alternatively or additionally, the film substrate may exclusively comprise insulating materials.

The printing 1010 may be implemented as an additive process in which materials are added onto the film substrate. Although it is also possible to use subtractive processes comprising depositing the dielectric material and then removing parts of the material, e.g., using laser oblation, additive processes provide for the advantage that contaminations caused by subtractive processes may be avoided. The printing 1010 may be performed, for example, by a silkscreen process, a rotary printing process, an offset printing process, a pad printing process and/or a spin coating process. In the following, reference will be made to implementation of a silkscreen process which is suitable for implementing the method 1000 as a real-to-real process allowing for a high productivity and a high repeatability. The step 1010 may be combined with a photolithographic process in which the printed dielectric material may be exposed to an exposing radiation such as ultraviolet radiation so as to define regions of the dielectric material to be removed and/or retained. The photolithographic process may allow for obtaining a higher resolution when compared to a resolution of the process for generating/printing the dielectric layer.

The printing 1010 may be combined with further processes. For example, a further variation in the thickness of the dielectric layer and thus of the respective electric property may be obtained by subtractive processes such as laser ablation. This does not involve reducing a thickness of the complete layer. As an alternative solution, for example, lines or patterns, e.g., checkerboard-patterns or the like may be generated in the dielectric layer 28 so as to enable a variation of the layer thickness in some regions so as to amplify the variation of the capacitance value. Further, as a dielectric material, so-called block-copolymer materials may be used. Such materials may comprise two faces which continue to exist after drying or curing. Although a dielectric constant of the material may vary between both faces, such variation may vary across all of the capacitance values and therefore allow for maintaining same relative or differential values.

The dielectric material may be printed, for example, as a paste or a fluid having a high viscosity. The dielectric material may comprise particles, for example, ceramic particles which may be varied with respect to their size and/or a degree of filling they provide in the dielectric material. For example, for obtaining different thicknesses of the dielectric material on the film substrate, different viscosities and/or different degrees of filling and/or different sizes of the ceramic particles may be used.

Different parameters of the printing process implemented in the step 1010 may be used for obtaining the variable thickness of the layer. For example, the particles contained in the dielectric material may provide for a topography on the surface of the dielectric layer. An example diameter of ceramic particles may be at least 0.5 µm and at most 10 µm, at least 1 µm and at most 5 µm and at least 1.5 µm and at most 5 µm, e.g., 2 µm or any other suitable value. Taking a diameter of 2 µm as an example value and a comparatively high degree of filling, e.g., at least 30%, at least 40% or at least 50% or even more, the particles may exceed or protrude from the (plane) surface of the dielectric material with e.g., ¼ of their diameter, i.e., approximately 500 nm. Although protruding from the virtual plane surface, the particles may still be covered by a thin layer of a dielectric material or paste. The paste may be or may comprise, for example, a polymer matrix for linking the particles. Thereby, a topography according to a wave crest and a wave through maybe obtained. A variation within the topography between wave crests and wave throughs may be at least 100 nm, at least 300 nm or at least 400 nm, e.g., 500 nm or even more. Based on a (at least approximate) plane surface of the film substrate and/or based on a topography of the substrate, a variable thickness of the dielectric layer may be obtained. Thus, the printed material itself may provide for a variable thickness. Alternatively or in addition, the topography of the film substrate may provide for a variation within the thickness of the dielectric layer, e.g., when performing the process so as to generate a (approximated) plane surface on a rough or uneven film substrate. By non-limiting example only, electrodes of the film substrate may comprise a roughness of approximately 500 nm, e.g., in a worst case, which may influence or even add up in the total variation of the thickness.

As a further parameter of generating a variable thickness, the printing process itself may be used. For example, when implementing a silkscreen process, small dots or small towers of dielectric material may be arranged one beside the other. Based, influenced or even depending on the thixotropy or viscosity, the dots or towers combine or meld with each other. This process may allow for obtaining a remaining variation in the topography and therefore a further variation within the thickness.

A total variation of the thickness of the layer may comprise a value of, for example, at least 200 nm and at most 10 µm, at least 500 nm and at most 8 µm or at least 700 nm and at most 5 µm, e.g., in a range between 1 µm and 3 µm.

The method 1000 comprises a step 1020 in which a structured electrode layer is arranged on the dielectric material such that the structured electrode layer is influenced with respect to an electric measurement value due to the variable thickness of the dielectric layer. The electric measurement value may comprise at least one of an electric capacitance value, an electric impedance value, an electric resistance value and an electric inductance value. Combinations thereof lie within the embodiments of the present invention. In the following, reference will be made to electric capacitance values as the dielectric material may be arranged between a structured electrode layer arranged on the film substrate and the structured electrode layer arranged on the dielectric material allowing a formation of capacitive elements. According to further embodiments, opposing electrodes may further allow for a variation in electric resistance values, electric impedance values or electric inductance values, depending on the dielectric material. In particular, with respect to the electric inductance value, the dielectric material may also comprise conductive and/or inductive materials.

The variation of the thickness of the dielectric layer in combination with variances achieved by the printing process allow for a randomization of the thickness and therefore for a randomization of the electric measurement value. This measurement value may this be used as a Physical Unclonable Function (PUF).

Arranging the structured electrode layer on the dielectric layer 28 and/or arranging conductive traces on the film substrate 24 may comprise a deposition process, a printing process and/or a photolithographic process. A printing process may allow for a simple and repeatable deposition, wherein a photolithographic process may allow for a high resolution or precision.

In other words, in microsystems technology and in particular when forming capacitances, it is known to produce homogenous, continuous and reproducible layers. Security films or security foils are known to be based on resistive networks/arrays. In known concepts, capacitances are produced in printed circuit technology with single layers of the printed circuit board, using surface mounted devices (SMD) components, respectively. No printed circuit boards or foil materials are used that comprise no or even low variation in the electric capacity. In the printed circuit board industry it is known to connect a front side of a substrate and a second conductor path layer on the backside of the substrate such as a PCB-board or a flexible foil over vias, which involves drilling and/or lasering through the substrate material. In contrast, method 1000 enables producing a capacitive foil array having the property that capacitances vary with respect to their electric values. The capacitive array can be used for generating a cryptographic key which is derived from the variations of the capacitive values. In one simple case, the capacitive array is formed by lines and columns being separated from each other by a dielectric.

Figure 2:
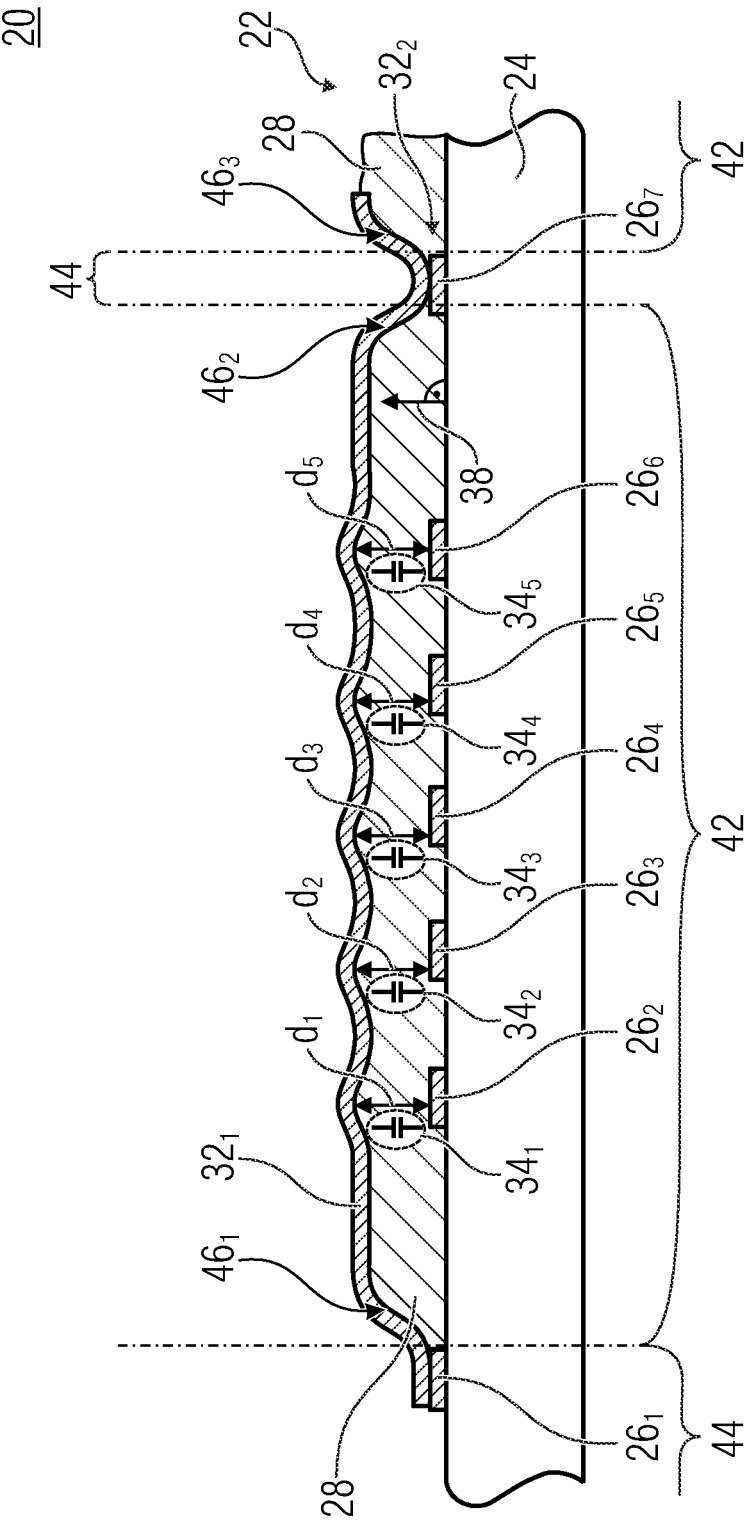
FIG. 2 shows as schematic side view of a PUF-film according to an embodiment of the first aspect.

FIG. 2 shows as schematic side view of a PUF-film 20 according to an embodiment of the first aspect. The PUF-film comprises a layer stack 22 comprising a plurality of layers. The layer stack 22 comprises a film substrate 24. The layer stack 22 further comprises conductive traces $26_1$ to $26_7$, e.g., forming a first conductive structure or circuit structure. The conductive traces $26_1$ to $26_7$ may be part of the film substrate 24 and/or may be arranged thereon as a separate layer or structure. When referring again to FIG. 1 describing the method 1000, then the dielectric material may be printed onto the film substrate 24 including or excluding the conductive traces $26_1$ to $26_7$. The layer stack 22 comprises a printed dielectric layer 28 which may be printed, for example, during the step 1010. The printing may be performed in one step or in a multitude or plurality of steps so as to reduce or prevent pin-holes. Different layers may comprise, for example, different granule materials.

The layer stack 22 further comprises a structured electrode layer 32 being arranged at the dielectric layer 28 such that the dielectric layer 28 is arranged at least between parts of the circuit structure comprising the conductive traces $26_1$ to $26_7$ and the structured electrode layer 32. Between conductive traces 26 and the structured electrode layer 32, an electric property 34 may be obtained. The type of the electric property 34 may be based or may depend on properties of the dielectric material arranged in the dielectric layer 28 and/or an interconnection of parts of the structured electrode layer 32 and/or of the conductive traces $26_1$ to $26_7$. Although the PUF-film 20 is described as forming electric capacitance values as electric properties $34_1$ to $34_5$, also further or different electric properties such as impedance values and/or resistance values and/or inductance values may be obtained.

The dielectric layer 28 may comprise a varying and/or different thickness $d_1$ to $d_5$ at locations where conductive traces $26_2$ to $26_6$ oppose the structured electrode layer 32 so as to form the electric capacitance values $34_1$ to $34_5$. The thickness may be understood as an extension along a direction being parallel to a surface normal 38 of the film substrate 24. Based on the varying thickness, i.e., differences between thickness $d_1$, $d_2$, $d_3$, $d_4$ and/or $d_5$, varying electric capacitance values $34_1$, $34_2$, $34_3$, $34_4$ and/or $34_5$ may be obtained.

The number of conductive traces 26 being 7 in FIG. 2 is exemplary only. Any other number of conductive traces 26 may be implemented, e.g., 0 or more, 1 or more, 2 or more, e.g., 4, 5, 6, 10, 16 or other values. Further, one or more of the conductive traces may be galvanically coupled to each other and/or may be a part of a same and possibly folded or meandered conductive trace. Alternatively or in addition, at least one, some or all of the conductive traces may comprise a different and possibly application specific shape.

Although the structured electrode layer 32 is illustrated as one single conductive trace, also a higher number of conductive elements or traces may be implemented. Alternatively or in addition, different electronic components may be arranged, for example, capacitor elements, inductance elements such as coils or the like.

As described in connection with FIG. 1, the surface profile of the dielectric layer 28 may be influenced, at least partially, by particles contained in the dielectric material and/or by surface profiles contained by the printing process. A relative position of a surface profile of the dielectric layer 28 with respect to the structured electrode layer 32 may underlie a stochastic distribution. For example, a concrete or exact position of the particles within the dielectric material is unknown and/or a specific position of holes of a screen or filter or strainer causing variations in the topography may be unknown or at least varying. Therefore, between PUF-films being produced with the same machinery or apparatus, variations in the electric properties 34 may be obtained such that by using the electric properties 34 as PUF, differences between the produced PUF-films are obtained.

The dielectric material used for printing the dielectric layer 28 may also comprise at least one granule material having a dielectric constant being different from a dielectric constant of a polymer matrix and/or the ceramic particles so as to allow for a further randomization of the electric properties 34. Furthermore, as a size, position and/or property of the granule material may vary along a lateral position and/or along a thickness direction within the dielectric material and/or may vary between different PUF-films, a further level of security may be obtained. In case of an attack such as a drilling attack leading to defects or damages in the PUF-film, a reparation is hampered because the property of the granule material would also need to be repaired. According to an embodiment, different types of granule materials may be arranged in the dielectric material 28, e.g., two types, three types, four types or even more. Example materials which may be used for generating ceramic based capacitances and that may be used as a granule material include, amongst others, $MgNb_2O_6$, $ZnNb_2O_6$, $MgTa_2O_6$, $ZnTa_2O_6$, $(ZnMg)TiO_3$, $(ZrSn)TiO_4$ and/or $Ba_2Ti_9O_{20}$. Further example materials include Al2O3; SiO2; Cr2O3; Si2O3; SiC, ZrO2, TiO2. Alternatively or in addition, the granule material may comprise, for example, dielectric materials such as $TiO_2$, TiN or the like.

When referring again to the step 1010, the dielectric material may be printed such that the dielectric layer 28 covers a first region 42 which may be continuous or discontinuous. The dielectric layer 28 may be printed so as to not cover a second region 42 of the film substrate 24 and/or the circuit structure comprising the conductive traces $26_1$ to $26_7$. The conductive traces $26_1$ to $26_7$ may form a further structured electrode layer $32_2$. Between the first region 42 and the second region 44, one or more material edges $46_1$ to $46_3$ may be arranged so as to separate the regions 42 and 44. The structured electrode layer $32_1$ may be arranged on the dielectric layer 28 so as to extend between the first region 42 and the second region 44 by extending over one or more of the material edges $46_1$ to $46_3$. Thereby, it is possible to contact the structured electrode layers $32_1$ and $32_2$ in the second region 44. Thereby, a generation, implementation or arrangement of vias may be avoided as the arrangement of vias is difficult. For example, the first and second structured electrode layers $32_1$ and $32_2$ may be galvanically connected or coupled with each other, e.g., by a soldering process. Alternatively or in addition, at least parts of first and second structured electrode layers $32_1$ and $32_2$ may be arranged in a common plane without galvanic connection with the second structured electrode layer, for example, for forming lines or pins of a connector.

A method for producing the PUF-film 20 may further comprise arranging an electric shield so as to shield the structured electrode layer $32_1$ and/or $32_2$. For example, a shielding layer, i.e., a layer of a conductive material, may be arranged on a surface of the film substrate 24 opposing the dielectric material 28.

Alternatively or in addition, the shielding may be arranged adjacent to the structured electrode layer $32_1$, for example, on a surface thereof opposing the film substrate 24. An insulating and/or dielectric material may be arranged between the structured electrode layer $32_1$ and the electric shield so as to allow shielding of the structured electrode layer $32_1$ from external influences. In one example, a further dielectric material is arranged on the surface of the structured electrode layer $32_1$ opposing the film substrate 24 so as to obtain a possibly homogenous surface. The electric shield may be arranged on that dielectric material.

In other words, embodiments of the first aspect provide for a solution of interconnecting different layers at which no vias have to be drilled or lasered (subtractive processes). Both electric conductive layers are separated from each other by the used dielectric material, for example, the same material used for producing the capacitive array. The dielectric material provides for a galvanic separation. An interconnection of both layers may be formed at the edge or in holes of the dielectric layer. Connections and crossings may be used for interconnecting lines and/or rows of conductive traces with external electronics and/or with electronics being contained in the evaluating chip. This allows for arranging all layers or contacts thereof one side, e.g., the front side or the back side of the substrate. At the same time, inhomogeneities of the layer thickness of the dielectric layer may be used for obtaining a variation of the capacitive behavior between both layers of conductive traces.

In further other words, conductor path layers 1 and 2 meet at the edge of the dielectric layer. At the edge, conductive traces may be combined, interconnected or galvanically coupled with each other, for example, for increasing capacitive values and/or for continuing the conductive trace, e.g., for connecting the conductive trace with an evaluation unit.

Figure 3B:
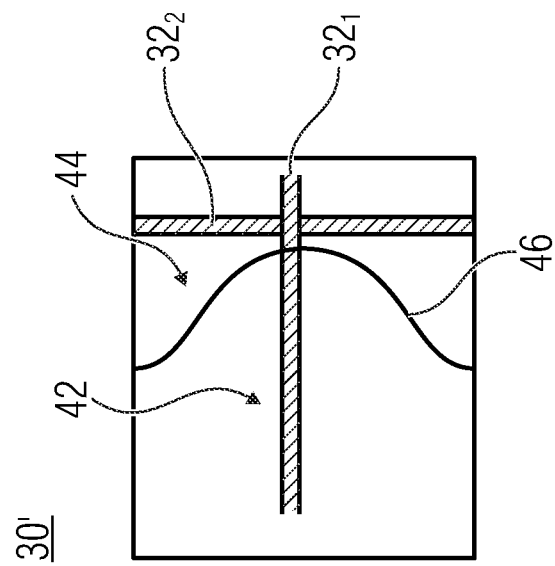
FIG. 3b shows a schematic top view of a modified PUF-film according to an embodiment of the first aspect in which the second region is adjacent to the first region and forms an edge region of the first region.
Figure 3A:
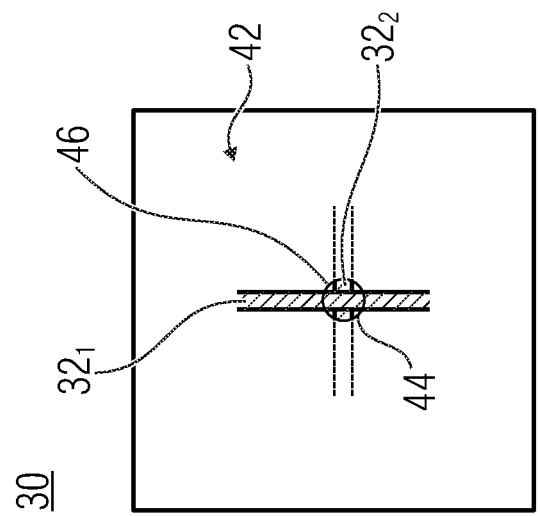
FIG. 3a shows a schematic top view on at least a part of a PUF-film according to an embodiment of the first aspect in which a second region of a dielectric layer is enclosed by a first region.

FIG. 3a shows a schematic top view on at least a part of a PUF-film 30 according to an embodiment in which the second region 44 is enclosed by the first region 42. For example, the dielectric material comprises an opening or a hole circumferenced by the material edge 46 allowing the structured electrode layer $32_1$ to galvanically connect with the underlying structured electrode layer $32_2$, e.g., a conductive trace thereof.

FIG. 3b shows a schematic top view of a modified PUF-film 30' in which the second region 44 is adjacent to the first region 42 and forms an edge region of the first region 42. For example, the dielectric layer 28 does not cover the film substrate in the edge region allowing for interconnecting the structured electrode layers $32_1$ and $32_2$ in the edge region. Alternatively or in addition, for example, on a same or different location, the PUF-film 30 may comprise a connector region or connector area in which the structured electrode layers $32_1$ and $32_2$ may be connected with an evaluation unit and/or a different apparatus. A simple and robust connector may be used when the structured electrode layers $32_1$ and $32_2$ are arranged in a common plane which is possible when leading the structured electrode layer $32_1$ into the plane or layer of the structured electrode layer $32_2$ whilst keeping both structured electrode layers $32_1$ and $32_2$ galvanically separated from each other at the location of the connector so as to avoid short-circuits. I.e., arranging the structured electrode layers $32_1$ and/or $32_2$ may be performed such that the structured electrode layers $32_1$ and $32_2$ are connectable in a common connector layer or surface.

For defining the first and second regions 42 and 44, the printing process may be adapted accordingly, for example, by defining the respective regions in the screen of a screen printing/silkscreen process. Alternatively or in addition, the dielectric material may be a photosensitive material. A method according to an embodiment may comprise a step of exposing the photosensitive material in an exposer region so as to develop the dielectric material in the exposing region and so as to define a mask of the dielectric material. According to a simplified example, the dielectric material may be printed onto the complete surface of the film substrate. By exposing parts or regions of the dielectric material, regions in which the dielectric material remains and/or regions in which the dielectric material is removed afterwards may be defined, e.g., by hardening or softening the dielectric material based on the exposing.

Figure 4:
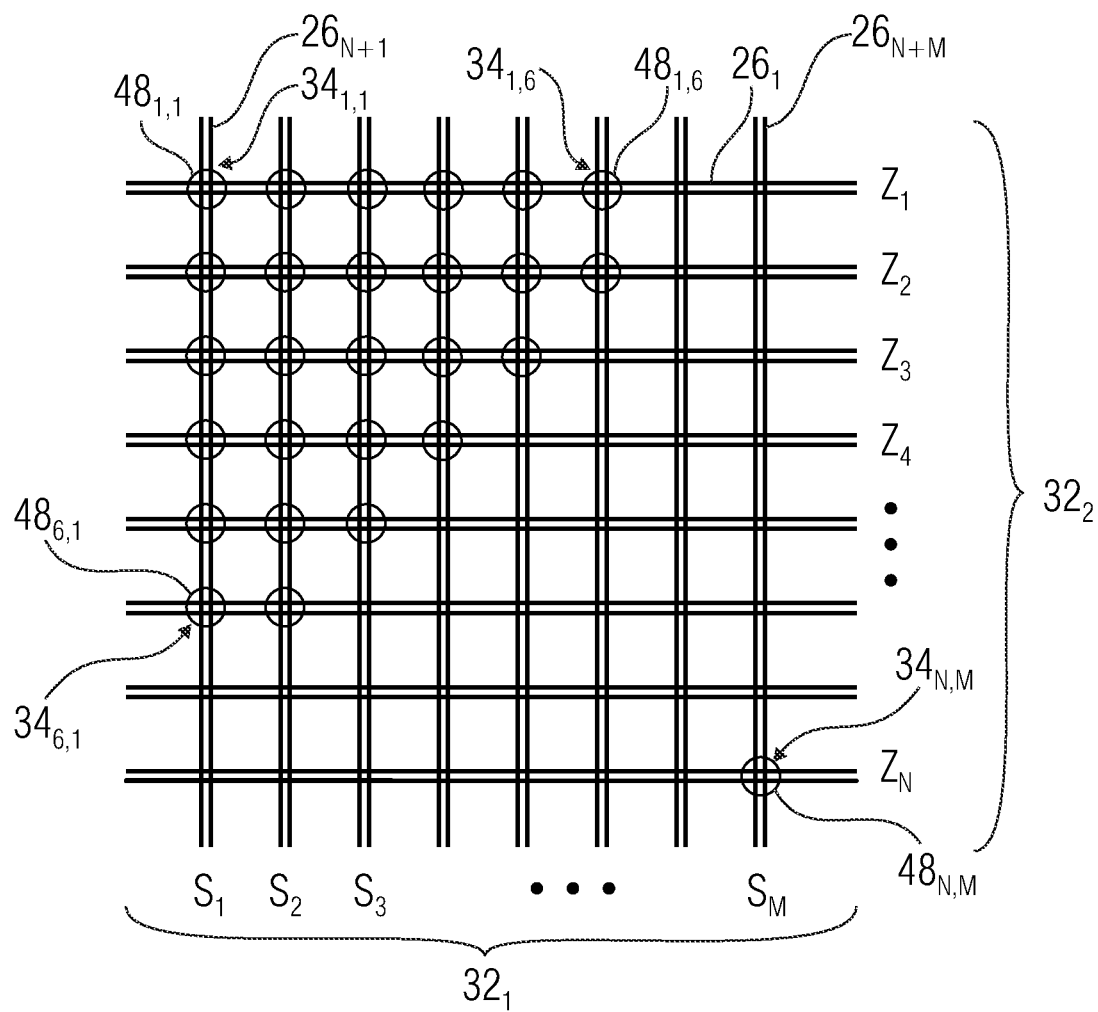
FIG. 4 shows a schematic top view of at least parts of a PUF-film according to an embodiment of the first aspect in which a first and a second structure electrode layer each comprise conductive traces.

FIG. 4 shows a schematic top view of at least parts of a PUF-film 40 in which both, the structure electrode layer $32_1$ and the structured electrode layer $32_2$ each comprise conductive traces 26 being arranged in a matrix-form comprising a number of N lines $Z_1$ to $Z_N$ and a number of M columns $S_1$ to $S_M$. At crossings $48_{i,j}$ with i=1, . . . , N and j=1, . . . M electric properties $34_{i,j}$ may be formed as, although not shown in FIG. 4, the dielectric layer 28 is arranged between the structured electrode layers $32_1$ and $32_2$ and in the range of the crossings $48_{i,j}$. Alternatively, at a region of one or more crossings $48_{i,j}$, the dielectric layer may be absent so as to allow for an interconnection of the respective crossing conductive traces 26. The crossings 48 may also be referred to as overlapping regions. According to embodiments of the first aspect, capacitive elements are formed in the overlapping regions $48_{i,j}$.

A capacitance value of the capacitive elements 34 may vary stochastically based on the variation of the thickness of the dielectric layer due to the printing of the dielectric material. For example, this may allow for obtaining or generating cryptographic keys from the electric capacitance values, wherein tampering or modification of the PUF-film destroys the source of the key and therefore disables regeneration of the key and thus allows for detection of the tampering.

Figure 5:
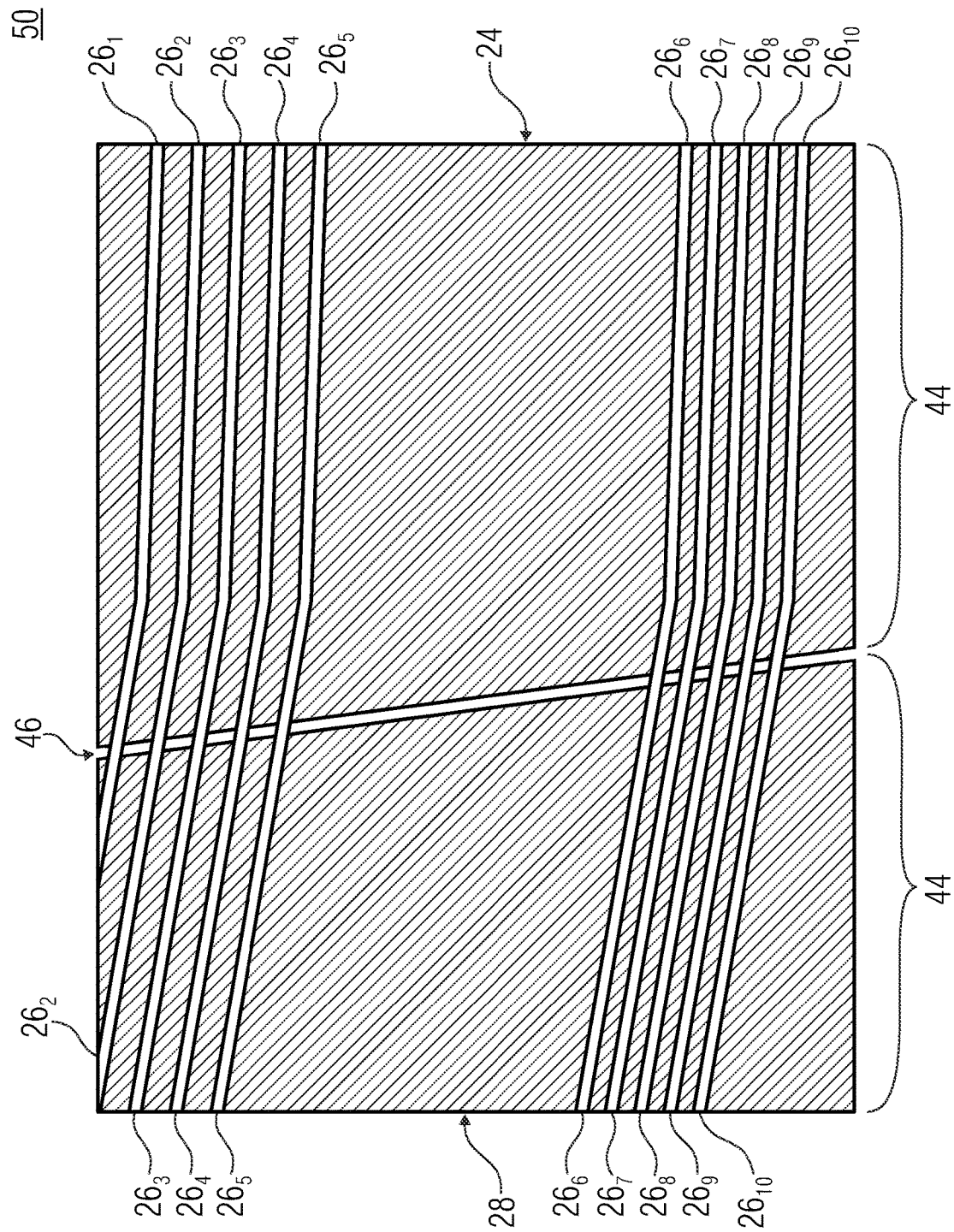
FIG. 5 shows a schematic top view on a PUF-film according to an embodiment of the first aspect having the first region and the second region between which a material edge is arranged.

FIG. 5 shows a schematic top view on a PUF-film 50 having the first region 42 and the second region 44 between which the material edge 46 is arranged. A plurality of conductive traces $26_1$ to $26_{10}$ extends between the regions 42 and 44 and thereby crosses the material edge 46. The conductive traces $26_1$ to $26_{10}$ may be grouped into two groups of five conductive traces, each group containing five conductive traces having a width (extension perpendicular to an axial direction) of 20 µm and being spaced from each other by 20 µm. Any other configuration is possible without any limitation.

At the crossing points of the lines and columns, there is arranged the capacitive value which may be described with the width of the conductive trace in the line and column on the one hand side and by the thickness of the dielectricum at the region of the crossing on the other hand. A proper selection of the dielectricum and of the method for producing the PUF-film, the homogeneity of the dielectric layer may be influenced over the complete area, leading again to a random variation of the electric values of the capacitances. For example, the silkscreen process may provide for an inhomogeneity in the layer thickness of the dielectric layer. At the same time, differences in the layer thickness may be obtained by the topography of the substrate surface, the conductive traces being already arranged thereon respectively and before the dielectricum is arranged. Further, surface forces may influence the wetting behavior of the interface being formed by the substrate foil, the conductive traces, the dielectricum and thus results in a local variation of the layer thickness and in a random local variation of the single capacitances with respect to adjacent capacitances in different lines or columns. Further, typical symmetry effects may occur, for example, being axially symmetrical based on the lines of the screen and/or being rotational symmetric based on the rotation of the spin-coating process.

In other words, by selecting the method for producing the PUF-film, openings in the dielectric layer may be produced for enabling an electric connection between conductor path layer 1 and 2. A size of the opening or edge, a steepness of the edge and a quality of the opening and/or edge and a homogeneity of the thickness of the dielectric layer can be influenced with the selection of the printing process. For producing the dielectric layer, there may be used exclusively additive processes in a simple embodiment such as a silkscreen process, a rotary printing process, an offset printing process, a pad printing process and a spin coating process or the like. Further, a combination with a photo-lithographic process is possible at which the previously described processes are used to deposit a photosensitive layer and for exposing the layer in regions, for example, in regions where the photosensitive dielectric is defined to remain. It is possible to use photosensitive permanent resists which may be deposited prior to exposing them with a laminator. According to one embodiment, a dielectric layer is produced using a silkscreen process. By using a structured screen, it is possible to generate openings in addition to an outer edge of the dielectric layer. This allows for generating additional electrical connections between the conductive path layers 1 and 2, the structured electrode layers $32_1$ and $32_2$ respectively. Silkscreen processes may comprise resolution limits being around 100 µm. For generating holes or openings having a lower pitch, i.e., smaller than 100 µm, i.e., less than 10 µm, there may be used a photolithographic process. For example, a typical screen may comprise 400 lines per inch providing for a respective resolution.

Further, there are permanent photoactive resist materials which may be used and which may be laminated over the complete area using a laminator, for example, onto the structured electrode layer $32_2$. Alternatively, a different additive process may be used, e.g., a silkscreen process, an inkjet process, a pad printing process and/or a Gravure printing process. This allows for applying the layer over the complete area or pre-structured. In a following step, holes may be defined, for example, using ultraviolet exposure as known in the microsystems technology. For example, using a glass mask, it is possible to define those areas of the photoactive material that are interconnected/developed by the ultraviolet radiation and therefore remain afterwards and/or for defining regions which are removed afterwards and therefore allow for a through-connection so as to connect conductor path layers 1 and 2. Such through-connections are sometimes needed for generating or connecting complex circuit structures being arranged in different layers.

Embodiments provide for the advantage that based on the inhomogeneity of the layer thickness of the dielectric layer, the behavior of the grid of electrode structures is influenced. This grid-like electrode structure may be used generating cryptographic keys. The network of capacitances may be evaluated, for example, line-wise and/or column-wise, by using evaluation electronics, for example, a microcontroller, a central processing unit, a field programmable gate array (FPGA) or the like. Differences or variations in capacitance values between lines and/or columns may be transformed so as to allow derivation of cryptographic keys by use of mathematic processes and/or software. Such a cryptographic key may be used for encrypting data.

Further, implementing evaluation concepts, an un-allowed attempt for spying on and/or for tampering may be detected. An attempt for spying on may include a mechanical variation of the foil array, e.g., due to scratching, drilling, piercing or the like. The mechanic damage results in a change of the electric values of the capacitances and therefore results in a detectable event that may be detected by the evaluation electronic. As with the capacitance array, the through-contacts may be produced in an additive way, a cost-efficient possibility is generated for increasing the integration density of the circuit structures. It is possible to generate wiring layers for electric components such as microcontrollers or ICs in a same process step as the capacitance array.

Figure 6A:
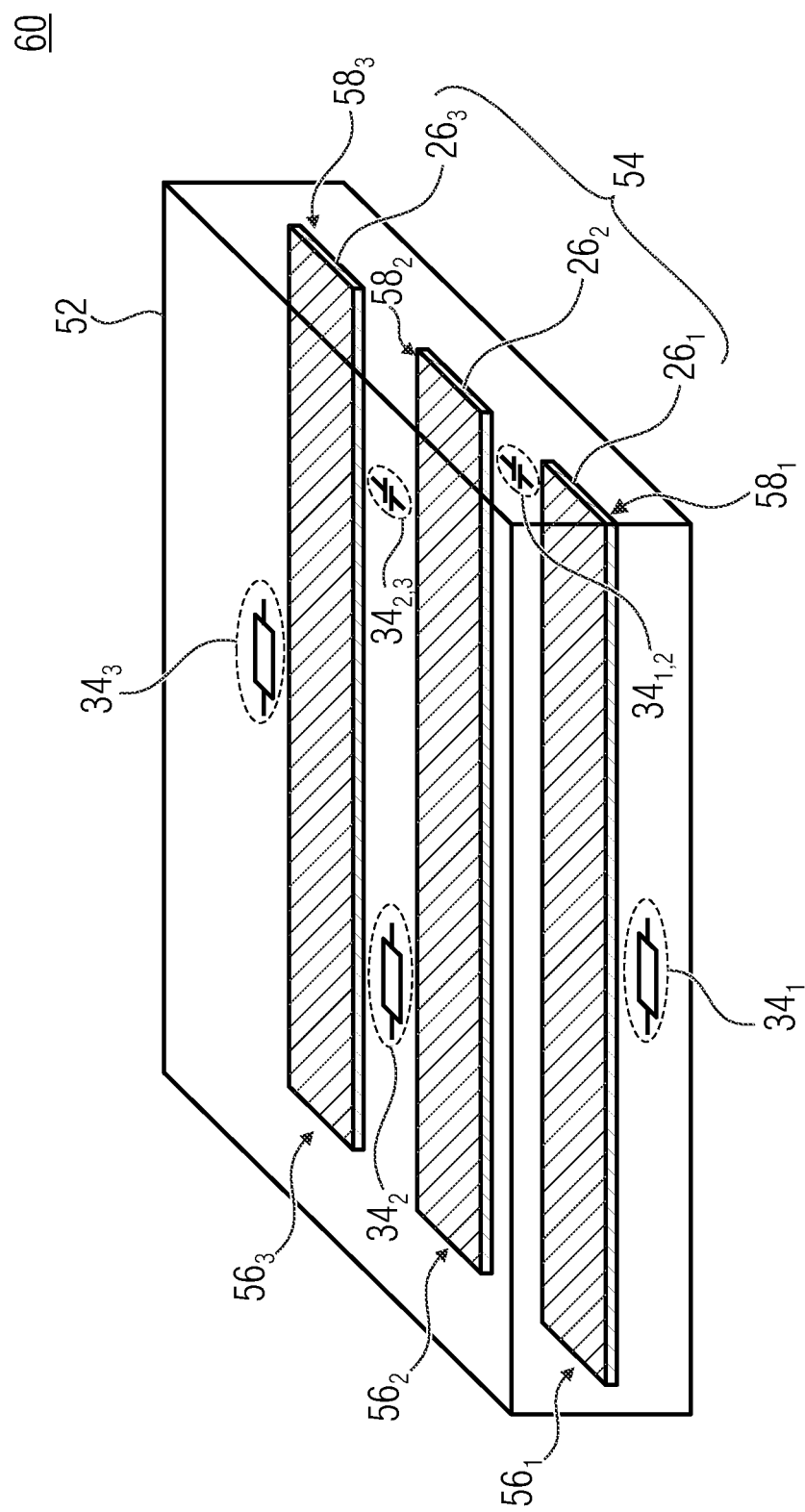
FIG. 6a shows a schematic perspective view of a PUF-film according to an embodiment of the second aspect.

FIG. 6a shows a schematic perspective view of a PUF-film 60 according to an embodiment of the second aspect. The PUF-film 60 comprises a PUF-carrier 52 which may comprise, for example, the film substrate 24, the dielectric layer 28 and/or further layers. According to an embodiment, the PUF-film comprises a circuit structure 54 having a plurality of circuit elements. The plurality of circuit elements may be, for example, the conductive traces 26 such that the circuit structure 54 may be or may at least comprise the structured electrode layer $32_1$. The circuit structure 54 is evaluable with respect to a plurality of electric capacitance values $34_{1,2}$ and $34_{2,3}$ being arranged between the plurality of circuit elements, in particular between the conductive traces $26_1$ and $26_2$, between the conductive traces $26_2$ and $26_3$ respectively. The circuit structure 54 is further evaluable with respect to a plurality of electric resistance values $34_1$, $34_2$ and $34_3$ associated with or comprised by the respective conductive trace $26_1$ to $26_3$. Thus, the resistance values are comprised by the same structures evaluated for the capacitance values. For evaluating an electric capacitance value such as the capacitance value $34_{1,2}$ and/or the capacitance value $34_{2,3}$, capacitance measurement may be performed between two of the circuit elements. For evaluating the electric resistance value, the electric resistance value may be measured or evaluated or determined between a first section $56_1$, $56_2$, $56_3$ respectively and a second section $58_1$, $58_2$, $58_3$ respectively of the respective circuit element. The first and second sections 56 may be, for example, ends of the conductive traces 26 and/or may be regions accessible through the dielectric material, for example, at regions of a hole therein.

As was described in connection with the first aspect, the circuit elements of the circuit structure 54 may be embedded in dielectric material, wherein the dielectric material may also comprise conductive granule and/or contamination leading to defects in the circuit structure 54, e.g., short circuits or open circuits. Further, when compared to evaluation of capacitance values, evaluation of resistance values may provide for additional information which respect to an attack on the PUF-film 60.

FIG. 6b shows a schematic side view of a PUF-film 60' according to an embodiment of the second aspect. The PUF-film 60' provides for a high entropy whilst using a simple and therefore robust architecture. The PUF-film 60' comprises the film substrate 24 having two opposing main surfaces or main sides 24a and 24b, the substrate 24 providing for a dielectric layer. The main sides 24a and 24b may be considered as those sides of a film or foil having the largest surface area and opposing each other. On the first main side 24a the structured electrode layer $32_1$ may be arranged, wherein on the second side 24b the structured electrode layer $32_2$ may be arranged. For example, both structured electrode layers $32_1$ and $32_2$ may be formed as will be described in connection with FIG. 8a or FIG. 8b or differently. The PUF-film 60' may comprise a layered structure in which the dielectric foil substrate 24 is arranged between the first trace layer $32_1$ and the second trace layer $32_2$ so as to form the plurality of electrical capacitance values 34 in overlapping regions of the first and second trace layer $32_1$ and $32_2$. At least one of the trace layers $32_1$ and $32_2$ is covered at least partially with a dielectric layer $28_1$, $28_2$ respectively, which is applied, for example, by way of printing, wherein the printing may be combined with a laser ablating process. This allows for a high entropy of the architecture. The PUF-film 60' may be obtained by embodiments according to the first aspect in which a printing is performed on one or both sides of the substrate 24. When compared to the PUF-film 20, the substrate 24 may be formed so as to comprise the structured electrode layer $32_1$ and $32_2$. The printing may be performed on both sides.

In connection with the first aspect, the first and/or second structured electrode layers $32_1$ and/or $32_2$ may be already arranged when providing the film substrate 24 and/or may be generated or deposited after providing the film substrate 24, wherein in both cases prior to the printing at least the first structured electrode layer $32_1$, both structured electrode layers $32_1$ and $32_2$ are present. A method according to an embodiment may comprise providing the film substrate 24 for the printing 1010 so as to have the two opposing main sides 24a and 24b and having the first structured electrode layer $32_1$ on the first main side 24a and the second structured electrode layer $32_2$ on the second main side 24b. The film substrate 24 may provide a dielectric layer with respect to the first and second structured electrode layers and may thus allow for generating and obtaining the capacitance values to be measured. The dielectric material being printed thereon may allow for diversification or falsification or manipulation of the capacitance values. The printing 1010 may be performed on the first structured electrode layer $32_1$ and/or on the second structured electrode layer $32_2$.

Figure 7B:
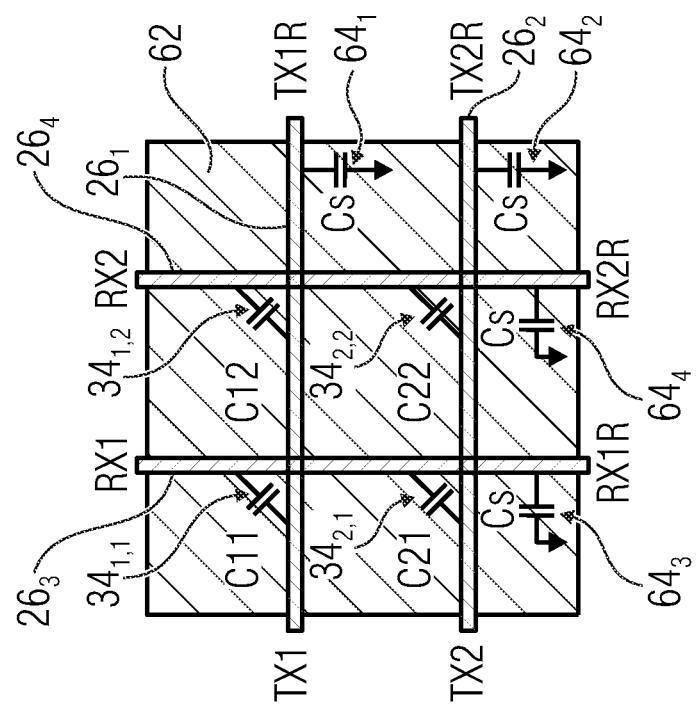
FIG. 7b shows a schematic block diagram of the circuit structure of FIG. 7a on the equivalent circuit level.
Figure 7A:
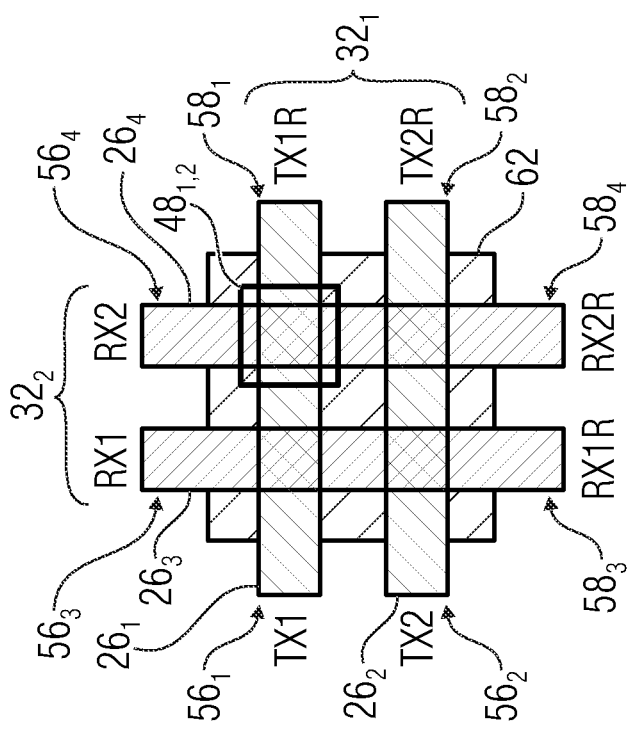
FIG. 7a shows a schematic top view of a circuit structure in accordance with an embodiment of the second aspect comprising overlapping conductive traces.

FIG. 7a shows a schematic top view of a circuit structure 54 comprising a 2×2 matrix of conductive traces 26 as described in connection with FIG. 4. In other words, FIG. 7a shows the circuit structure 54a in a mesh layout level. Accessible or connectable sections 56 and/or 58 are further marked with TX1 and TX2 so as to indicate an input-interface or input-support of the circuit element. Second sections $58_1$ and $58_2$ are marked with TX1R, TX2R, respectively, so as to indicate a second interface or port thereof. Simplified, a signal may be applied between TX1 and TX1R and/or between TX2 and TX2R. Same applies for sections $56_3$ and $56_4$ and sections $58_3$ and $58_4$ of conductive traces $26_3$ and $26_4$ of the structured electrode layer $32_2$. The "T" used in connection with the circuit structure $32_1$ indicates a possibility of applying an excitation signal to the respective conductive trace $26_1$ and/or $26_2$, wherein the "R" is used so as to indicate that a signal inducted by way of the signals applied to the conductive traces $26_1$ and $26_2$ may be evaluated or received at those lines. The description is interchangeable without any limitation and is for simplification only.

FIG. 7b shows a schematic block diagram of the circuit structure 54a on an equivalent circuit level. I.e., FIG. 7b shows an equivalent circuit of the circuit structure 54a. In the regions of overlap, the electric properties $34_{1,1}$ to $34_{2,2}$ are arranged and implemented by way of capacitance values. Those capacitance values are capacitance values effective between the respective conductive traces. Each conductive trace $26_1$ to $26_4$ is further effected by a capacitance value $64_1$ to $64_4$ being formed by the conductive trace 26 and a common shielding 62. The capacitance values $64_1$ to $64_4$ may be larger when compared to the capacitance values $34_{1,1}$ to $34_{2,2}$. In particular, the capacitance values $64_1$ to $64_4$ may be larger by a factor of at least 100, at least 200, at least 500 or even at least 1000 when compared to the capacitance values $34_{1,1}$ to $34_{2,2}$. For detecting an attempt of tampering the proof-foil, evaluation of both, the capacitance values $64_1$ to $64_4$ and/or of the capacitance values $34_{1,1}$ to $34_{2,2}$ may be suitable in connection with evaluating the resistance values between the terminals TX1 and TX1R, TX2 and TX2R, RX1 and RX1R and/or RX2 and RX2R. The evaluation unit may be configured for evaluating changes in the differential electric capacitance, i.e., the difference in the electric capacitance value with a resolution so as to enable detections of changes having a factor of at least 20 when compared to the differential electric capacitance value. This allows for evaluating even minor changes in the PUF-film.

As will be shown in the following, by applying a specific evaluation concept, a focus may be put on the capacitance values $34_{1,1}$ to $34_{2,2}$ which carry a high amount of information in view of tampering or the like. In particular, the capacitance values $34_{1,1}$ to $34_{2,2}$ may be very sensitive to tampering attempts. In other words, the circuit structure 54 and/or the circuit structure 54a in connection with the PUF-foil 60 may be regarded as well-tailored measurement circuit that is suited for PUF-based capacitive enclosures. A cryptographic key may be derived from the PUF and used to encrypt the underlying system. Any penetration destroys the key and thus prevents tampering with the powered-off system. This represents a concept for combined enclosure integrity verification and PUF evaluation. The circuit structure comprises conductive traces on two (or more) layers which are separated by a non-conducting dielectric such as polyimide. To prevent interference and fringing fields, the enclosure may be covered by a grounded shield such as the shield 62 on the top and/or the bottom. The trace structure on both layers may be orthogonal to each other. In order not to generate any unprotected spots, the mesh may span across the entire surface of a device to be protected. A spacing between traces may be a fixed parameter which may be set to 300 µm, 200 µm, 100 µm or even less, e.g., 50 µm or the like.

The PUF-film 60 may be used to cover an enclosure of a module under protection. Although FIGS. 7a and 7b illustrate two conductive traces per layer (structure electrode layer 32) also a higher number may be used, for example, four, six, seven, eight, ten or even more such as sixteen or more. For example, both layers are split into N electrodes, i.e., N=M in FIG. 4. N may be, for example, 16. The electrodes (conductive traces) may then be routed, for example in a meander-like out, to fill the entire layer. This may result in $N^2$ combinations of capacitive coupling between top and bottom-layer electrodes.

Alternatively, N≠M, allowing for a different configuration of e.g., 32·16, 32·8, wherein for both, N and M any suitable number of at least 1 may be applied, e.g., 2, 3, 4, 6, 8, 10 or more such as more than 15, more than 30 or even higher.

Each capacitor is built from hundreds up to thousands of tiny trace overlaps connected in parallel, each individually contributing to the total variation capacitance. When considering a simplified 2×2 enclosure model as illustrated in FIGS. 2a and 2b, one of the layers such as the top layer $32_1$ may be excited by a signal and the bottom layer such as the layer $32_2$ may receive a signal with an amplitude proportional to the capacitive coupling. It is noted that descriptions referring to top/bottom, up/down, left/right or the like are used for explanatory reasons only and do not limit the scope of the embodiments described herein. When referring to FIGS. 7a and 7b, reflecting their function, the top layer traces are labeled TX electrodes, the traces on the bottom are called RX electrodes. Each electrode trace is accessible at both ends, whereas its rear end is designated by an "R" suffix. This allows trace integrity verification and short circuit detection. In the following, it is assumed that the electrode resistance of an intact electrode is low and therefore negligible.

Statistical analyses may show that using absolute capacitance variation, directly taken from the coupling between two electrodes, is unsuited. Trace thickness and width variations usually show a circular pattern due to the manufacturing process [13]. This causes correlation between the location of the electrodes on the enclosure and their PUF property. As this contradicts the PUF's unpredictability, embodiments employ differential capacitance measurements which cancel global effects. This may reduce the number of independent combinations to $N^2/2$.

The relevant capacitances for this embodiment are illustrated in FIG. 7b. Each coupling between TX and RX electrode is modeled as mutual capacitance 34 also referred to as $C_m$. C11 defines the mutual capacitance between TX1 and RX2. The difference of two mutual capacitances is defined as ΔC. Every electrode has a (parasitic) capacitance towards the ground shielding which is denoted as Cs. Cs may have values, for example, between 0.2 nF and 2 nF. Depending on the size and manufacturing technology of the enclosure, those values may vary. The (mutual) capacitance values 34, i.e., $C_m$, may be three orders of magnitudes smaller and may range, for example, from 10 pF to 20 pF. The PUF-variation of ΔC, i.e., the differential capacitance, is, for example, again three orders of magnitude smaller with a 1σ interval of [−8 fF; +8 fF]. Three orders of magnitude may mean a factor of $10^3$. According to other embodiments, a difference of at least 100 (two orders of magnitude) 200 or 500 is present.

FIG. 8a shows a schematic top view of a circuit structure 54b according to an embodiment of the second aspect. By way of non-limiting example four conductive traces $26_1$ to $26_4$ according to the description accompanying FIGS. 7a and 7b are illustrated, wherein a different and in particular higher number may be used. This is indicated by optional sections TX3/TX3R, TX4/TX4R and RX3R, RX4R respectively.

The conducting traces $26_1$ to $26_4$ are arranged in a first trace layer of the PUF-film and are arranged in a second trace layer of the PUF-film. For example, the conductive traces $26_1$ and $26_2$ are arranged in layer 1, wherein the conductive traces $26_3$ and $26_4$ are arranged in layer 2. Each of the conductive traces $26_1$ and $26_2$ overlaps with at least one, a plurality or alternatively each of the conductive traces $26_3$ and $26_4$ of the respective other layer in a plurality of overlap regions 48 so as to form a corresponding plurality of capacitor structures in the overlap regions 48. Each electric capacitance value evaluable by evaluating the respective conductive trace 26 is based on at least a first and a second capacitor structure 34 when providing for a plurality of overlaps between each of the conductive traces. The resistance value may be present and measurable between the ends of the circuit elements. The plurality of conductive traces in layer 1 and the plurality of conductive traces in layer 2 may each be meandered, wherein the conductive traces 26₁ and 26₂ span a film region 66₁ in which they are meandered. A film region 66₂ is spanned by a region in which the conductive traces 26₃ and 26₄ are meandered. A region in which the film regions 66₁ and 66₂ overlap with each other, i.e., in which the conductive traces of both layers are meandered, may be referred to as a sensoric region. The sensoric region may be a region in which the PUF-film is adapted for securely covering a device to be protected such as an enclosure. In the sensoric region, the plurality of overlaps 48 may be arranged. By way of example, the conductive traces 26 may meet each other orthogonally in the overlap regions 48.

In the following, an example is given on how to obtain connections or ends of the conductive traces 26 in a common plane in a connector region 68 whilst arranging the conductive traces 26 in different layers in the sensor region. The conductive layer 28 may be arranged such that a portion $72_1$ of the conductive trace $26_1$, a portion $72_2$ of the conductive trace $26_2$, a portion $72_3$ of the conductive trace $26_3$ and/or a portion $72_4$ of the conductive trace $26_4$ extends over the material edge 46 of the dielectric layer 28 so as to extend in a different layer whilst avoiding an implementation of vias. This may be of advantage in view of manufacturing costs and manufacturing efforts. It may be in particular of advantage when arranging the conductive traces of a common layer such as the conductive traces $26_1$ and $26_2$, $26_3$ and $26_4$ respectively in a way such that each conductive trace in the first layer and the second layer is exclusively neighbored by a different conductive trace along an axial course of the trace by arranging the conductive traces in an interleaved manner. When examining the conductive traces $26_1$ and $26_2$ in their course from TX1/TX2 to TX1R, TX2R respectively, the interleaved arrangement is preformed such that the conductive trace $26_1$ is only neighbored by a different conductive trace, i.e., the conductive trace $26_2$ in the same plane. This allows for detecting short circuits by monitoring resistance values and/or capacitance values between different conductive traces.

Figure 8B:
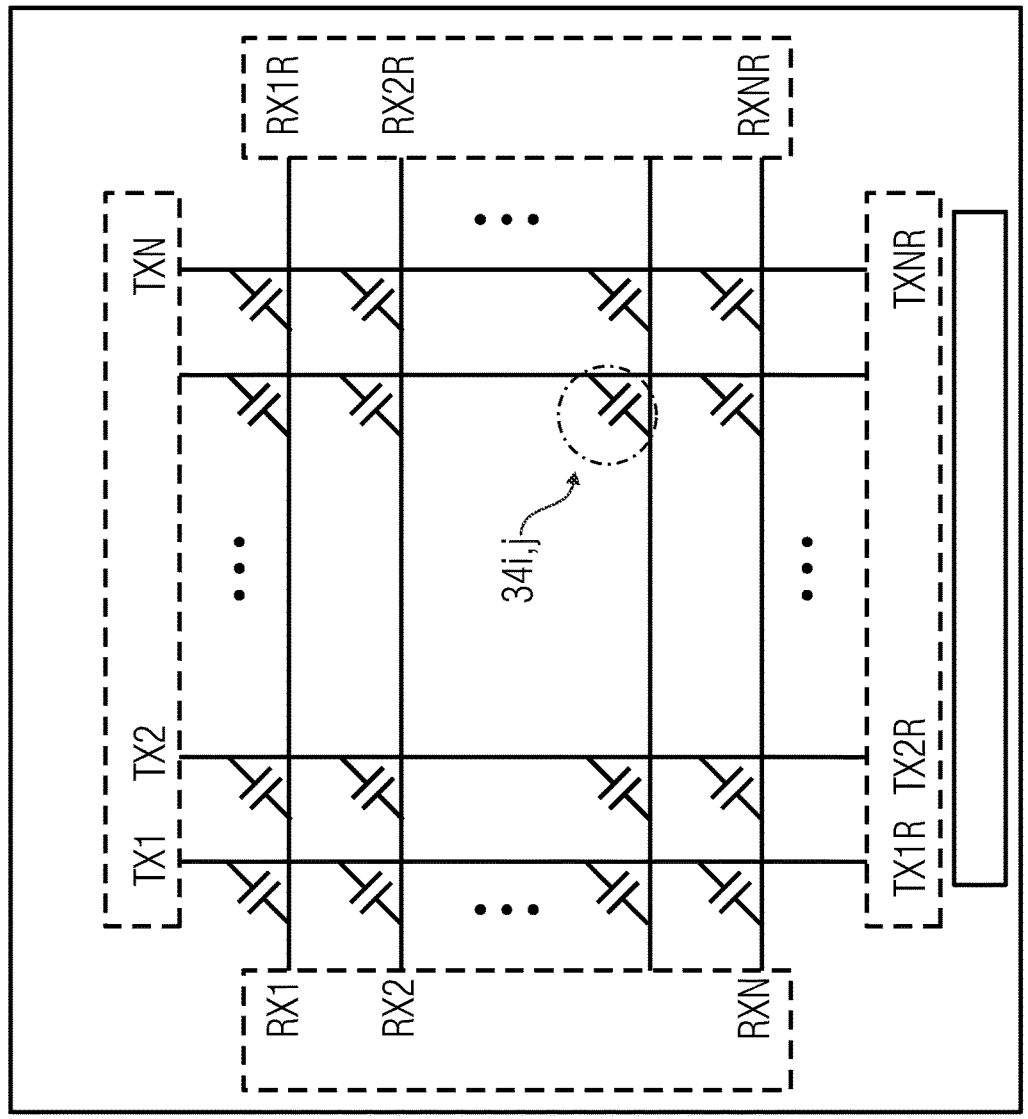

FIG. 8b shows a schematic block diagram of an equivalent circuit of the circuit structure 54b, being a logical representation of the FIG. 8a. As described in connection with FIG. 4, electric properties 34, i.e., capacitance values may be present between overlapping conductive traces.

Figure 9:
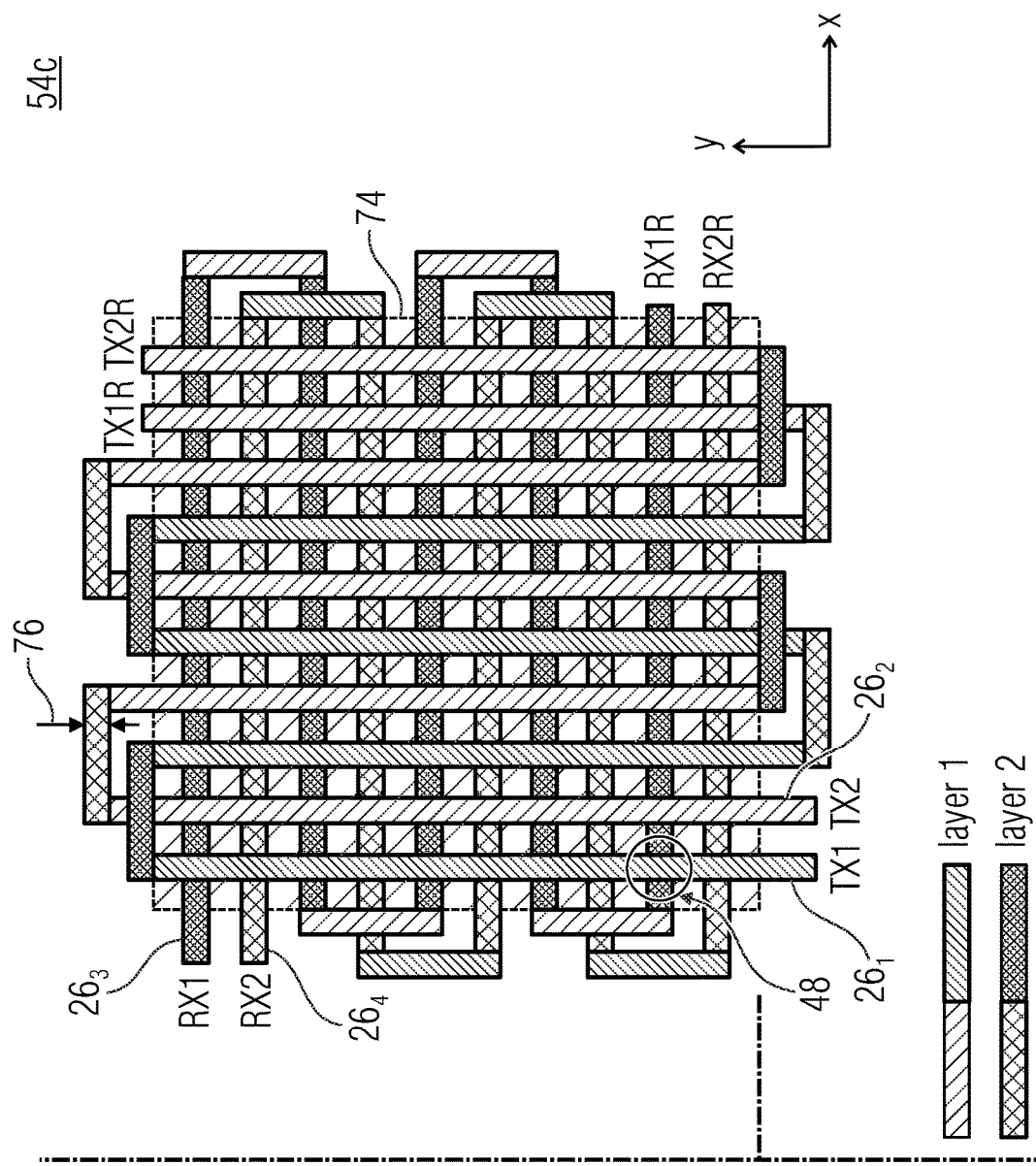

FIG. 9 shows a schematic top view of a circuit structure 54c comprising a comparatively larger sensoric region 74 when compared with the concept according to FIG. 8a, i.e., the circuit structure 54b. When compared to the circuit structure 54b, a higher amount of changes in the layers may be present, i.e., a high amount of extensions of the conductive traces $26_1$ to $26_4$ over edges of the dielectric material. By increasing the number, in return, an extension of the sensoric region may be obtained because a low amount of area is needed for symmetric winding.

A width 76 of the traces may be individual or may be globally set and may comprise, for example, a value of approximately 100 μm. Further, a spacing between two adjacent conductive traces may also be 100 μm. This allows for a configuration in which a drill attack with a drilling tool having a diameter of 300 μm damages at least two conductive traces, which is easily detectable.

As described in connection with the first aspect, the PUF-film may comprise the dielectric material so as to comprise at least one granule material being arranged in a stochastic distribution in the dielectric material so as to influence the plurality of electric capacitance values.

Figure 10:
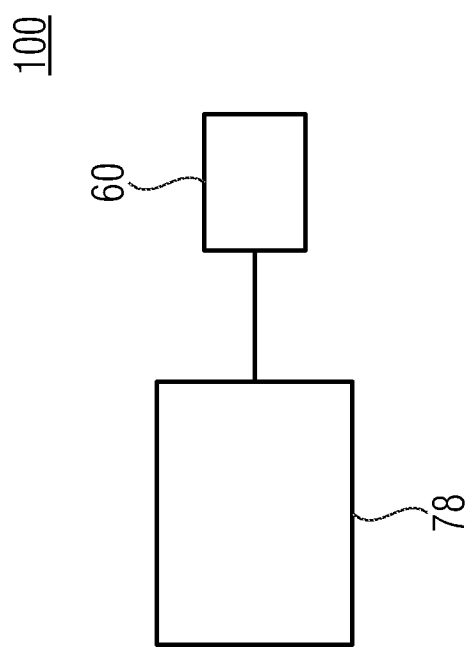
FIG. 10 shows a schematic block diagram of an apparatus according to an embodiment of the second aspect.

FIG. 10 shows a schematic block diagram of an apparatus 100 according to an embodiment of the second aspect. The apparatus 100 comprises a PUF film such as the PUF-film 60, wherein the PUF-film may comprise any of the circuit structures described herein. The apparatus 100 further comprises an evaluation unit 78 configured for differentially evaluating the electric capacitance values of the PUF-film 60 so as to obtain a first evaluation result. The evaluation unit 78 is further configured for evaluating the plurality of electric resistance values so as to obtain a second evaluation result. The first evaluation result may be a result for determining the capacitance value as precise as needed or possible within tolerable ranges, e.g., having a resolution of at least ¹⁄₂₀ of the total capacitance variation, e.g. 0.x fF at a maximum variation of ±47 fF. The second result may be in contrast a pass/fail result which determines whether the resistance values are within a tolerance range or not.

Evaluating the electric capacitance value differentially may refer to comparing absolute values of capacitance values which are, at least by means of a system layout, equal. Each of the two capacitance values may comprise an absolute capacitance value, e.g., a first absolute capacitance value between a first and a second trace and a second absolute capacitance value between a third trace and the first, second or a fourth trace.

By comparing the first and second absolute capacitance value, a differential capacitance value may be obtained.

For example, when referring again to FIG. 6a, the evaluation unit 78 may be configured for evaluating the electric capacitance values $34_{1,2}$ and $34_{2,3}$ for differentially evaluating the electric capacitance value of the conductive trace $26_1$ and $26_2$, $26_2$ and $26_3$, respectively.

When making reference again to FIGS. 7a and 7b, the capacitance values $34_{1,1}$ to $34_{2,2}$ may be evaluated differentially. When considering the layouts presented in FIG. 8a and in FIG. 9, each of the capacitance values $34_{1,1}$ to $34_{2,2}$ may be generated or influenced by a plurality of overlaps of the respective pairs of conductive traces $26_1/26_3$, $26_1/26_4$, $26_2/26_3$ and $26_2/26_4$.

According to an embodiment, the plurality of circuit elements comprise at least a first conductive trace, a second conductive trace and a third conductive trace, which are, for example, conductive traces $26_1$, $26_2$ and $26_3$. The conductive traces $26_1$ and $26_2$ both overlap with the conductive trace $26_3$. Thereby, a first electric capacitance value $34_{1,1}$ is arranged between the conductive traces $26_1$ and $26_3$, wherein a second electric capacitance value $34_{2,1}$ is arranged between the conductive traces $26_2$ and $26_3$. The electric capacitance values $34_{1,1}$ to $34_{2,2}$ may be referred to as absolute capacitance values. The evaluation unit 78 may be configured for applying a first excitation signal to the first conductive trace, e.g., at the terminal TX1, and for simultaneously applying a second excitation signal to the second conductive trace $26_2$, e.g., at the terminal TX2. The evaluation unit 78 may further be configured for receiving a response signal from the third conductive trace $26_3$, e.g., at the terminal RX1 so as for differentially evaluate the electric capacitance value between the first and the second trace $26_1$ and $26_2$. By applying the first and second excitation signal to the traces $26_1$ and $26_2$ and by receiving a resulting signal from a different trace, global effects acting on both traces $26_1$ and $26_2$ may be compensated. This may be obtained in a high quality in an embodiment according to which the evaluation unit is configured for providing the first and second excitation signal in antiphase with respect to each other, i.e., having a phase of approximately 180° whilst having a same amplitude, wherein the evaluation unit may also be configured for provide antiphasic signals within a tolerance range of at most 10°, at most 5° or at most 2° and an amplitude matching of at least 20 dB, at least 40 dB or more, advantageously at least 60 dB. An amplitude matching of 60 dB is to be understood as both amplitudes have a mismatch of at most 0.1% ($10^{-3}$). In addition to the first and second signal, further lines may be excited using at least a third and a fourth signal.

As may be seen from FIG. 7b, after having evaluated the signal received from conductive trace $26_3$, a corresponding signal may be received and evaluated from conductive trace $26_4$. For PUF-films having more than two excitation traces and/or more than two reception traces, afterwards, a different pair, differing in at least one conductive trace, of exciting traces may be used and/or different reception traces may be used.

The evaluation unit may be configured for measuring changes, i.e., deviations from one another and/or changes over time, in the (absolute) electric capacitance values $34_{1,1}$ to $34_{2,2}$ with a resolution being smaller by a factor of at least 100 (at least 2 orders of magnitude) when compared to the capacitance values $34_{1,1}$ to $34_{2,2}$. Those capacitance values $34_{1,1}$ to $34_{2,2}$ may be smaller by a factor of at least 100 when compared to the electric capacitance values of each of the conductive traces in relation to a common reference electrode, e.g., a common shielding, being referenced as Cs in FIG. 7b. The second evaluation result may be obtained by the evaluation unit 78 based on an evaluation of the electric resistance value of the plurality of conductive traces $26_1$ to $26_4$. Resistance values may be in the range of at most 100Ω, at most 70Ω or at most 50Ω This may include monitoring each of the resistance values of the individual traces 26 but may also comprise resistance values between different traces. Wherein the first case a high resistance may be a hint for a defect of attack, in the latter case, a low resistance may give a hint for an attack or a defect.

In connection with embodiments, three different capacitance values may be of interest. A first capacitance may refer to a capacitance value of a conductive trace with respect to a reference electrode and may be referred to as parasitic capacitance. A so-called absolute capacitance may be the total capacitance of a conductive trace of a first layer with respect to a conductive trace on a second layer. The differential and third capacitance may be the difference between the two absolute capacitances.

The evaluation unit 78 may be configured for compensating the first evaluation result and/or the second evaluation result for an environmental parameter such as a temperature, a humidity, ageing effects, a measure for electromagnetic radiation, a pressure or the like. Those environmental parameters may influence resistance values and/or the electric capacitance values in a known way and may thus be compensated for. For such purpose, the evaluation unit 78 may comprise respective sensor elements, may be connected to such sensor elements and/or may extract such information from the first, second, or an additional evaluation result and/or may receive information containing information about the environmental parameter. For example, the effect of temperature, humidity or the like may be pre-known to the evaluation unit so as to allow a feed-forward compensation. Alternatively or in addition, the evaluation unit may be configured for determining additional values such as the absolute capacitance value of one or more pair of traces. This may be obtained without significant additional effort because differential measurement of the capacitance values may be performed in a similar way. When compared to a differential capacitance value, an absolute capacitance value may be obtained using only one instead of at least two excitation signals.

The evaluation unit may apply an excitation signal that may comprise a same or different, advantageously lower signal amplitude for exciting the traces and for determining the absolute capacitance values. Those absolute capacitance values may also vary over time or affected by the parameters to be compensated such that by measuring the absolute capacitance values a precise compensation of the environmental parameter may be obtained. For compensation, an absolute capacitance value related to the differential capacitance value may be used. Alternatively or in addition an unrelated or different absolute capacitance value may be used based on assumptions such as a comparable influence of the external parameter on all absolute and thereby differential capacitance values.

Alternatively or in addition to receiving a respective environmental information from a sensor element, the evaluation unit 78 may be configured for using absolute capacitance values and/or measurements for compensating an environmental parameter or effect. As described, the absolute capacitance value such as one or more of the capacitance values $34_{1,1}$ to $34_{2,2}$ may be obtained by the evaluation unit by evaluating same between a pair of traces 26 of the circuit structure such as the circuit structure 32, 54 or 54a or a different circuit structure. This may be done at a first instance of time, e.g., during regular intervals of some seconds, minutes, hours or days but also only once, e.g., during manufacturing or the like. The evaluation unit 78 may further be configured obtaining the absolute capacitance value at a second instance of time, e.g., in regular intervals, at specific events such as power-up or the like or after time interval subsequent to the first evaluation. Signals used for exciting the pair of traces 26 may not have to be antiphasic because of the time difference between the measurements and the independency of both measurements. Any two different traces 26 may be used as pair of traces, wherein in PUF-films having a corresponding circuit structure, it is advantageous to use traces 26 having an overlap with each other so as to allow a comparatively high absolute capacitance value.

The evaluation result 78 may be configured for comparing the absolute capacitance value evaluated at the first instance of time and the absolute capacitance value evaluated at the second instance of time so as to obtain an absolute capacitance evaluation result, e.g., a relative or absolute difference or variation, probably set in relation with the time having expired between the first and second instance of time. Based thereon, the evaluation unit 78 may derive information related to the environmental parameter, e.g., the temperature and/or may derive a correction parameter for correcting a result of the differential measurement, so as to compensate the first evaluation result for the environmental effect.

For example, the evaluation unit 78 may have access to a memory having stored thereon the information related to the environmental parameter, e.g., in a look-up table, and/or as a function or the like. From the absolute capacitance evaluation result, by way of example, a relative deviation such as 1%, 5% or 10%, the evaluation unit may derive information that a temperature to which the device is exposed has fallen by a specific relative or absolute value such as X° C., X being any applicable value. With this temperature information or an information derived thereof, the differential measurement or result thereof may be corrected or compensated, e.g., using a function or look-up table.

Alternatively or in addition, the absolute capacitance value evaluated at the first and/or second instance of time and/or the absolute capacitance evaluation result may be used by the evaluation unit 78 for detecting an attack on the PUF-film, e.g., when determining a too fast change of the absolute capacitance value and/or a deviation exceeding the changes expected in the specified temperature range.

Based on the first and/or the second evaluation result, the evaluation unit may be configured for determining an attack on the PUF-film. The first and second evaluation result may be obtained in parallel and/or cyclically during a runtime or powered time of the apparatus. Alternatively, the first and second evaluation result may be determined during different time instances such as verifying the second evaluation result during or after a power-up of the apparatus in combination with a cyclic monitoring of the first evaluation result thereafter and during runtime.

When determining an attack, for example, when determining changes in the electric capacitance values and/or the electric resistance values exceeding a predefined threshold, then the evaluation unit may perform counter measures such as a zeroing, i.e., deleting data from a storage. In particular, decrypted data and/or unencrypted may be deleted from a storage. This may be performed, for example, by performing a re-boot and thereby resetting volatile memories and/or by actively overwriting the data. Zeroing may also comprise the deletion of a key including additional data such as raw measurement data derived from the electric capacitance values.

A further way of protecting an apparatus according to an embodiment is that the evaluation unit 78 may be configured for determining a cryptographic key based on the plurality of electric capacitance values 34 at a first instance of time. The cryptographic key may be determined or derived from the electric capacitance values with any public or secret algorithm or scheme and may be used to encrypt data used for operating the apparatus to be protected. Such encrypted data obtained by encrypting may be stored, for example, in a memory of the apparatus or in an outsourced memory. Afterwards, the derived cryptographic key may be deleted. At a second instance of time when the encrypted data is needed for operation, for example, after a power-on or re-boot, the evaluation unit 78 may, again, derive the cryptographic key from the electric capacitance values 34. The second cryptographic key will only be equal to the first cryptographic key in a case when the electric capacitance values are (within the tolerance range) unchanged. Only the unchanged cryptographic key may allow for reading and decrypting the encrypted data. Thus, when reading the encrypted data and having determined a modified or wrong cryptographic key, decryption of the encrypted data will fail. Thereby, protection of the apparatus may be performed battery-less. Although referring to encrypting and decrypting, embodiments cover alternatively or in addition other concepts of using a key such as signing and verifying data using cryptographic keys. Further, the data to be encrypted may be a key itself, e.g., a private key for RSA encryption. Using the kay obtained from the PUF-film, data may be encrypted and decrypted, wherein the decrypted data may comprise or be further keys for different encryption purpose such as signatures.

A configuration of the evaluation unit 78 may be adapted to application specific requirements. Such requirements may include, without limitation, that the system has to perform differential measurement of capacitive nodes and has to verify the integrity of the enclosure, combined in one single circuit. Such a task may have to be carried out targeting a reasonable time frame of, by way of non-limiting example, less than 1 s, e.g., less than 400 ms, less than 200 ms or less than 100 ms for measurement and detection of an intrusion so as to enable a quick countermeasure. To be able to exploit the variation of the electric properties, which may be in the range of ±20 fF, ±10 fF or ±8 fF or even less, a capacitive measurement performed by the evaluation unit may be carried out with a precision/resolution of 1 fF or higher, i.e., smaller values to be measured. Other values may be implemented without limitation. Advantageously, the resolution is high enough, e.g., $\frac{1}{20}$ with respect to an example variation range of 20 fF this results in a resolution of 1 fF or more. Other values are at most $\frac{1}{25}$ or at most $\frac{1}{30}$. With respect to cooling and system integration, the system circuit's power dissipation may be limited so as to not exceed, for example, 5 watts, 2 watts or 1 watt or even less. The deployment in a security product may implicitly involve the measurement concept not to be side-channel prone, i.e., the measurement may have to be leakage-reduced and time-constant. In addition, the chosen concept may have to be scalable to adapt the enclosure to be protected to different typical form factors of embedded systems. The circuit may support performance-optimized as well as area-optimized implementations. The explained differential evaluation may have advantages over several concepts for capacitive sensing [14] of which the following were ruled out for the application.

1) Constant current charging: A constant current is applied to the capacitor and the rise in voltage is observed. This method is unsuited for $C_m$ and $\Delta C$ measurement while the large shielding capacitance $C_s$ is present, as the measurement result will primarily show $C_s$.
2) RC/LC oscillator: The capacitor in an RC or LC oscillator sets its frequency. By measuring its period, the capacitance can be derived. This concept does not scale well, as it can measure only a single TX-RX pair at a time. Furthermore, capacitance-dependent oscillations can leak information to the outside [15].
3) TX pulse excitation, RX charge subtraction: A pulse on a single TX electrode pushes charge onto all RX electrodes. Each transferred charge is converted to a voltage and subtracted from each other in order to acquire differential measurements. Despite this method being scalable and constant-time, it showed to be infeasible. The minuscule $\Delta C$ becomes submerged in the circuit's unavoidable gain-mismatches, biases, and offsets as the circuit subtracts two similar and large mutual capacitances to obtain their small difference.

To overcome the drawbacks, the DFT-based in-enclosure differential capacitance measurement concept may be used. The basic idea is as follows: The measurement is moved from the time domain into the frequency domain. Additionally, the capacitance subtraction may be shifted into the enclosure, instead of struggling with subtraction afterwards in the analog or digital circuit. Wherever possible, analog circuitry may be replaced with digital signal processing to counteract external influences, component imperfections, and aging.

Figure 11:
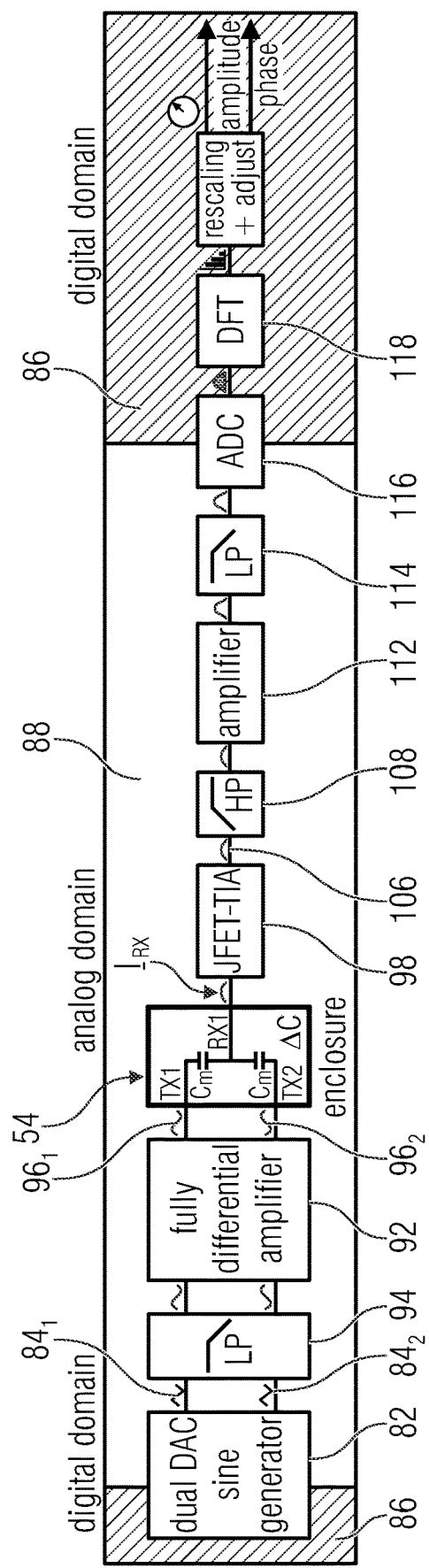
FIG. 11 shows a schematic block diagram of a measurement concept according to an embodiment of the second aspect in which three conductive traces are used.

FIG. 11 shows a schematic block diagram of a measurement concept according to an embodiment of the second aspect in which three conductive traces are used. Two for receiving signals that are optionally antiphasic and one for providing a measurement signal to the evaluation unit 78. The evaluation unit 78 may comprise a dual digital-analog-converter (DAC) as a sine generator for generating two antiphasic sine signals $84_1$ and $84_2$. The dual-DAC 82 may provide a transition between a digital domain 86 and an analog domain 88. The measurement concept may use in-enclosure currents subtraction to measure the differential capacitance by mutual cancellation of currents. The enclosure in the block diagram of FIG. 11 is exemplarily reduced to two TX electrodes and a single RX electrode, wherein enclosure refers to the PUF-film.

Some embodiments are directed to measure a variation in differential capacitances, it may be of an advantage to implement both capacitances (per design) as equal. A difference therebetween corresponds to deviation during manufacturing and thus is a PUF. A balanced electrode layout thus is directed to a capacity of both electrodes being the same, for example, by designing the areas of both electrodes as equal. A balanced electrode layout as described in connection with FIGS. 8a and 9 may ensure that neighboring TX electrodes have the same mutual capacitance Cm towards the RX electrode by design, not taking in manufacturing variation. When referring again to FIG. 7b, this may indicate, that without manufacturing variation, the capacitance value $34_{1,1}$ equals the capacitance value $34_{2,1}$ within a tolerance range. This may allow to insulate the manufacturing variation $\Delta C$ which may differ for each TX and RX combination.

To excite two neighboring electrodes, the digital-to-analog converter 82 and the subsequent amplifier 92 which receive versions of the signals $84_1$ and $84_2$ being filtered with a low-pass filter 94 may create a sinusoidal signal of amplitudes $V_{TX}$ and frequency $f_{TX}$, whereas $\omega=2\pi f_{TX}$. A phase shift of 180° is applied to the signal at the, e.g., even-numbered electrode, thereby inverting the signal. Thereby, signals $96_1$ and $96_2$ applied to different conductive traces $26_1$ and $26_2$ may be antiphasic. This may generate two currents proportional to the mutual capacitance, flowing from two TX electrodes to one RX electrode. Both currents have a 180° phase shift relative to each other. They merge on the RX electrode, resulting in the complex current.

$$I_{RX}=j\omega V_{TX}\cdot C_m+j\omega(-V_{TX})\cdot(C_m+\Delta C) \quad (1)$$

If both mutual capacitances were exactly matched ($\Delta C=0$), the capacitances and thereby the currents would completely cancel each other out. However, due to manufacturing variations, i.e., $\Delta C\neq0$, a tiny residual current will remain, described by $$I_{RX}=-j\omega V_{TX}(C_m-C_m+\Delta C)=-j\omega V_{TX}\Delta C). \quad (2)$$

Equation (2) shows that the complex current $I_{RX}$ is directly proportional to the variation in capacitance $\Delta C$. The equation is independent from $C_m$ and $C_s$, thus, neither the mutual capacitance nor the shield capacitance influences $I_{RX}$.

The RX current ranges from sub-nanoampere up to few nanoamperes. A JFET-based (junction gate field-effect transistor) transimpedance amplifier (TIA), which is a current-to-voltage converter, translates the current $I_{RX}$ into a voltage. Subsequently, the voltage is processed by high-pass (HP) and low-pass (LP) filtering and amplification stages to remove any offsets prior to amplification. Finally, the signal is digitized by an analog-to-digital converter (ADC). According to an embodiment, the evaluation unit comprises a transimpedance amplifier such as TIA 98 being configured for providing a voltage signal based on a current signal received from a circuit element.

After digitizing the signal, $\Delta C$ is reconstructed by determining the RX signal's amplitude and phase. Instead of solving this issue in the time domain the signal is transformed into the frequency domain using a digital dual-phase lock-in amplifier approach. Therefore, the system performs a frequency analysis by applying a Discrete Fourier Transform (DFT) on the digitized RX time domain signal. This filter bank splits the signal into its frequency components, thus, separating most of the noise from the signal. The amplitude of the DFT bin at $f_{RX}=f_{TX}$ is directly proportional to $|\Delta C|$. Since this returns only the absolute value $|\Delta C|$, the sign may be recovered from the phase information. A negative $\Delta C$ has a phase shift of 180° relative to a positive $|\Delta C|$. Hence, two decision regions are defined representing a negative and positive capacitance difference, respectively. This method may profit from a strict synchronization of the signal generation with the ADC data acquisition in order to preserve this phase information. In the last step, an algorithm rescales the data relative to the (arbitrarily chosen) full-scale value of ±10000. This completes the measurement circuit's data handling, as the raw PUF data is available in a usable format. As described, the evaluation unit 78 may comprise a transimpedance amplifier being configured for providing a voltage signal based on a current signal received from a circuit element, i.e., the conductive trace $26_3$.

Embodiments allow for an integrity verification method executed by the evaluation unit and directed to the electrodes, e.g., the conductive traces. Integrity may be verified during assembly of the envelope. Later in the field, the integrity verification detects tamper events. The system checks whether an electrode is interrupted or if shorts to other electrodes exist. As it is impractical to disconnect one or the other circuit, the integrity verification is combined with the capacitance measurement circuit and components are shared. This is implemented as follows.

1) TX electrodes: Integrity is verified by applying a voltage to each electrode. First, the DAC and the TX amplifier apply a constant voltage to a single TX electrode, e.g., TX1. A comparator verifies that the signal is present on the output of the electrode, named TX1R (see FIGS. 7a, 7b). In the case of an open circuit, the comparator does not detect a signal. Next, the comparator checks that the signal is not present on any other TXR output, otherwise a short exists. The circuit performs these steps for all TX-to-TXR combinations.

2) RX electrodes: Integrity verification cannot be performed the same way, as applying a voltage signal would overdrive the circuit. The measurement needs a current signal, since the RX amplifiers are current-sensitive. Therefore, a nanoampere current source is connected to the RXR end of the RX electrode. Consequently, the current flows from RXR to RX, is amplified on the RX side, and fed to a comparator. If the current passes the electrode successfully, the comparator senses a signal, otherwise an open circuit is detected. Advantageously, the comparator is prevented from sensing a signal at any other RX electrode, otherwise a short is detected. This is performed for any RXR-to-RX combination.

Figure 12:
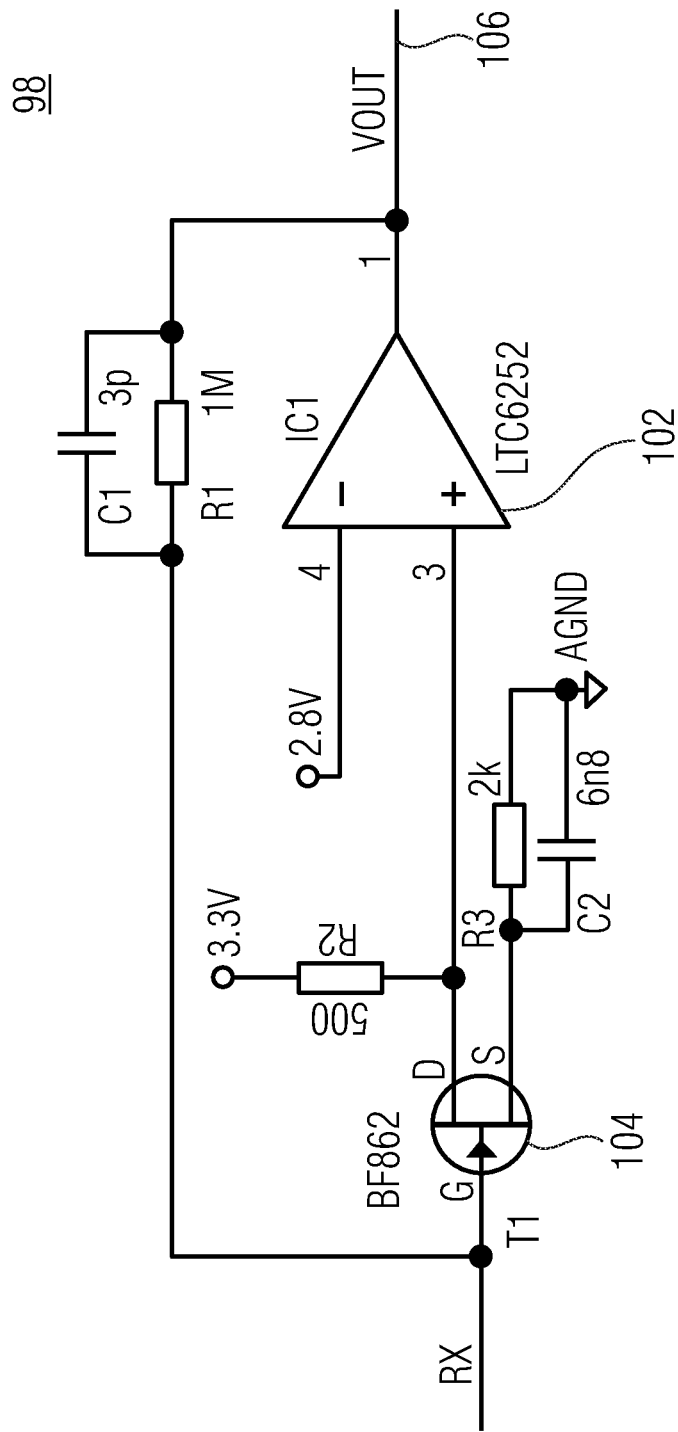
FIG. 12 shows an example block diagram of a JFET-TIA for RX current-to-voltage conversion and amplification according to an embodiment of the second aspect.

Using FIG. 12 showing an example block diagram of a JFET-TIA for RX current-to-voltage conversion and amplification, a circuit design of a part of the evaluation unit is described by non-limiting example. The JFET-TIA may be the transimpedance amplifier 98. It will be understood by those skilled in the art, that a same functionality may be implemented with different circuits and that the evaluation unit may also be equipped with different functionality alternatively or in addition to the description provided hereinafter.

The system may be designed to run on a single supply $V_{DD}$ of 3.3 V, as this voltage is available in most systems. Therefore, the analog circuitry is arranged around a center voltage of $V_{DD}/2=1.65V$.

The example measurement system is controlled by a STM32F303 microcontroller. It features an ARM Cortex-M4 core including a floating-point-unit (FPU) and signal processing extensions. Additionally, the microcontroller provides all peripherals, such as DACs, ADCs, direct memory access (DMA), and zero-waitstate core-coupled-memory (CCMRAM). The system is well suited for our measurement, as DAC signal generation and ADC signal acquisition can be configured to run in hardware, freeing the CPU from load.

For the example and therefore not limiting measurement, an excitation signal of 1 V RMS is applied with a frequency of $f_{TX}$=33.3 kHz. The frequency has shown to be an adequate trade-off between several optimization goals and limits. Nine periods of the excitation signal are generated, whereas one period is for circuit startup and eight periods are for measurement, resulting in only 270 μs per node. The signal acquisition operates with 12 bit resolution at 5.14 MS/s to oversample the signal for noise reduction.

1) TX Excitation: For obtaining ideal antiphasic signals, both signals may be matched in amplitude and show a relative phase shift of 180°. An amplitude imbalance or phase error would otherwise create an offset in the extracted PUF data, as the enclosure-internal current cancelation would no longer work correctly. As a rule of thumb, the TX signal imbalance should be at least an order of magnitude smaller than $\Delta C/C_m \approx 1/1000 = -60$ dB.

For signal generation, the circuit uses three stages. First, two amplitude-matched and inversely phased 33.3 kHz signals are generated by the microcontroller's DAC. A second-order low-pass filter follows in the signal-processing chain to remove the 1 MHz DAC sampling frequency. As the DAC itself does not provide sufficient amplitude-matching, the signal is fed to a fully differential amplifier. It improves the signal quality by guaranteeing the phase shift and amplitude matching. The THS4551's output balance is specified to 85 dB, providing sufficient signal quality for our measurement [16].

2) RX Current Amplification: The RX current in the nanoampere range needs an amplifier with high gain and low noise. Furthermore, the RX node has high capacitive load, caused by the shielding capacitance $C_s$, which is present at the amplifier's input and reduces its bandwidth. Additionally, the amplifier's input bias current advantageously does not exceed a certain level, otherwise the TIA will be over-driven by the bias current, rendering RX current measurement impossible. Therefore, a design showing low noise, high gain bandwidth product (GBW), and low bias current is needed, which cannot be provided by a single operational amplifier.

To overcome this issue, the basic idea of a JFET-based TIA setup is adapted, which is often used in optics to amplify a tiny photodiode current at a node of high capacitance [17]. Our adjusted circuit is depicted in FIG. 12. The circuit combines a high GBW operational amplifier with a low input bias JFET (IT1) to create an improved TIA. The JFET acts as pre-amplifier in the circuit. The components R2 and R3 set the DC operating point of the circuit. Thereby, $V_{OUT}$ as well as the RX electrode voltage are set to a DC steady-state voltage of approximately 1.65 V. For example, the GBW may be 720 MHz, wherein, depending on the size of the PUF-film and the layout, a lower value may be sufficient or a higher value may be needed. The TIA allows for a low noise and allows the circuit to be robust against operation-amplifier-bias-currents. According to other embodiments, the JFET may be substituted or may be missing. For example, the operational amplifier may be connected as a transimpedance amplifier directly on the PUF-film. Although this may lead to an increase of noise and/or a requirement to use special operational amplifiers, this may allow for a simple layout.

The circuit implements a control loop that maintains 1.65 V at the RX electrode by varying the output voltage $\underline{V}_{OUT}$. The RX electrode current $\underline{I}_{RX}$ causes a slight increase in RX voltage, causing the JFET to open and carry more current via its drain-source channel. This decreases the voltage at the non-inverting input of the operational amplifier. It leads to a decrease in output voltage $\underline{V}_{OUT}$ that pulls current through the feedback network R1∥C1. This reduces the RX voltage to its original level. The equilibrium is reached when the current through the feedback network is equal to the RX electrode's current. The impedance of the feedback network controls the relation between $\underline{I}_{RX}$ and $\underline{V}_{OUT}$ i.e., it sets the TIA's gain. With this configuration, the TIA has a gain magnitude of $0.8 \cdot 10^6$ V/A at an excitation frequency of 33.3 kHz and $1.0 \cdot 10^6$ V/A at DC.

After the JFET-TIA has converted the RX current into a voltage, a high-pass filter 108 strips its DC component. To further amplify the signal, it is fed to an inverting amplifier 112 with a gain of $-100 \triangleq 40$ dB which scales the signal to the ADC's dynamic range. This amplifier is implemented as active first order low-pass filter 114 to prevent aliasing during digitization. The low output impedance of the active filter allows the signal to be directly connected to the ADC 116 (Analog-to-Digital Converter) without a buffer.

3) TXR Integrity: The TX electrode integrity verification pulls a single electrode to a higher voltage and checks whether this increase is seen at TXR. The DAC and TX amplifier are already able to perform this. Thus, no additional circuitry is added at the TX side. On the TXR side, a LT1719 comparator senses whether the voltage exceeds the threshold of 1.87V.

4) RXR Integrity: The RX electrode integrity verification injects a current into RXR and measures the resulting signal at RX. Since the integrity verification is an open/short test, the requirements on the accuracy of the current are relaxed. To implement a coarse current source, each RXR input is connected in series to a diode, a 3 MΩ resistor, and a digital output. During RX integrity verification, a single digital output is set to 1 (3.3 V) while all others remain at 0 (0 V). The RX electrode has a fixed voltage of $V_{DD}/2$=1.65 V and the diode's forward voltage is about 0.4 V, which results in a current of approximately 0.4 μA flowing into the RX electrode. All outputs set to 0 do not carry current, since the diodes at the RXR electrode are reverse-biased. The RX TIA converts the 0.4 μA current to a voltage of $V_{DD}/2$−0.4 V=1.25 V. The subsequent comparator, set to a threshold of 1.45 V, senses this voltage and reports an intact electrode on success.

For an example implementation, an LT1719 comparator is used, BAS516 diodes, and 74HC595 shift registers as digital outputs, controlled via SPI.

The signal processing extracts the amplitude and phase from the RX signal using a dual-phase lock-in amplifier. The ADC sampling may be strictly synchronized with the DAC excitation since the internal DAC signal serves as lock-in reference signal. This is achieved by interconnecting microcontroller peripherals such as timers, DMA, ADC, and DAC, providing a fixed phase relation for acquisition.

Next, a windowing function is applied to the data. Since the frequency of interest is known, a rectangular window covering eight full periods of the signal is used. By choosing an integer number of periods for the window length, most information is preserved and spectral leakage at this frequency is not observed.

Computing a dual-phase lock-in amplifier in software is computationally expensive, as it involves two multiplications, two additions and two sine-table lookups per sample. The same result can be obtained by applying a DFT 118 on the digitized signal and evaluating the bin, corresponding to the reference frequency. A performance-optimized algorithm may be used according to an embodiment. Such an algorithm is available to compute a single bin DFT, named Goertzel-Algorithm [18]. It needs a single multiplication, addition, and subtraction per sample, but no table lookups.

The algorithm runs on the FPU which delivers single-cycle multiplication, addition, and subtraction. All intermediate values are kept in FPU registers continuously, speeding up computation. Performance is further increased by moving the algorithm from flash memory into CCMRAM. This reduces the computation time for one node by 25% down to 258 µs.

When referring now to FIGS. 13a and 13b in which FIG. 13a shows a schematic block diagram of an apparatus 130 according to an embodiment of the second aspect, in which multiplexors, e.g., analog multiplexors may be included, and in which FIG. 13b shows a schematic photography of an experimental setup, a dual multiplexor 122 may be connected to input terminals of conductive traces so as to variably apply not necessarily antiphasic signals, e.g., the signals $96_1$ and $96_2$ to conductive traces. A multiplexor 124 may be configured for providing for a respective circuitry on the second end of the conductive traces. A multiplexor 126 may be configured for multiplexing the conductive traces in the second layer, wherein those traces may be connected to a current source 128 so as to facilitate measurements. The evaluation unit may comprise analog circuitry 132 and/or digital circuitry 134 as well as communication and debug interfaces 136, wherein the latter are optional. Alternatively or in addition, the evaluation unit may also be implemented without digital circuitry. The concept may scale the circuit to N×M enclosures.

c. Scaling the Circuit

In order to scale the circuit to an example N×M enclosure, analog multiplexers are introduced, as shown in FIG. 13a. On the TX side, a dual multiplexer with N/2 outputs each is needed. The first one connects the 0° excitation signal to odd-numbered electrodes, the second multiplexer connects the 180° excitation signal to even-numbered electrodes. On the TXR side, a single multiplexer with N inputs is connected between the TXR outputs and the TX integrity verification comparator. On the RX side, an M input multiplexer is connected after the first stage RX amplifiers. On the RXR side, no multiplexers are needed. The current source can easily be scaled by adding more shift registers, i.e., a corresponding number of resistances and diodes may be included which may be controlled by the registers.

Depending on the desired speed-to-area trade-off, the circuit can also be scaled by parallelization by adding further comparators and signal-processing chains. However, the example circuit is area-optimized.

An example circuit may be implemented for a 16×16 enclosure. The experimental setup is shown in FIG. 13b. The circuit features a four-layer board, providing power planes and shields, separating analog and digital signals. The device is divided into three regions, the analog measurement circuit, the digital circuit, and the debug interfaces. An external board was added, replacing the original TX amplifier with an improved version.

On average, the circuit draws 132 mA on the analog rail and 43 mA on the digital rail at 3.3 V. This results in a power dissipation of 0.6 W which is within specification.

The measurement circuit supports a full-scale range of ±73 fF (±10,000 points) at a theoretical digital resolution of 7.3 aF. However, precision is limited by the circuit's measurement noise of 0.3 fF ($\approx$41 points) in the current setup. The analog measurement takes 270 µs, the DFT signal processing takes 258 µs, resulting in a measurement time of less than 0.6 ms per capacitive node.

Prototypes of the enclosure were manufactured in a four layer thin-film technology. Within an area of 144 mm×70 mm, they contain 16 TX and 16 RX electrodes, whereas each TX-RX combination has 990 track overlaps. Due to the differential readout this yields 128 differential PUF nodes.

Figure 14:
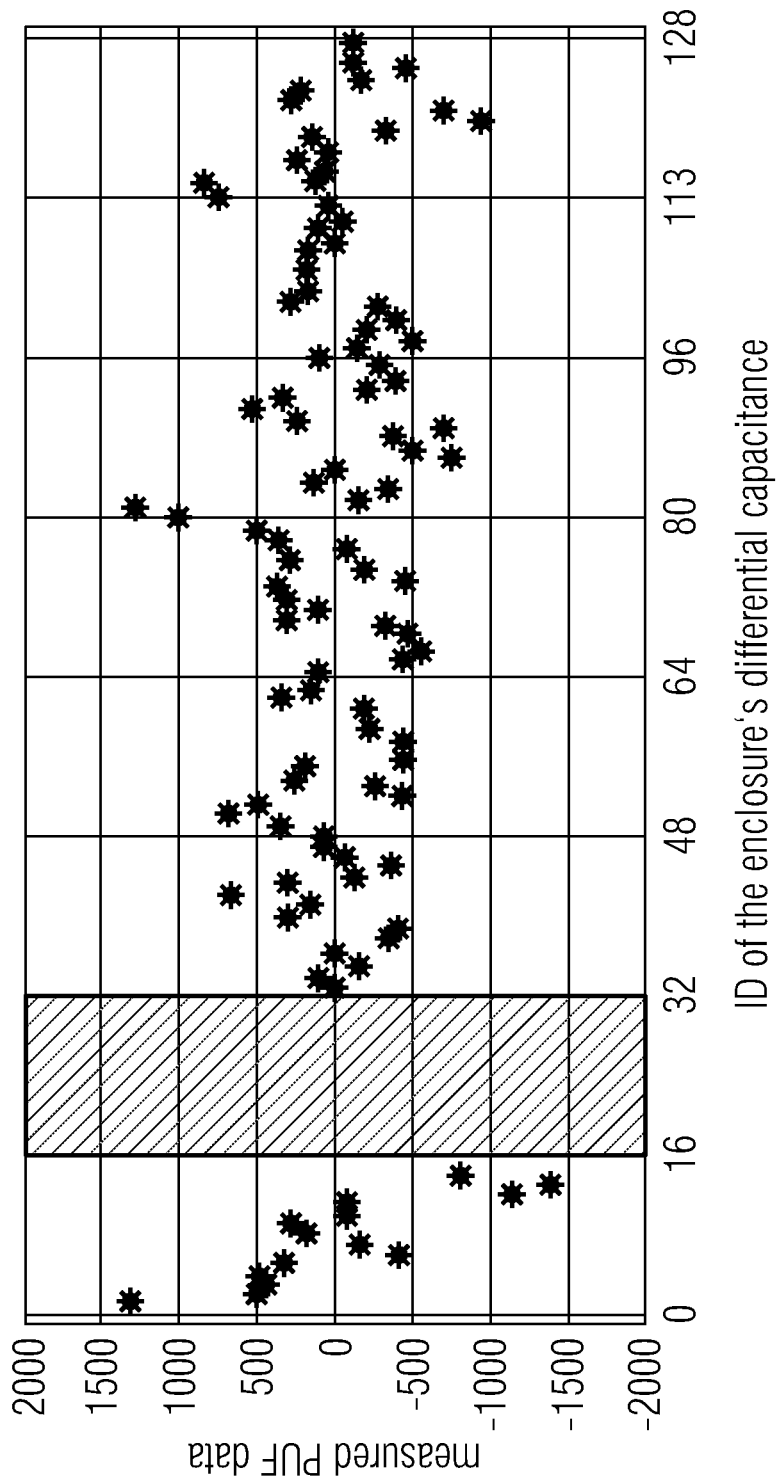
FIG. 14 shows exemplary results for the extracted differential capacitance of the apparatus of FIG. 13a after early preprocessing and a successful detection of an integrity error in one electrode.

Different foils may be used. The integrity verification detects shorted and interrupted electrodes correctly. The PUF measurement circuit extracts the differential capacitance variation from the enclosure foil. Exemplary results for the extracted ΔC after early preprocessing are depicted in FIG. 14. Each data point represents one differential capacitive PUF node. The first 16 data points show RX1 to RX16 excited by the first TX pair TX1-TX2. The plot continues with RX1 to RX16 excited by TX3-TX4 until RX1 to RX16 excited by TX15-TX16. The data of each TX group has a mean value of zero, since TX group offsets are removed during preprocessing. The highlighted column shows the successful detection of a defect in the TX3-TX4 electrode pair. This demonstrates that both features, the integrity verification as well as differential capacitance measurement work correctly.

Extracted PUF data from several foil enclosures using the same measurement circuit shows no characteristic patterns visible across the measured data of different foils. Furthermore, when measuring the same foil using two measurement circuit boards, the resulting data is highly similar with a correlation coefficient of 0.998. Thus, the vast majority of entropy is extracted from the foil with negligible influence of the measurement system. All in all, this measurement circuit implementation verifies that our circuit concept for differential capacitive PUF readout is valid and may be practically feasible.

Combining both properties has the advantage of protecting a system during operation by integrity measurements and during non-operating phases, like storage or transport, by a key derived from a PUF at runtime. This has a significant impact on the usability of such tamper protected products: It relaxes storage and transport requirements and also extends their lifetime. These advantages are accompanied with the challenge to measure capacitance variation that is several orders of magnitude smaller than the nominal values while fulfilling strict timing constraints defined by the security requirements. Some embodiments solve all of these challenges in one circuit. The concept is practically feasible by implementing and testing a prototype, which successfully evaluates a 128 node differential capacitive PUF enclosure. Despite the variation is only a few femtofarads and is hidden behind large parasitic capacitances, this PUF property was successfully extracted by our circuit in the specified time and precision. Since the concept can be scaled by two parameters, i.e., enclosure electrode count as well as speed vs. area, it becomes a flexible building block for secure PUF-based enclosures.

Embodiments of the second aspect refer to a differential measurement concept for capacitive PUF-based security enclosures whose parasitic capacitances are orders of magnitude larger than the PUF variation. The embodiments refer to a scalable circuit design enabling enclosure integrity verification as well as capacitive PUF measurement in the range of milliseconds. Further, embodiments refer to a proof-of-concept implementation of the proposed circuit and practical verification using an enclosure prototype. Due to the high complexity of the overall system, example descriptions are sometimes limited in view of a number of measurement components, wherein other components such as key generation and enclosure design are not included in detail. According to embodiments, a differential capacitive measurement inside the enclosure is performed by applying stimulus signals with 180° phase-shift that isolate the local manufacturing variation in the femtofarads range. The analog circuitry an corresponding digital signal-processing chain, using a microcontroller-based digital lock-in amplifier, perform precise PUF digitalization. The system's measurement range may be approximately ±73 fF in embodiments, wherein this shall not limit the invention described herein. The conversion time per PUF node may be less than 0.6 ms and the raw data may show a measured noise of 0.3 fF. This may be a base for a high-entropy key generation while enabling a short system's data time. The circuit is scalable to the enclosure size and may experimentally verify to extract information from 128 PUF nodes, using a circuit prototype. A two-layered mesh may contain orthogonally routed electrodes (conductive traces). They may serve as dual-purpose, as they are checked for integrity and are evaluated as PUF at the same time. The PUF behavior may be contained in the variation of capacitive coupling between electrodes in the enclosure. PUF property extraction may be challenging since the capacitance variation lies within the range of only several femtofarads while parasitic capacitances of hundreds of pico-farads are present. This may be solved by differentially evaluating the electric capacitances. Furthermore, the influence of the measurement circuit on the PUF may be minimized in embodiments. Therefore, the system may use a specialized measurement circuit which can extract the PUF property precisely and may also verify the mesh integrity. Both measurements may be interlocked to obtain a secure system. The PUF may prevent simple jumper attacks, as additional wiring will have non-negligible impact on the PUF property. In return, the integrity verification prevents an attacker from splitting off regions of the capacitive PUF. While there are concepts for integrity verification as well as for capacitive PUF sensing in known concepts, embodiments provide for a combination thereof.

The third aspect of the present invention is directed to obtaining a reliable measurement and to protect devices with PUF films and apparatus according to embodiments. Known tamper-resistant enclosures and envelopes are battery-backed envelopes that enclose the system and thereby protect it from tampering [2].

The aforementioned battery-backed envelope is made of a flexible polymer with a printed conductive mesh. Additionally, it is potted using an opaque resin with the following properties: difficult to penetrate and to remove, either mechanically or using solvents. The mesh serves as a resistive sensor which is continuously evaluated. The mesh tracks are routed on multiple layers in a serpentine pattern with no visible gaps such that penetrating the mesh very likely causes a detectable change which triggers the zeroization, i.e., countermeasures of the apparatus which may include a deletion of memory content. Due to the wrapping of the envelope, this mesh obstructs any possible angle of an attack. Additionally, its tracks are invisible to optical inspection or x-rays and a device-specific layout randomization further increases the difficulty of attacks.

This mechanism ensures security assuming that sensitive data is kept only in volatile memory and a continuous power supply is available for the BBRAM and monitoring circuit, even when the device itself is powered off. Therefore, the monitoring circuit is armed at the factory and supplied by the battery throughout the product lifetime including its shipping. This is unfavorable since environmental conditions during transport often exceed those of the intended operating environment in terms of peak temperature, vibration, etc. The actively running battery-backed monitoring circuit is subject to these conditions and as a result is more likely to cause false alarms. After arrival, maintaining the battery is needed [8]. Another approach measures the difference in fringe-effect capacitances of the enclosure due to intruding objects [3].

It also relies on a battery-backed mechanism and therefore suffers from similar limitations.

The aforementioned issues could be solved if the device did not involve a battery. This can partially be achieved by PUFs which offer a hardware-intrinsic key storage without a dedicated memory for the key [19], [10]. They make use of random variations of manufactured structures to derive an individual behavior for each device. In order to harness the PUF properties, these variations have to be extracted. They are similar for each read-out of the same device but subject to noise and also affected by environmental changes.

Secure key derivation with PUFs is a common use case [20]. During PUF enrollment at the factory, the key is derived for the first time and discarded after helper data is created and stored, to enable later error-correction. During reconstruction in the field, helper data and the noisy PUF response are combined to derive the initial secret. PUFs can be integrated into IC designs, but they typically only offer limited tamper-resistance [12], especially for other system components. Therefore, it is focused on non-silicon PUFs in the following.

One such example is the Coating PUF [21] that protects an IC by covering its top with a randomized coating material, which is measured to extract its unique properties and derive a secret key. Reconstructing this key is infeasible if the coating has been damaged due to an attack. A similar approach using an optical PUF is presented in [22]. Both approaches do not address attacks during runtime. Furthermore, covering every IC of an embedded device with a coating involves a costly, fully customized sourcing of its components. Moreover, access to the PCB would still be possible and therefore simplify various attacks, e.g., voltage glitch or side-channel attacks.

Based on the requirement to protect a system as a whole, Vai et al. present an optical waveguide coating PUF [23] with a corresponding system architecture in [24]. As the waveguide only covers the top of a PCB, its edges and bottom remain unprotected. Moreover, such a system can be attacked during runtime to extract keys in volatile memory. Therefore, implementing a runtime tamper detection that monitors the system after power-on is vital to detect possible tampering attempts. This is not mentioned in [24].

The enclosure traces may be manufactured from a material of non-zero ohmic resistance that may influence the result of the differential or non-differential capacitance measurement. Therefore it may be advisable for the system not only to use the capacitive measurement result for key derivation but the measured complex impedance, also containing information about the resistive properties of the enclosure.

For performing a measurement of the absolute capacitance values, the evaluation unit may be able to conduct a third measurement that yields the mutual/absolute capacitance of a TX to RX combination. This is not a differential measurement, thus, the resulting capacitance is, for example, $C_{11}$ in FIG. 7b. The evaluation unit can measure any TX to any RX combination from C11 to C22 according to the example envelope in FIG. 7b.

For the aforementioned measurement, the evaluation unit outputs, by way of example, only a single TX signal which is a sine wave of 33.3 kHz but with reduced amplitude. (Since this is a single signal, the phase does not matter and may be arbitrary/uncontrolled and may later be ignored by the evaluation unit during signal processing). (Technical Background: The microcontroller possibly still generates two sine signals, but only one multiplexer is activated, thus, only a single sine signal arrives at the envelope) The remaining signal chain is unchanged, amplifies and converts the signal. The digital signal processing chain processes the acquired signal and may use the same algorithms as for the differential measurement. The absolute measurement result may be used to compensate effects such as ageing, humidity, and temperature.

Figure 15:
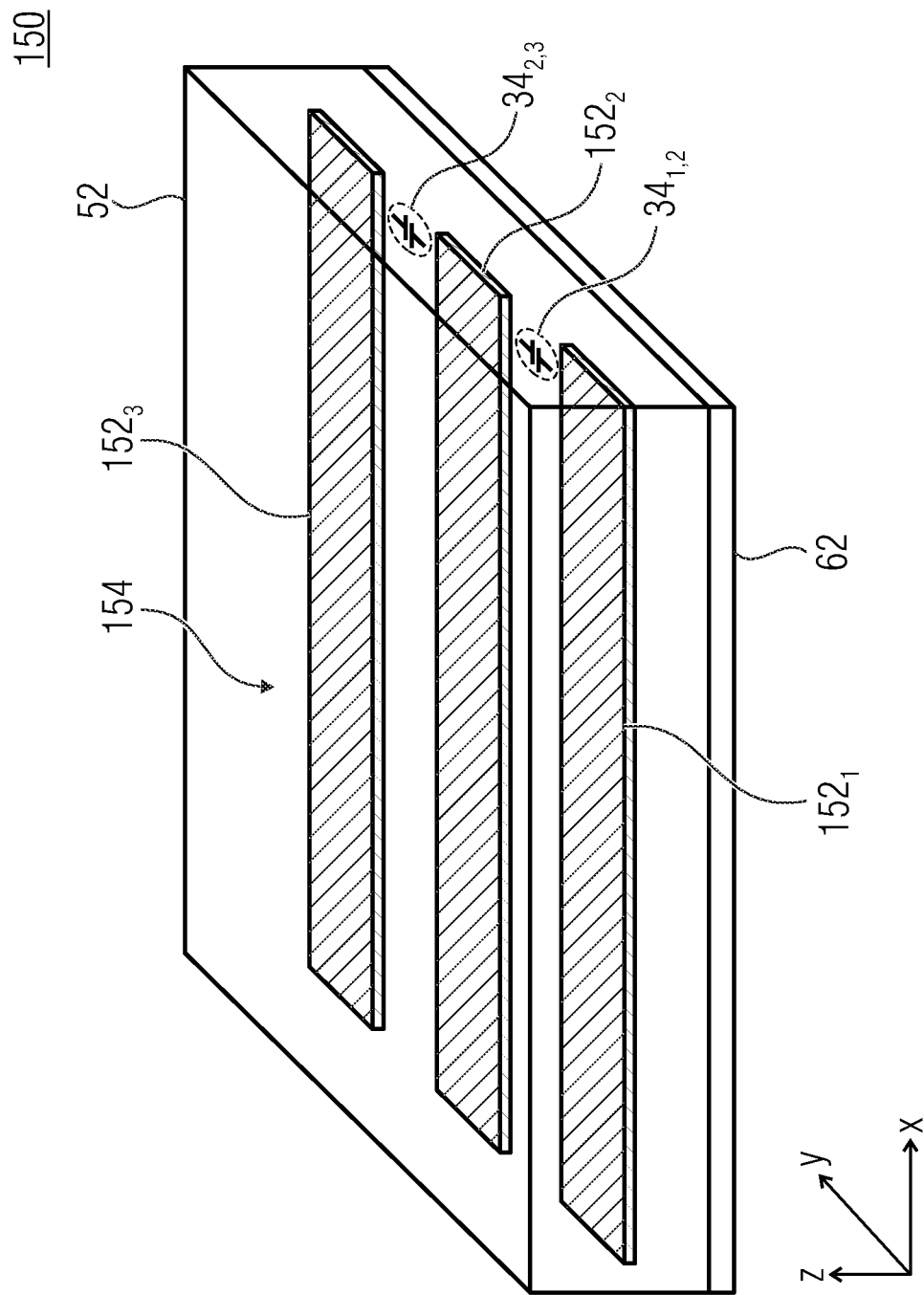
FIG. 15 shows a schematic perspective view of a PUF-film according to an embodiment of the third aspect.

FIG. 15 shows a schematic perspective view of a PUF-film 150 according to an embodiment of the third aspect. The PUF-film 150 comprises circuit elements 152₁ to 152₃ arranged so as to form a flat circuit structure 154 which may be incorporated, at least partially, in the PUF-carrier 52 which may comprise, as described in connection with the second aspect, one or more granule materials. An example granule material may be, for example, a dielectric material such as $TiO_2$, TiN or the like. The granule material may comprise particles as they are used for coating PUF. When using more than one granule materials, a first granule material may comprise a dielectric constant of $\varepsilon_1$ and a second granule material may comprise a dielectric constant of $\varepsilon_2$. According to an embodiment, $\varepsilon_1$ may be a multiple of $\varepsilon_2$ and the share of particles comprising $\varepsilon_2$ may be lower when compared to the share of particles having $\varepsilon_1$. This may allow for a locally varying mixing ratio and to a local strongly varying capacitance variation and therefore to a high entropy.

Features of the first and/or second aspect may be combined with features of the third aspect. For example, the dielectric layer 28 may cover the conductive trace layer, the structured electrode layer 32 partially so as to leave the region 44 uncovered from the dielectric layer 28. Conductive traces of the trace layers 32₁ and 32₂ may be galvanically connected or coupled in the region 44 due to the traces of the structured electrode layer 32₁ extending beyond the edge of the dielectric layer 28.

The circuit structure 154 being a flat circuit structure may be understood as comprising a flat or aerial extension, for example, an extension along directions x and directions y being at least 10 times or at least 100 times larger when compared to the thickness direction, indicated as z. By way of non-limiting example, the flat circuit structure 154 may be formed as the circuit structure 54, 54a, 54b or 54c. The PUF-film 150 further comprises the shield 62 being formed as a flat electric shield. The shield 62 formed as a flat shield is understood as covering an area of the flat circuit structure 154, i.e., being flat a same was as described for the flat circuit structure 154. Being flat may refer to as being arranged in one layer, wherein the layer is not limited to be only two-dimensional but may also bend.

The circuit structure is evaluable with respect to the plurality of electric capacitance values 34₁,₂ and/or 34₂,₃ being arranged between the plurality of circuit elements 152₁ to 152₃ that may be formed as the conductive traces 26.

The electric shield 62 at least partially covers the circuit structure 154, advantageously in a large area and more advantageously at least in a sensoric region and provides for a common reference electrode of the plurality of electric capacitance values. As an optional feature in the third aspect, the plurality of circuit elements 152 may further be evaluable with respect to a resistance value as described in connection with FIG. 6a. Such an embodiment may be understood as the PUF-film 60 being combined with the shield 62.

The shield 62 may be arranged at the PUF-carrier 52 prior to attaching the PUF-film 150 to a device to be protected. For example, the shield 62 may be formed as a metallic layer, e.g., as a film or foil or the like. According to an embodiment, the shield 62 is at least partially formed as a metallic mesh allowing for a high flexibility when wrapping the PUF-film 150 around a housing or case of a device to be protected.

Alternatively to arranging the shield 62 prior to combining the PUF-film 150 with a device to be protected, the shield 62 may also be arranged afterwards. For example, the conductive foil or conductive mesh may be arranged after having wrapped the foil around the housing. Alternatively, the shield 62 may be a sprayed conductive layer, i.e., may be formed by spraying or vaporizing, i.e., generating, the conductive layer 62 after having wrapped the PUF-film around the housing. I.e., one or more of the shielding layers, in particular an outer shield may be generated after having wrapped the PUF-film around a device to be protected, e.g., a housing.

Alternatively, embodiments cover both, i.e., a PUF-film 150 having already the shield 62 and being extended by a sprayed layer.

Figure 16A:
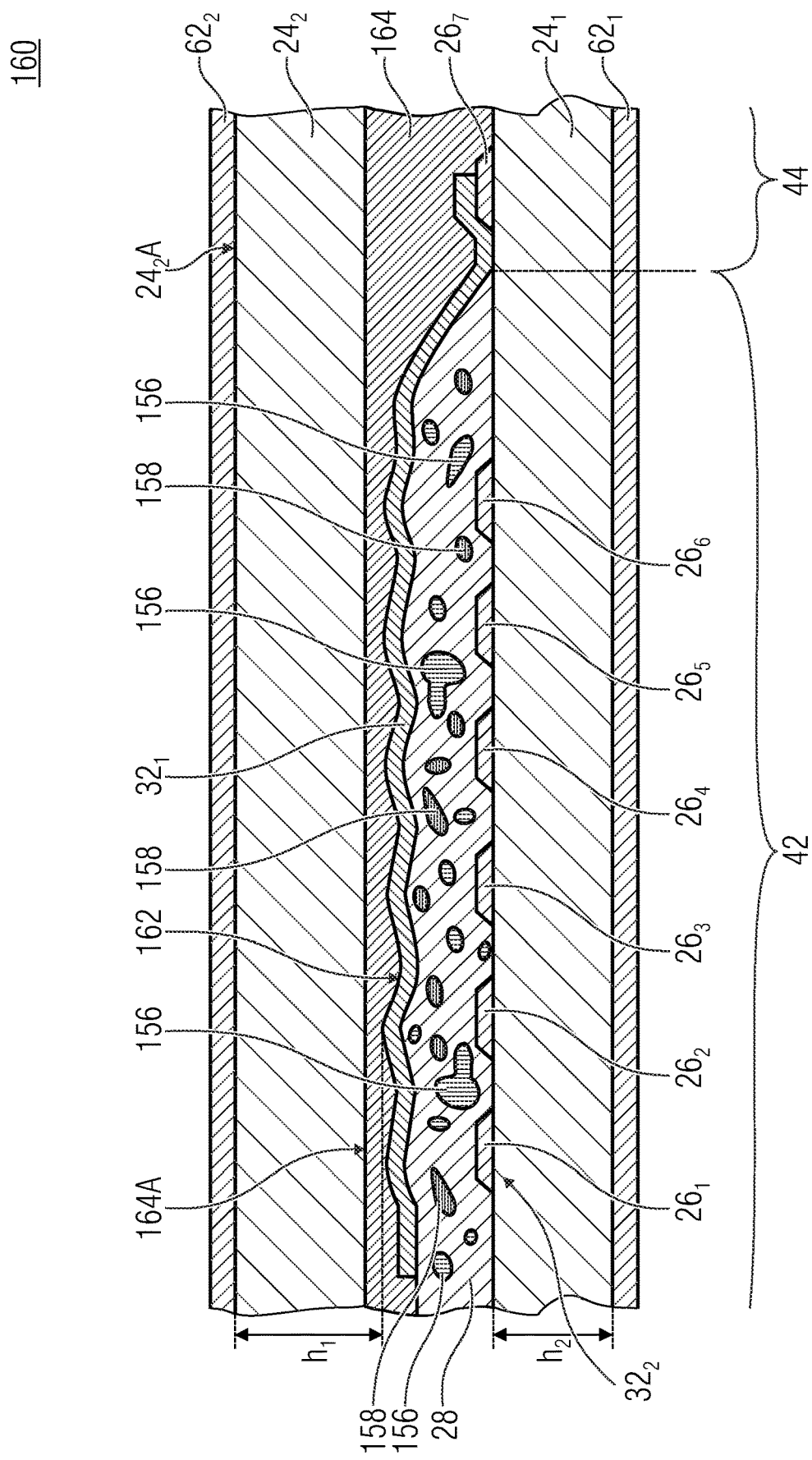
FIG. 16a shows a schematic side view of a PUF-film according to an embodiment of the third aspect that may be produced with a method according to the first aspect.

FIG. 16a shows a schematic side view of a PUF-film 160 that may be produced with a method according to the first aspect and such as the PUF-film 150. When compared to the PUF-film 20, the PUF-film 160 comprises a shield layer 62₁ covering the film substrate 24₁ carrying the conductive traces 26₁ to 26₇. With respect to a method for producing the PUF-film 160, the substrate may be provided so as to already comprise the shielding and/or the conductive traces. Alternatively, as described, the shielding may also be arranged afterwards and/or the conductive traces 26₁ to 26₇ may be arranged onto the film substrate 24₁ prior to printing the dielectric layer 28.

The dielectric layer 28 comprises a first granule material 156 and a second granule material 158, wherein the granule materials 156 and 158 may vary when compared to a dielectric constant, a temperature coefficient, a resistance value and/or a density or the like. The granule materials 156 and/or 158 may be arranged in a stochastic distribution so as to influence the plurality of electric capacitance values. On a side 162 of the structured electrode layer 32₁ opposing the conductive traces 26₁ to 26₇ a filling layer 164 may be arranged, for example, using a printing process. The filling layer 164 may comprise dielectric material which may be, for example, a same material as the dielectric layer with or without the granule material or may be a different material. The filling layer 164 allows for obtaining a plane surface of the layer stack. On a side 164A of the filling layer 164, the side 164A opposing the structured electrode layer 32₁, a further film substrate layer 24₂ may be arranged. The film substrate layer 24₂ may be a same or a different material when compared to the film substrate 24₁ and may serve as a spacer between a further shielding layer 62₂ arranged on a side 24₂A of the film substrate 24₂ opposing the filling layer 164. The filling layer 164 in combination with the substrate $24_2$ may allow for generating a distance $h_1$ between the structured electrode layer $32_1$ and the shielding layer $62_2$ being, within a tolerance range of at most 30%, at most 20% or at most 10%, equal to a distance $h_2$ between the conductive traces, e.g., $26_1$ and the shielding layer $62_1$. The rough or uneven structure of the structured electrode layer $32_1$ may prevent a complete equilibrium between the distances $h_1$ and $h_2$ by approximating such a condition with the filling layer 164 being as thin as possible whilst generating an even surface and the film substrates $24_1$ and $24_2$ comprising a same thickness may allow for almost symmetrically shielding the capacitance values of the PUF-film.

According to an embodiment, the circuit elements, i.e., the structured electrode layer $32_1$ and/or the structured electrode layer $32_2$ may be covered at least partially with a material being opaque in a visible wavelength range and/or in an x-ray wavelength range. Such a material may be directly deposited on the respective structured electrode layer $32_1$ and/or $32_2$ on one or both sides thereof but may also be different and possibly contactless with respect to the structured electrode $32_1$ and/or $32_2$ layer within the layer stack. An example material may be an opaque polymer material, an opaque glass material, a semiconductor material or the like. Alternatively or in addition, a polymer material such as a carbon material such as a carbon paste may be arranged in the PUF-film and forming one or more layers thereof. Carbon material may be opaque as well in the visible wavelength range of, for example, 380 nm to 780 nm and the x-ray wavelength range ranging from, for example, 1 pm to 10 nm. Alternatively, a conductive material may be used, for example, a silver paste or the like. Silver paste may allow for an opaqueness but may be formed conductive based on the degree of filling of the silver in the paste. Alternatively, the opaque material may comprise PEDOT/PSS, inks comprising carbon nanotubes or the like as well as thin metal layers According to a further embodiment, the material being referred to as opaque material may be alternatively or in addition be formed so as to comprise a within a tolerance range of 10%, 5% or 2% a same absorption coefficient when compared to the conductive traces and/or the shield at least in the relevant optical regions such as X-ray and/or visible wavelength. This generates a kind of opaqueness as the traces, shielding and the rest may form a homogenous area hampering diversification of structures. The traces thus become invisible.

When referring to the structure illustrated in FIG. 16a, the opaque material may be one or more of the layers $24_1$, $16_4$ and/or $24_2$ and/or may be an additional layer between the shielding $62_1$ and $62_2$ or outside thereof. For example, the opaque material may be arranged outside a range sandwiched between the shielding layers $62_1$ and $62_2$ and may again be covered with a further shielding being a mesh and/or a sprayed layer. Alternatively to arranging a further substrate, the layer 164 may be formed so as to comprise the thickness $h_1$.

As illustrated in FIG. 16a, the advantage of interconnecting two different structured electrode layers $32_1$ and $32_2$ over a material edge of the dielectric layer 28 may also be used in embodiments of the third aspect.

As described in connection with the first and the second aspect, the plurality of capacitance values may be arranged at least partially in an overlap area of conductive traces arranged in different conductive trace layers and overlapping with each other. As described in connection with FIGS. 8a and 9, an arrangement of the conductive traces of the PUF-films 150 and/or 160 may be so as to allow for a condition where conductive traces arranged in a first trace layer (first structured electrode layer) and conductive traces arranged in a second trace layer (second structured electrode layer) are arranged in an interleaved manner such that at least one, a plurality thereof or each conductive trace is exclusively neighbored by a different conductive trace along an actual course of the trace. As described in connection with the second aspect, the PUF-films 150 and/or 160 may be configured so as to allow an evaluation of the structured electrode layers, the conductive traces thereof respectively with respect to electric capacitance values arranged there between and electric resistance values thereof.

Further layers possibly having at least one additional granule material may be arranged between the conductive trace and the adjacent or juxtaposed shield or outside the overlapping regions so as to further adapt the capacitance measured between the structured electrode layers.

Figure 16B:
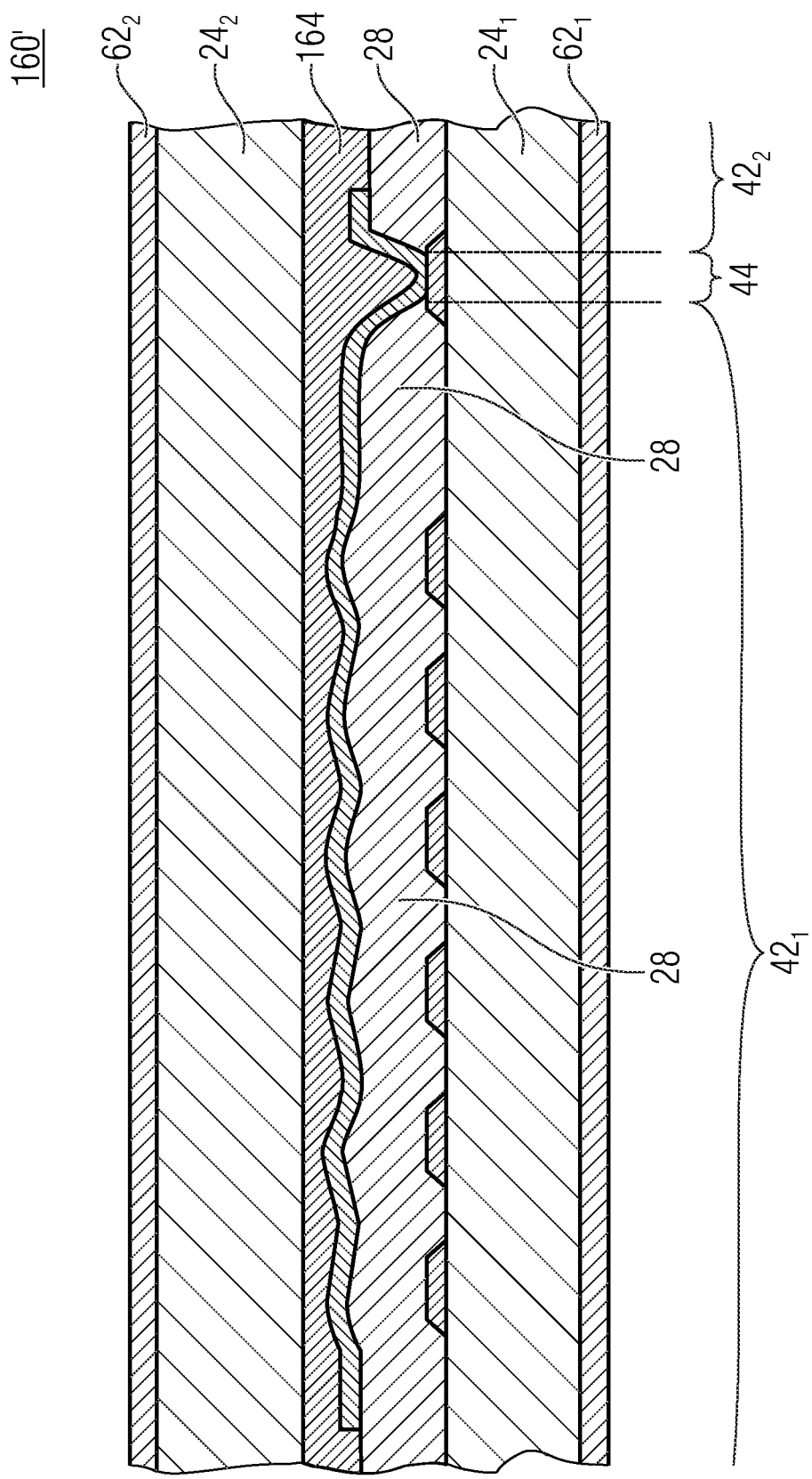
FIG. 16b shows a schematic side view of a PUF-film corresponding to the PUF-film of FIG. 16a with exception of an absence of granule material.

FIG. 16b shows a schematic side view of a PUF-film 160' corresponding to the PUF-film 160 with exception of an absence of the granule material. A further first region $42_2$ may be arranged in which the dielectric layer 28 is printed such that the second region 44 forms a hole or recess in the dielectric layer 28.

Figure 16C:
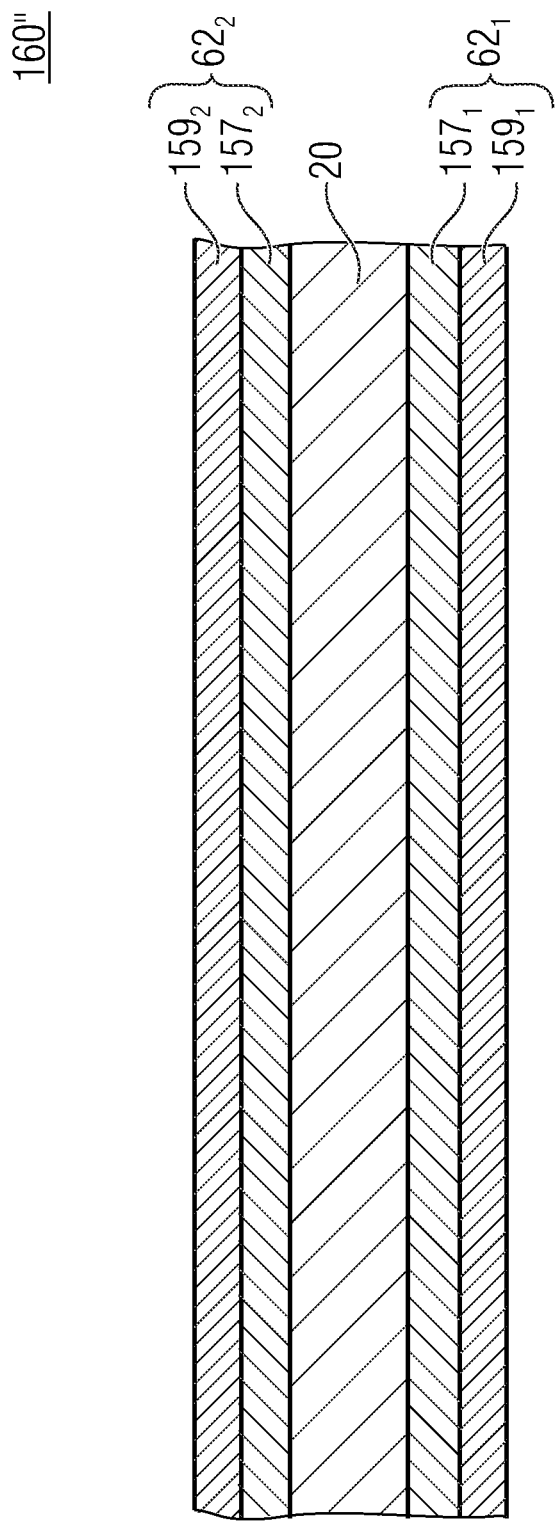
FIG. 16c shows a schematic side view of a PUF-film according to an embodiment, in which shields are adhered to a PUF-film by dielectric material.

FIG. 16c shows a schematic side view of a PUF-film 160" comprising a possibly unshielded PUF-film according to an embodiment such as the PUF-film 20 or 60, 60'. By way of example, the PUF-film 20 may be covered on both main sides with a dielectric material $157_1$ and $157_2$ which may comprise same or different dielectric materials. The dielectric layers $157_1$ and/or $157_2$ may optionally serve as an adhesive layer for adhering conductive layers $159_1$ and/or $159_2$, e.g., a metallic mesh or film. Both, the dielectric layer $157_1$ and the conductive layer $159_1$ may form the shield $62_1$. The dielectric layer $157_2$ and the conductive layer $159_2$ may form the shield $62_2$. Alternatively, the shields $62_1$ and/or $62_2$ may be formed differently, e.g., by an adhesive conductive paste a varnish/lacquer or the like. Although in embodiments of the first, second and third aspect, two opposing shields may be implemented, one of the shields $62_1$ or $62_2$ may be absent in embodiments of the third aspect. Both may be absent in the first and second aspect.

For example, a metallic housing to be covered with a PUF-film of the described embodiments may allow for use thereof as one of the shields such that a use of only one shielding layer allows a shielding from both sides.

Figure 17:
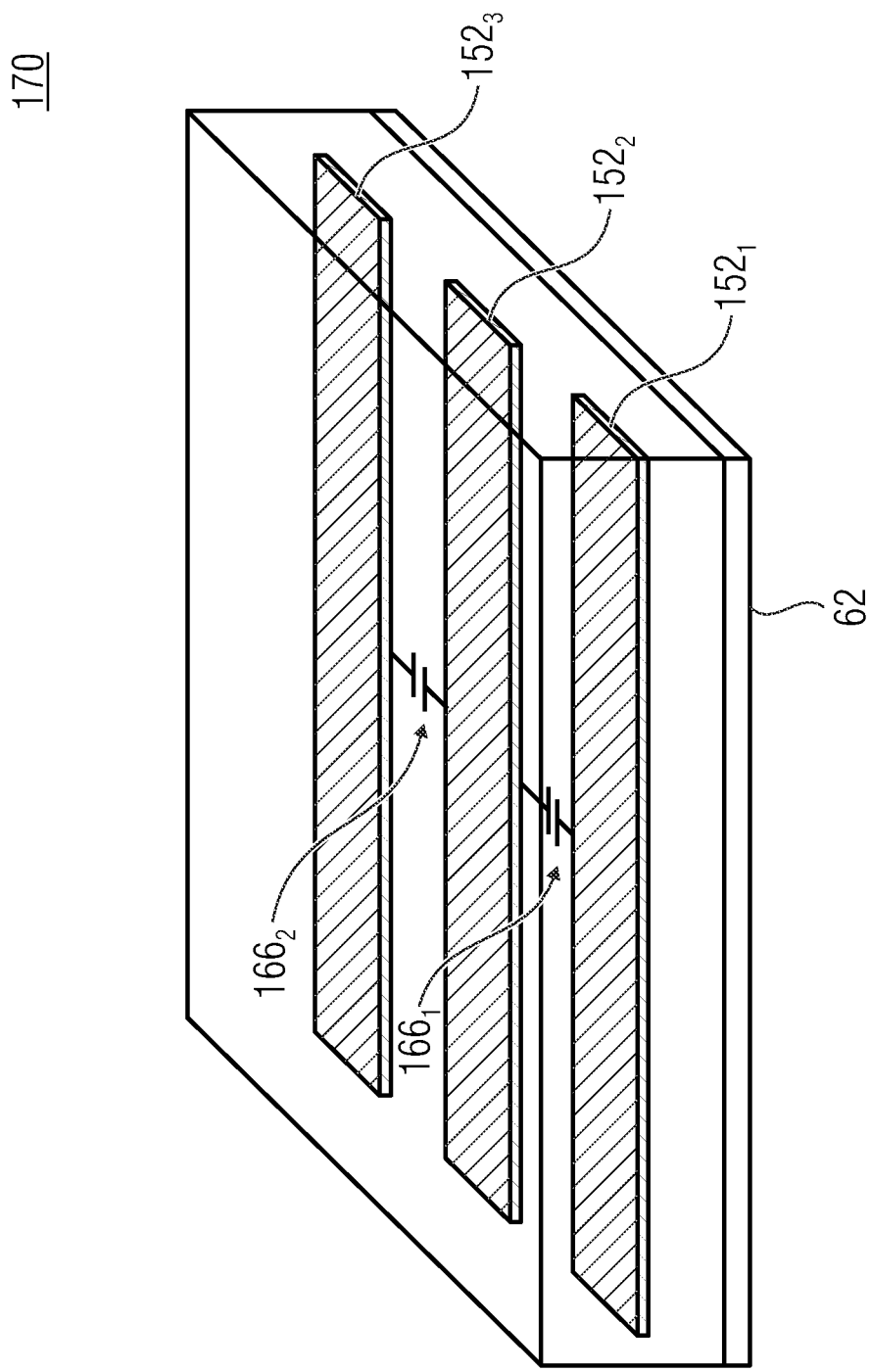
FIG. 17 shows a schematic block diagram of a PUF-film according to an embodiment of the third aspect, comprising capacitive elements electrically coupled between two circuit elements.

FIG. 17 shows a schematic block diagram of a PUF-film 170 according to an embodiment of the third aspect. When compared to the PUF-film 150, the PUF-film 170 comprises capacitive elements $166_1$ and $166_2$ electrically coupled between two circuit elements $152_1$ and $152_2$, $152_2$ and $152_3$, respectively. The capacitive elements 166 may be, for example, capacitor elements. They may be galvanically coupled between the respective circuit elements 152 and may allow for obtaining an additional capacitive value. Although being probably deterministic, this may allow for an easy integrity check using a (same) capacitance measurement during operation of the PUF-film. Alternatively or in addition to a monitoring of a resistance value, a damage or cut in one of the circuit elements 152 may easily be detected because of a large variation in the capacitance value between two circuit elements 152 being connected to each other by one or more of the capacitive elements 166.

While making reference to a layout according to FIG. 8a and/or 9, the additional capacitor elements $166_1$ and/or $166_2$ may be arranged close to ends (regions TX/RX and TXR/RXR) of the conductive traces/electrodes. I.e., at least two capacitive elements may be arranged between two adjacent traces. This allows for an unbalancing of the measured capacitance value when disrupting the conductive or an adjacent conductive trace.

FIG. 18 shows a schematic top view on a PUF-film 180 according to an embodiment of the third aspect. The PUF-film 180 comprises the circuit elements 152, wherein a number of B circuit elements $152_1$ to $152_B$ is arranged in the PUF-film 180. For a better understanding of FIG. 18, the shielding is not illustrated. The PUF-film 168 may comprise an interconnecting circuit 168 being configured for providing a programmable, changeable, and/or multiplexing connection between connected lines. Such a configuration or programming may be obtained during manufacturing, e.g., the circuit may be factory-configurable, e.g., an FPGA. For example, the interconnecting circuit 168 may be configured for connecting and/or multiplexing connecting lines $172_1$ to $172_A$ to the circuit elements $152_1$ to $152_B$. The connecting lines 172 may be connectable with an evaluation unit for operating the PUF-film 180. Thus, by using a small number of A pins or connecting regions at the evaluation unit, a higher number B of circuit elements may be operated.

According to an embodiment, the interconnecting circuit may be adaptable or programmable for, at least between different PUF-film, variably generate a series of conductive traces such that by identifying, bypassing or corrupting one of the traces, e.g., at the controller PIN, a location or position of the trace in the PUF-film is still unknown.

The interconnecting circuit 168 may allow for a further randomization and/or for an increased security, i.e., for a layout randomization. For example, the interconnecting circuit 168 may connect the connecting lines $172_1$ to $172_A$ 1:1 to a subset of the circuit elements $152_1$ to $152_B$ so as to operate only the connected subset of circuit elements 152. Based on randomness, it may be unknown to the attacker, which lines are operated and which are not operated so as to allow for a high security. Alternatively, the interconnecting circuit 168 may connect one of the interconnecting lines 172 to two or more of the circuit elements with a ratio of 1:n so as operate the n circuit elements 152 in parallel. Alternatively or in addition, the interconnecting circuit 168 may interconnect two or more of the circuit elements 152 so as to form a single operated circuit element, e.g., by operating a plurality of n circuit elements 152 serially with one interconnecting line 172. This may allow for increasing a number of traces 152 when compared to a number of pins used for connecting the PUF-film. For example, the evaluation unit/processor may use 16 pins, i.e., A=16, wherein the interconnecting circuit may be configured for increasing this number by a number of 16, i.e., B=16×A=256.

The interconnecting circuit 168 may also be referred to as a security sensor enhancing security of the PUF-film. The interconnecting circuit 168 may alternatively or in addition to providing for the aforementioned layout randomization and according to an embodiment, provide for one or more functionalities of an evaluation unit described in connection with present embodiments. The interconnecting circuit 168 may comprise an integrated circuit structure and may allow for embedding functionality into the PUF-film by embedding the interconnecting circuit 168 into the PUF-film. For example, the interconnecting circuit may be configured for monitoring the circuit structures and may receive, from a device, electrical power and may provide for alarm signals. Alternatively, the interconnecting circuit providing for the layout randomization and an additional embedded chip providing for at least a part of a functionality of the evaluation unit may be embedded into the PUF-film, probably outside the sensoric region, as two distinct components.

Figure 19A:
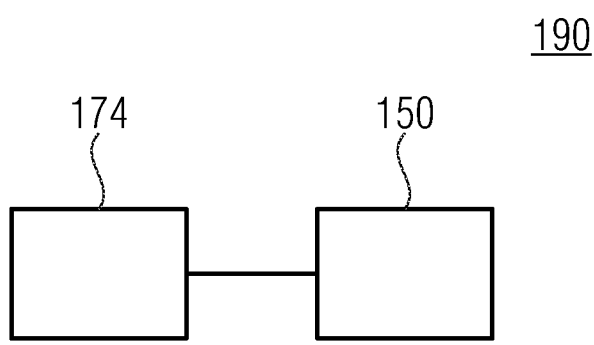
FIG. 19a shows a schematic block diagram of an apparatus according to an embodiment of the third aspect.

FIG. 19a shows a schematic block diagram of an apparatus 190 according to an embodiment of the third aspect. The apparatus 190 comprises the PUF-film 150 wherein alternatively or in addition other films according to the third aspect may be arranged, such as the PUF-film 160, 170 and/or 180. As described previously, the embodiments of the third aspect are combinable, without any limitation with the PUF-films of the second aspects, wherein the embodiments of the second and third aspect may be produced with embodiments of the first aspect.

The apparatus 190 comprises an evaluation unit 174 configured for differentially evaluating the plurality of electric capacitance values based on antiphasic excitation of neighbored circuit elements as well as the verification of trace integrity and an optional absolute capacitance measurement. The antiphasic excitation and/or different features may be implemented as described in connection with the second aspect. Thus, according to an embodiment, the evaluation unit 174 is the evaluation unit 78.

According to an embodiment of the third aspect, the evaluation unit 174 is configured for antiphasically exciting a first circuit element such as the circuit element $152_1$ and a second circuit element such as the circuit element $152_2$ of the plurality of circuit elements 152 at an instance of time and for not exciting a third circuit element such as the circuit element $152_3$ of the plurality of circuit elements at the instance of time. When making reference again to FIG. 8a, this may be understood as exciting the traces $26_1$ and $26_2$ corresponding to circuit elements $152_1$ and $152_2$ for example, at the instance of time while not exciting further traces indicated by "TX3/TX3R" and "TX4/TX4R". I.e., the evaluation unit may sequentially excite subsets of circuit elements while not exciting others so as to perform undistorted measurements of the capacitance values.

Figure 19B:
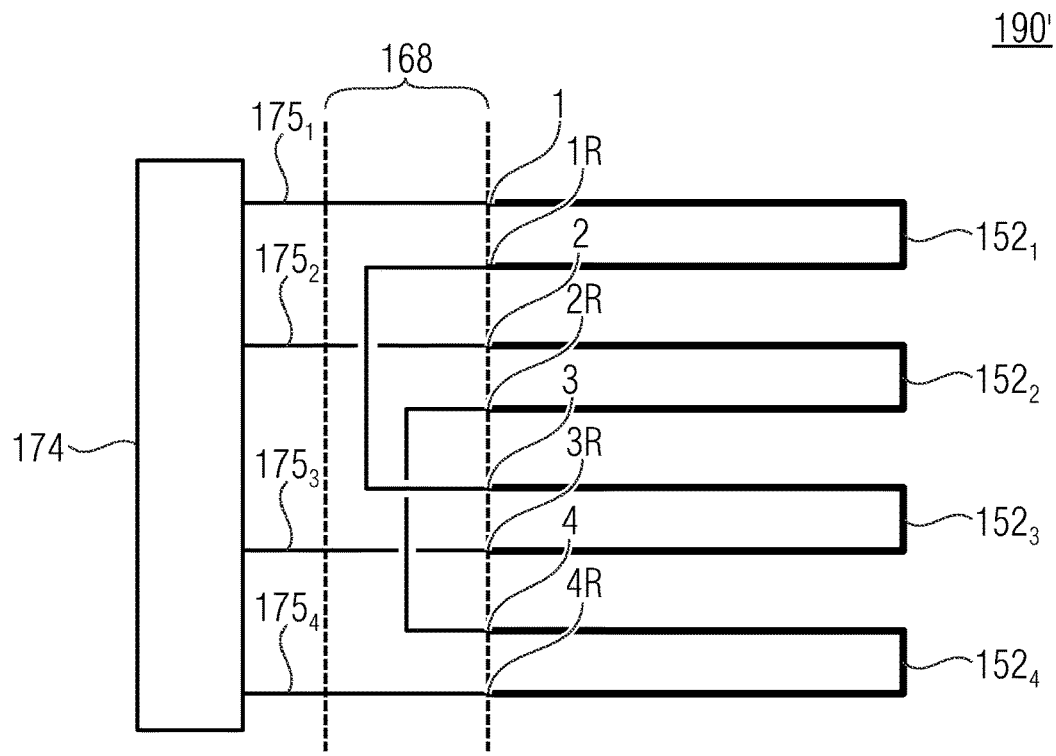
FIG. 19b shows a schematic concept of an interconnecting circuit used for a layout randomization in a first configuration, according to an embodiment.

FIG. 19b shows a schematic block diagram of an apparatus 190' according to an embodiment for illustrating a concept of the interconnecting circuit 168. The apparatus 190' may comprise an evaluation unit for evaluating a circuit structure such as a circuit structure incorporated in a PUF-film such as the PUF-film 170 or a different PUF-film of the first, second and/or third aspect. For example, the evaluation unit 174 may be arranged or a different evaluation unit. The evaluation unit may comprise a set of contact ports $175_1$ to $175_4$ such as pins which may be connected with the conductive traces, e.g., the conductive traces $152_1$ to $152_4$. Each trace $152_i$ may comprise a first end i and a second end iR. The interconnecting circuit may be used for a layout randomization and may comprise a first configuration in FIG. 19b.

The interconnecting circuit 168 may comprise for a variable, i.e., at least once adjustable, interconnection between the contact ports 175 and the conductive traces 152. In the shown first configuration, the contact port $175_1$ may be electrically connected to the end 1, the contact port $175_2$ may be electrically connected to the end 2, the contact port $175_3$ may be electrically connected to the end 3R and the contact port $175_4$ may be electrically connected to the end 4R. Additionally, the interconnecting circuit 168 may provide for a variable, i.e., at least once adjustable, interconnection between the ends. In the shown first configuration, ends 1R and 3 and ends 2R and 4 may be interconnected.

Figure 19C:
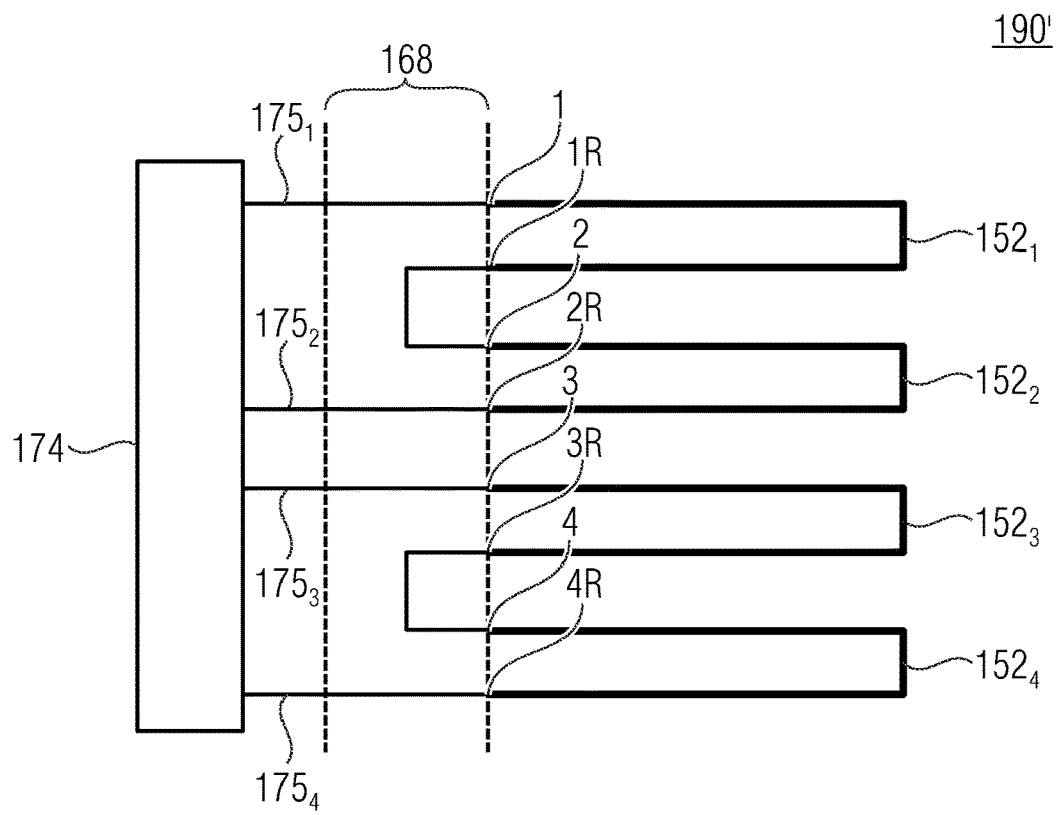
FIG. 19c shows a schematic concept of an interconnecting circuit used for a layout randomization in a second configuration, according to an embodiment.

FIG. 19c shows a schematic block diagram of the apparatus 190' in a second configuration of the interconnecting circuit 168 according to an embodiment. For example, the contact port $175_1$ may be electrically connected to the end 1, the contact port $175_2$ may be electrically connected to the end 2R, the contact port $175_3$ may be electrically connected to the end 3 and the contact port 175₄ may be electrically connected to the end 4R. Additionally, the interconnecting circuit 168 may provide for a variable, i.e., at least once adjustable, interconnection between the ends. In the shown first configuration, ends 1R and 2 and ends 3R and 4 may be interconnected. Thereby, by having gained access to an end of a conductive trace, an association thereof to a contact port is still secret and/or by having gained access to a contact port, its corresponding position in the PUF-film is still secret.

The interconnecting circuit 168 may be a component distinct from the evaluation unit 174. Alternatively, the evaluation unit 174 may at least partially be implemented by the interconnecting circuit 168 and be embedded in the PUF-film.

Figure 20:
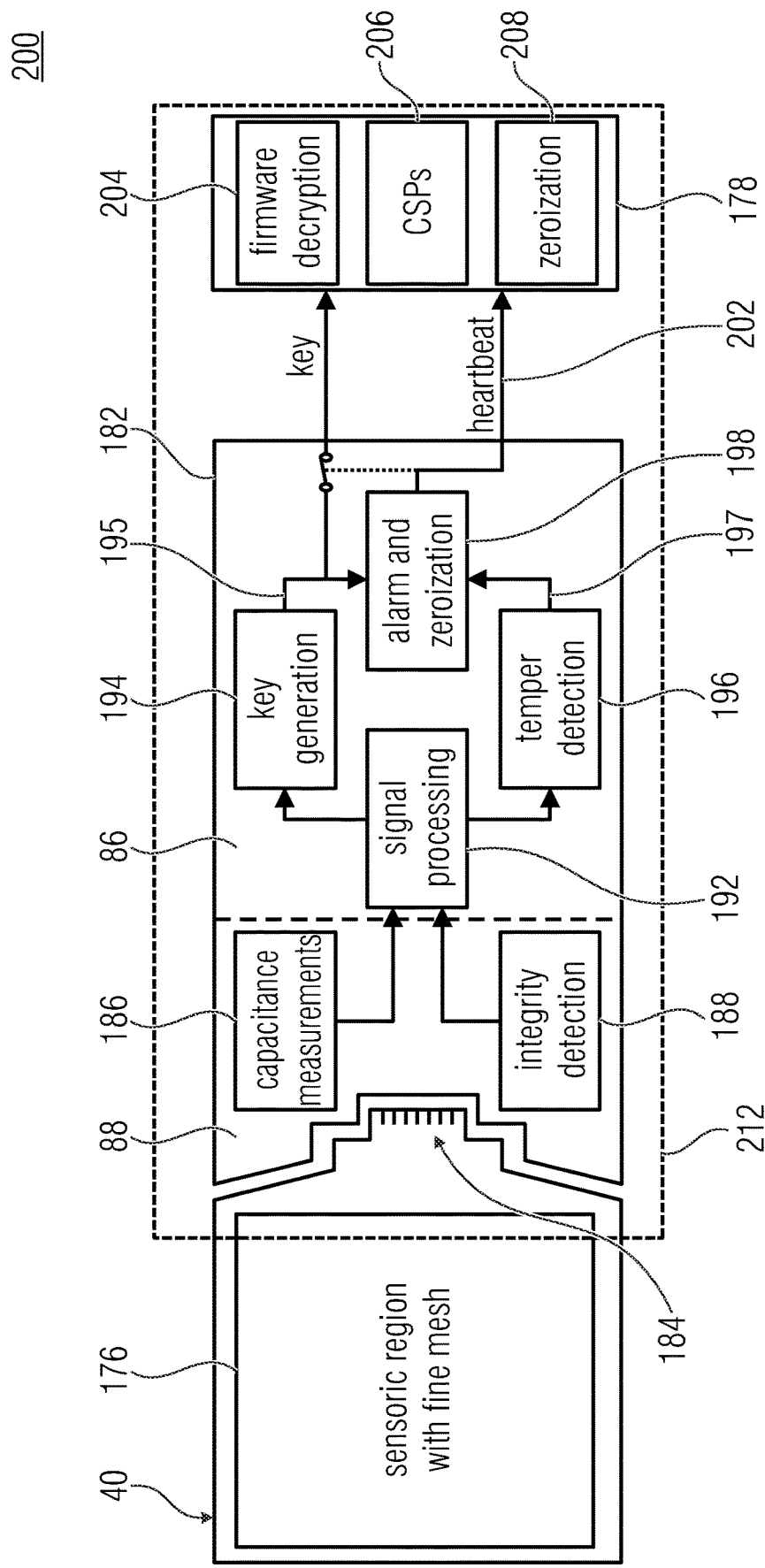
FIG. 20 shows a schematic block diagram of an apparatus according to a further embodiment of the third aspect, referring to embodiments of the second aspect.

FIG. 20 shows a schematic block diagram of an apparatus 200 according to an embodiment of the third aspect, wherein the description refers, without any limitation to embodiments of the second aspect.

The apparatus 200 comprises, for example, the PUF-film 40 having a sensoric region 176 being defined by the overlaps of the conductive traces as described in connection with FIG. 8a. The PUF-film 40 may be used as an envelope so as to enclose a host system 178 having, for example, a housing or the like.

The apparatus 200 comprises an evaluation unit 182 which may implement, amongst other things, the functionality of the evaluation unit 78 and/or 174.

The PUF-film 40 may be connectable to the evaluation unit 182 by use of a connector 184. The connector 184 may comprise the lines of the PUF-film 40 having the conductive traces arranged as a fine mesh in the sensoric region in a common plane as described in connection with FIG. 8a. Alternatively, the evaluation unit may also be connected to the PUF-film 40 without connector, i.e., fixed, e.g., using a soldering process. Alternatively or in addition to the PUF-film 40, every other PUF-film according to the embodiments described herein may be used in apparatus 200. The evaluation unit 182 may be implemented for performing a capacitance measurement 186, for example, by performing the differential measurement. Further, the evaluation unit 182 may be configured for performing integrity detection 188, for example, by monitoring the resistance values of the conductive traces and/or by monitoring the capacitance values there between, e.g., as described in connection with FIG. 17.

Capacitive measurement 186 and integrity detection 188 may be performed, for example, in the analog domain 88, wherein the subsequent processing may be performed, at least partially, in the digital domain 86. Conversion from the analog domain 88 to the digital domain 86 may be obtained by use of the ADC 116. The evaluation unit 182 may be configured for performing a signal processing 192 being a basis for a subsequent key generating 194, e.g., by processing the results of the capacitance measurement 186. Signal processing 192 may further be a basis for a tamper detection 196, for example, by evaluating changes in the capacitances obtained by the capacitance measurement 186 and/or by results obtained by the integrity detection 188. A key 195 derived in the key generation 194 and/or a result 197 of the tamper detection 196 may be evaluated in a unit 198 for generating an alarm, heartbeat and/or instructing a zeroization. The unit 198 may be, for example, a watchdog transmitting, for example, a heartbeat-signal 202 to the host system 178, wherein the heartbeat-signal 202 may signalize that everything is ok or may signalize that an alarm is generated, i.e., that tampering is detected. For implementing such a variation, zero-dead or zero-alive signals may be used and may be interpreted as the signal is transmitted when everything is ok or that the signal is transmitted when tampering is detected. Alternatively or in addition, the key 195 may be supplied to the host system 178, for example, for firmware decryption or decrypting other data stored in a memory of the host system 178. The host system 178 may also monitor one or more Critical Security Parameters (CSPs) 206 and/or may actively or passively perform zeroization 208, i.e., may delete at least unencrypted data and/or other, possibly encrypted data. As indicated by line 212, the sensoric region 176 may enclose both, the evaluation unit 182 and the host system 178. For example, the evaluation unit 182 may be arranged in the same housing as the host system 178 and/or may be implemented in the same processing unit.

In other words, when focusing on attempts to physically penetrate the envelope (PUF-film), it may be assumed, by way of non-limiting example only, that penetrations of the PUF-film are performed with at least 300 mm in diameter (drilling attack). This is a reasonable choice based on readily-available tools, e.g., the shaft diameter of microprobing needles and common drill sizes. As a result of such an attack, the system has to be able to ensure that it becomes immediately inoperable and recovery of its sensitive data is infeasible. To protect a host system such as a Hardware Security Module (HSM), two building blocks may be used, the PUF-film with capacitive sensors enclosing the system and its corresponding evaluation unit. According to the present embodiment, the capacitive sensors of the envelope act as a PUF and provide the basis for a cryptographic key. For example, during each device start-up, the same key can only be extracted if the envelope has not been tampered with. While manufacturing the device, this key is used as key-encryption-key (KEK) to encrypt and authenticate CSPs or other sensitive data of the enclosed device. The thusly protected data is stored in non-volatile memory, since an attacker can neither gain information from it nor change it in a useful way without damaging the envelope, thereby destroying its key.

Upon power-on, the system self-authenticates and is decrypted. Once the device is running, the same sensors that extracted the PUF properties from the envelope now continuously monitor it. In case of an attack during runtime, an alarm is raised to trigger the zeroization of sensitive data which is temporarily stored in volatile memory for processing it. Alternatively or in addition, the alarm may be used for deactivating specific parts or functions of the device, such as parts for operating on data to be secured. I.e., the evaluation unit may be configured for deleting data or for deactivating a function of the device in case of detecting altering of the circuit structure and/or the PUF-film.

According to an embodiment, the evaluation unit may be configured for providing at least a first alarm signal and a second alarm signal in case of having detected a tampering. The first alarm signal and the second alarm signal may comprise the same information, i.e., allowing for distinguishing between a first case in which no tampering is detected and a second case in which tampering is detected but may encode this information differently so as to hamper and attempt for imitating a respective signal, e.g., by overwriting the original signal on the signal lines. For example, the first alarm signal may provide for a first sequence or continuous amplitude, e.g., a specific voltage on a pin of the controller in the first case and may switch to a different amplitude (including zero voltage) in the second case thereby indicating the alarm. The second alarm signal may provide for a probably random sequence of potentials in the first case and may change the sequence or may deactivate the sequence in the second case, thereby indicating the alarm. A change in one of both signals may indicate the second case and may therefore cause the device and/or evaluation unit to trigger countermeasures.

Using two alarm signals, in particular at least one dynamic and/or one static may thus allow for a high security, in particular when, as in accordance with embodiments, the apparatus determines a duty cycle and/or a different parameter of at least one of the signals being thus a priori unknown to an attacker. The parameter may be determined, for example, during each start up differently.

To enhance zeroization, the device may be configured, for example, to deactivate one or more functional blocks, elements, circuitries or other power consuming parts at least temporarily so as to save electrical energy. The saved electrical energy may be used for extending or to lengthen a runtime of the device, e.g., when power supply lines are attacked. For example, analogue components including components for measuring the integrity of the PUF film may be deactivated. The saved energy may be used for a probably digital deletion/zeroization such that a high amount of data may be erased based on deactivation of power consuming functional blocks. I.e., the device and/or evaluation unit may be configured for unpowering/deactivating at least functional block or circuitry, advantageously an analogue circuitry so as to save electrical power and to use the saved electrical power for zeroization, i.e., for deleting data.

The envelope (PUF-film) is comprised of a foil containing a mesh of fine conductive tracks. The mesh represents the PUF to derive a cryptographic key by evaluating the capacitance measurements over the entire sensoric region. It also acts as an opaque barrier around the fully enclosed device. The envelope's sensoric region contains overlapping tracks that represent the electrodes which work as capacitive sensors. These tracks are subject to manufacturing variations in terms of surface roughness and physical dimension due to etching. As a result, each overlap between the electrodes represents a capacitance that cannot be accurately predetermined.

The evaluation unit connects the envelope to the host system and comprises the following domains and units:
  Analog domain: distinct measurement concepts for the capacitance measurement and integrity detection
  Digital domain: signal processing, key generation, and runtime tamper detection unit including zeroization
  Data interface: to pass the key to the host system. Please note that this interface is within the physical security boundary, i.e., enclosed and protected by the envelope
  Heartbeat interface: with two distinct alarm signals that are monitored by the host system during runtime After each power-on, the host decrypts the firmware or additional CSPs using the key derived from the envelope. Once running, direct access to the key is denied to prevent software-based extraction. If the alarm signals indicate a tampering attempt, a zeroization is carried out. Following this generic approach, it is possible to implement a wide range of applications that may be unaware of their physically protected execution environment.

Figure 21:
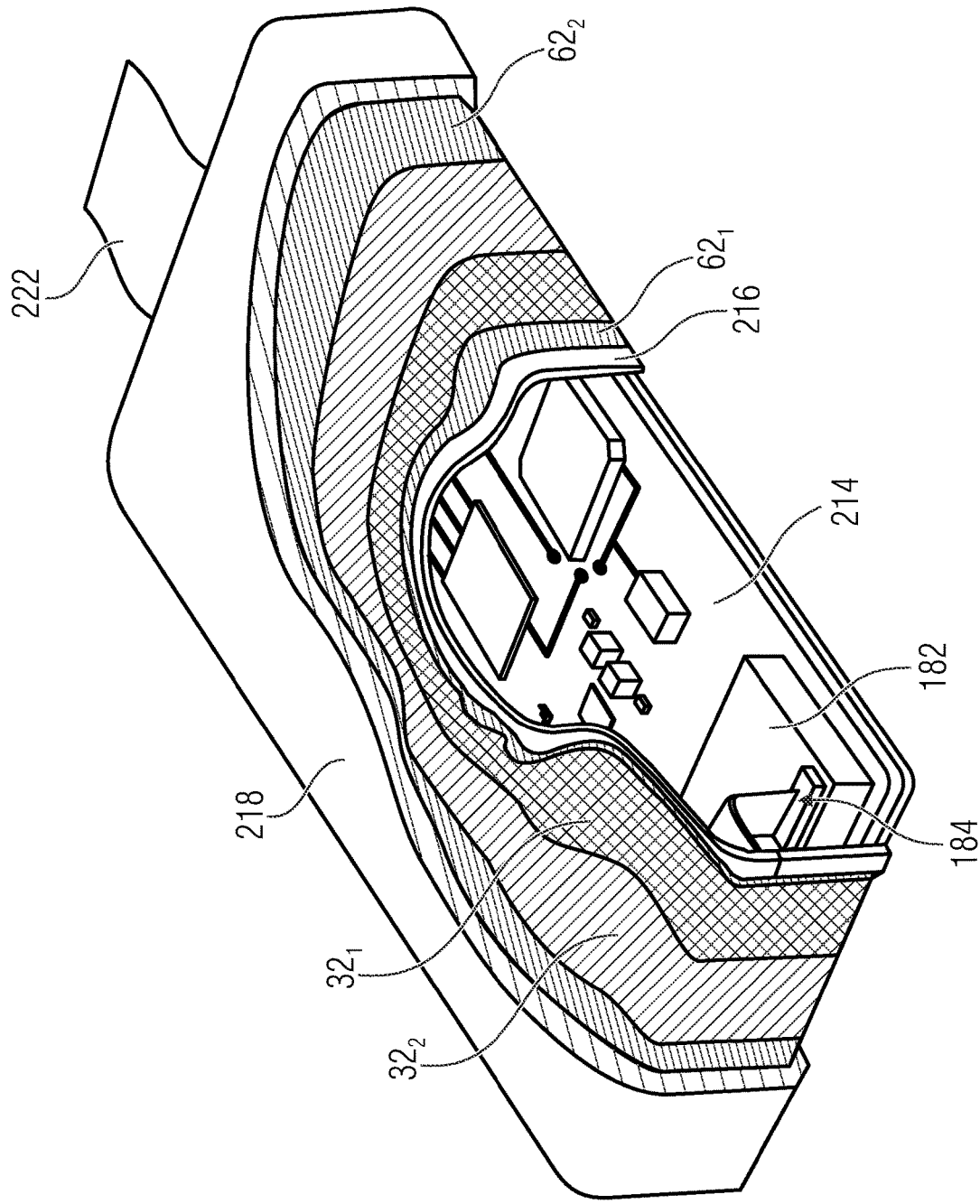
FIG. 21 shows a schematic perspective view of an apparatus according to an embodiment of the third aspect and/or the second aspect in which a host system comprises a printed circuit board in a housing or internal casing.

FIG. 21 shows a schematic perspective view of an apparatus 210 according to an embodiment of the third aspect and/or the second aspect. As described in connection with FIG. 20, a host system comprising a printed circuit board (PCB) 214 in a housing or internal casing 216 is enclosed by a PUF-film according to an embodiment, wherein the evaluation unit 182 may be connected with the PUF-film using the connector 184. As described in connection with FIGS. 8a and 9, the PUF-film may comprise two layers of structured electrodes $32_1$ and $32_2$, overlapping with each other so as to form a sensoric region. As described in connection with FIG. 16a, the structured electrode layers $32_1$ and $32_2$ may be sandwiched between a first shield $62_1$ and a second shield $62_2$.

Apparatus 210 may comprise a potting resin 218 covering the PUF-film, wherein the potting resin 218 may also be a part of the PUF-film, for example, one of the outer layers or the outermost layer. The potting resin may be, for example, a carbon paste. As described, the shielding $62_2$ may also cover the potting layer 218.

A supply and/or communication cable 222 may allow for communicating with the host system and/or for powering it externally. In case of a communication, the host system may comprise a secure communication interface preventing an exchange unencrypted data.

Advantageously, the sensor region completely covers the housing 216 so as to avoid any regions suited for an attack.

When selecting an envelope-based design, as illustrated in FIG. 21, such that its surface which is exposed to an attacker is fully covered by the sensoric region of the envelope, i.e., the portion containing the tamper-detecting sensors. This provides a comprehensive resistance to attacks, as any direct line of attack is obstructed by the sensoric mesh. Moreover, wrapping it around a case has the least impact on the design of the enclosed PCB. Please note that unwrapping the envelope in real-world designs is prevented by potting it.

Layer Stack-Up of the Envelope

Thus far, meshes with fine tracks have been primarily evaluated as resistive sensors. However, this has several dis-advantages when compared to capacitive sensors. First of all, the resistance of a track can be measured and replaced with a matched resistor, such that this bypass would be difficult to detect. Moreover, resistive sensors only detect changes within their own tracks. Sensing of nearby objects and layers is not possible. In contrast, capacitive sensoric regions are conceptually less prone to bypassing their tracks due to the small capacitances in the range of femtofarads. Furthermore, parasitic capacitances towards surrounding objects influence the measurement. Hence, not only is the track considered part of the measurement but so are the nearby layers and objects.

A self-contained capacitive sensor is comprised of two electrodes, "Tx" and "Rx" This terminology is borrowed from the domain of capacitive touch technology. Generally speaking, the "Tx" electrodes are driven by an excitation signal and the "Rx" electrodes act as receivers. This is quantified as the "mutual capacitance" between Tx and Rx (as illustrated in table 1). From a functional point of view, the capacitive measurement is to be protected against interference from inside the device and its environment. Therefore, the two layers of electrodes are enclosed with a grounded shield on top and bottom to provide a well-defined boundary condition. Since the parasitic capacitance towards the shield will be rather large compared to the mutual capacitance, partially removing the shield already significantly degrades the measurement.

Sensor Design (Physical Layout)

The following requirements were considered in order to design a suitable sensor layout:
  (i) The layers comprising the electrodes are covered completely with the intended sensor structure thereby avoiding blind spots where attacks would go undetected.

(ii) If the envelope is damaged in one spot, this should result in more than one destroyed sensor, i.e., to make this attack more easily detectable, e.g., by realizing an interconnected sensor arrangement.

(iii) The sensor structure of "track-space-track" (or vice-versa) needs to be smaller than the diameter of expected attacks.

Figure 22A:
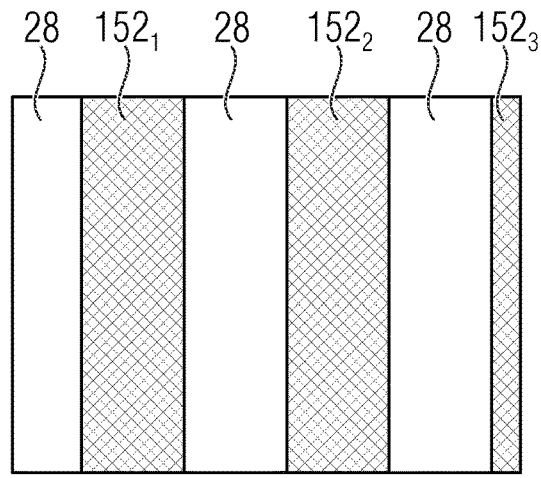
FIG. 22a a picture of an example defect free conductive traces according to an embodiment.
Figure 22B:
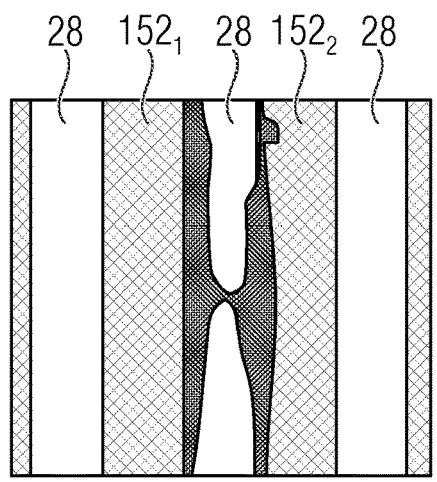
FIG. 22b a picture of an example of an open-circuit defect according to an embodiment.
Figure 22C:
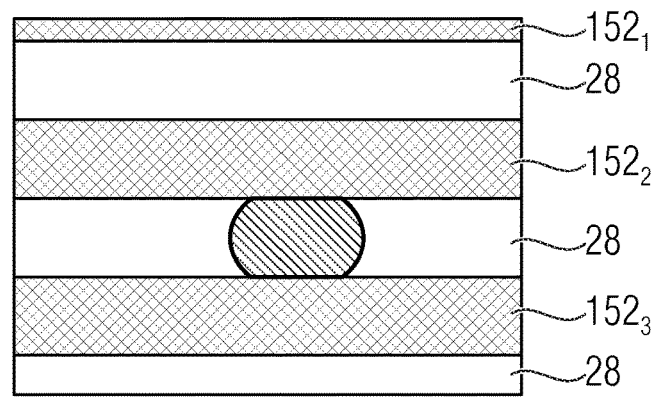
FIG. 22c a picture of an example of an open-circuit defect according to an embodiment.

To address these, a sensor layout may be manufactured with a structure size of 100 μm line and space as shown in FIG. 22a-22c i.e., 3·100 μm≤300 μm. Creating small structures increases the difficulty of attacks and improves manufacturing variations. However, since the structure size is small, contamination during manufacturing is possible, resulting in short circuits. Moreover, some manufacturing steps may break electrode tracks, resulting in open circuits. Unfortunately, both effects sometimes occur as shown in FIG. 22b and FIG. 22c. At the time of device assembly, it is therefore critical to verify that each envelope is free of such defects. This is considered as a mesh with "full integrity" which provides assurance that the whole sensoric surface contributes to the PUF.

To detect open circuits, the layout in FIG. 8a allows checking the electrode's continuity by forming a loop, i.e., both input and output of an electrode are routed to the connector, denoted as Ri/Ro for Rx and Ti/To for Tx electrodes. To also check for short circuits, the electrodes are interleaved such that each neighboring track can be driven independently. FIGS. 8a and 8b shows the resulting advanced layout and its various representations, which can easily be scaled to cover a larger area by increasing the number of windings and/or electrodes.

To determine the physical parameters of the sensor layout, the capacitance $C_s$ of a single sensor node (as illustrated in FIG. 8b) is analyzed based on its simplified equivalent circuit in FIG. 23a and FIG. 23b. Each of the n overlaps (sensor cells) between the electrode tracks represents a tiny capacitor in parallel. $C_s$ is therefore the sum over the capacitances $C_{s,i}$. This representation is simplified since it ignores the resistance in series between each sensor cell. However, as long as track resistance is matched, this is a valid initial estimate based on our practical experience.

In the following, $C_{c,i} \sim \mathcal{N}(\mu_c, \sigma_c^2)$ is assumed. Recall that adding two Gaussian random variables results in a Gaussian distribution with the sum of means and sum of variances. Therefore, $C_s \sim \mathcal{N}(n \cdot \mu_c, n \cdot \sigma_c^2)$, i.e., $\mu_s = n \cdot \mu_c$ and $\sigma_s^2 = n \cdot \sigma_c^2$. According to the weak lay of large numbers, the respective means of the sensor cell $$\overline{C_c} = \frac{C_s}{n}, \overline{\mu_c} = \frac{\mu_s}{n}, \overline{\sigma_c^2} = \frac{\sigma_s^2}{n}$$

may be computed so as to obtain an equation that depends on n which is the number of parallel cells combined to a sensor node, i.e., $C_s = n \cdot \overline{C_c}$.

Validating the Assumptions: Independence of variables: Other publications such as [5] and [13] show that besides of local variation there is also global variation across manufacturing panels of PCBs. This results in a capacitance gradient and therefore a global bias. This applies to the technology selected, too. To counteract this effect, a differential measurement as detailed later on is used. Measuring the difference between two pairs of nodes in close vicinity isolates the local variation and minimizes the global effects. With regard to having normally distributed variables, it is referred to the central limit theorem, i.e., the sum of many independent cells combined to a node tends towards a normal distribution.

Estimating the Entropy: To estimate the entropy of the thus far continuous Probability Distribution Function (PDF) of a sensor node, the resolution $\Delta_M$ of measurement circuit.

As security objective, $\Delta_M \leq \overline{C_c}$, is targeted, i.e., removing a single cell from the capacitance $C_s$ of a sensor node would be detected with high probability. Thus, if only considering attacks above the targeted diameter to protect against, removing a single cell is impossible since an attack cuts off multiple overlaps in the layout. $\Delta_M = 1$ fF$\leq \overline{C_c}$ is selected for measuring the capacitances is only a first step. Subsequent processing includes a quantization with bin size $\Delta_Q$ [25]. So as to simplify the further processing, it may be proceeded with $\Delta_M$ and without taking the specifics of $\Delta_Q$ into account. According to [26], the Shannon entropy $H^\Delta$ of a discretized Gaussian random variable is given by $$H^\Delta = 1d\left(\frac{\sigma_s}{\Delta_M} \cdot \sqrt{2\pi e}\right)$$

To achieve $H^\Delta = 5$ bit for the given $\Delta_M$, for $\sigma_s$ is solved which is 7.7 fF. This value can be verified empirically once a statistically relevant number of samples is available. Using Equation 1, the minimum sensor cell count for a design is $$\min(n) = \frac{\sigma_s^2}{\sigma_c^2}.$$

However, this can only be calculated if $\sigma_c$ is known, i.e., empirical data is already available. Alternatively, the cell capacitance may be determined using a simulation tool. Additionally, a reasonable assumption for the expected variation needs to be made. In embodiments: $\overline{C_c} = 18.18$ fF and $\sigma_c = 1.6\%$. For the same $H^\Delta$ and $\Delta_M$ this yields min(n) = 713 which allows partitioning the envelope accordingly, i.e., selecting the number of Tx/Rx electrodes.

Figure 24:
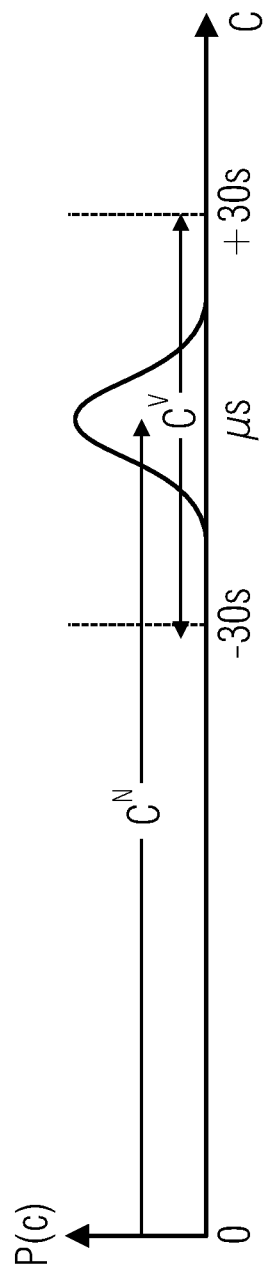
FIG. 24 a schematic graph of an example probability density function (PDF) of the absolute capacitance according to an embodiment of the third aspect.

In the following, focus is put on the capacitance measurement that incorporates $C_s$ and its PDF as illustrated in FIG. 24 showing an example probability density function (PDF) of the absolute capacitance. Here, $C^N$ is the nominal capacitance and $C^V$ the variation from the manufacturing process. One goal of selecting a measurement technique is to optimize its sensitivity towards $C^V$. This is mainly controlled by two parameters: first by the number of steps the capacitance measurement system resolves, expressed by Effective Number of Bits (ENOB), $2^{ENOB}$ secondly by the maximum of the capacitance, denoted as $C_{max}$.

The lower bound of $\Delta C_{min}$ is then defined as $$\Delta C_{min} = \frac{C_{max}}{2^{ENOB}}.$$

Subsequently, ENOB is assumed to be the constant and $C_{max}$ may be analyzed in more detail. Let $C_{i,j}^M = C^N + C_{i,j}^V$ be the mutual capacitances between $Tx_i$ and $Rx_j$ and $$C_{max} = \max_{i,j}(C_{i,j}^M).$$

As $C^V$ is small compared to $C^N$, this causes $C_{max} \approx C^N$. As a consequence, $\Delta C_{min}$ primarily depends on $C^N$ which leads to $\Delta C_{min} > C^V$ for even a small number of sensor cells, as $C^N$ increases linearly in the n, while the variation increases by $\sqrt{n} \cdot \sigma_c$. Thus no variation could be measured. This may be solved by using a differential measurement. For an even I, the electrodes $TX_{i-1}$ and $TX_i$ are routed differentially. They form the TX pair $(TX_{2k-1}, TX_{2k})$, for $k \in \{1, 2 \ldots, N_{TX}/2\}$. All RX are used as single electrodes with $(RX_j)$, for $j \in \{1, 2 \ldots, N_{RX}\}$. Hence, the differential capacitances is $\gamma_{k,j} = C_{(2k-1),j}{}^M - C_{(2k),j}{}^M = C_{(2k-1),j}{}^V - C_{(2k),j}{}^V$.

Accordingly, the resolution no longer depends on $C^N$ which ensures an improved sensitivity where also the dynamic range is well-adjusted to $C^V$. Extracting only $C^V$ coincides with the assumption that $C^N$ is the same for neighboring differentially-routed electrodes, i.e., global variations causing different $C^N$ over larger distances are ignored. Improving the sensitivity comes at the price of halving the number of measured capacitances to extract information from, i.e., $$N_{Diff} = N_{RX} \cdot \left(\frac{N_{TX}}{2}\right) = 16 \cdot \left(\frac{16}{2}\right) = 128.$$

However, the resulting PDF of the differential capacitance $\gamma$ is $N_\gamma(0, \sqrt{2} \cdot \sigma_s)$ and therefore Equation 2 can be written as $$H_\gamma^\Delta = 1d(\sqrt{2}) + 1d\left(\frac{\sigma_s}{\Delta_M} \cdot \sqrt{2\pi e}\right)$$

Hence, the maximum theoretical entropy of the overall envelope in our case is 128·5.5 bit=704 bit.

Figure 25:
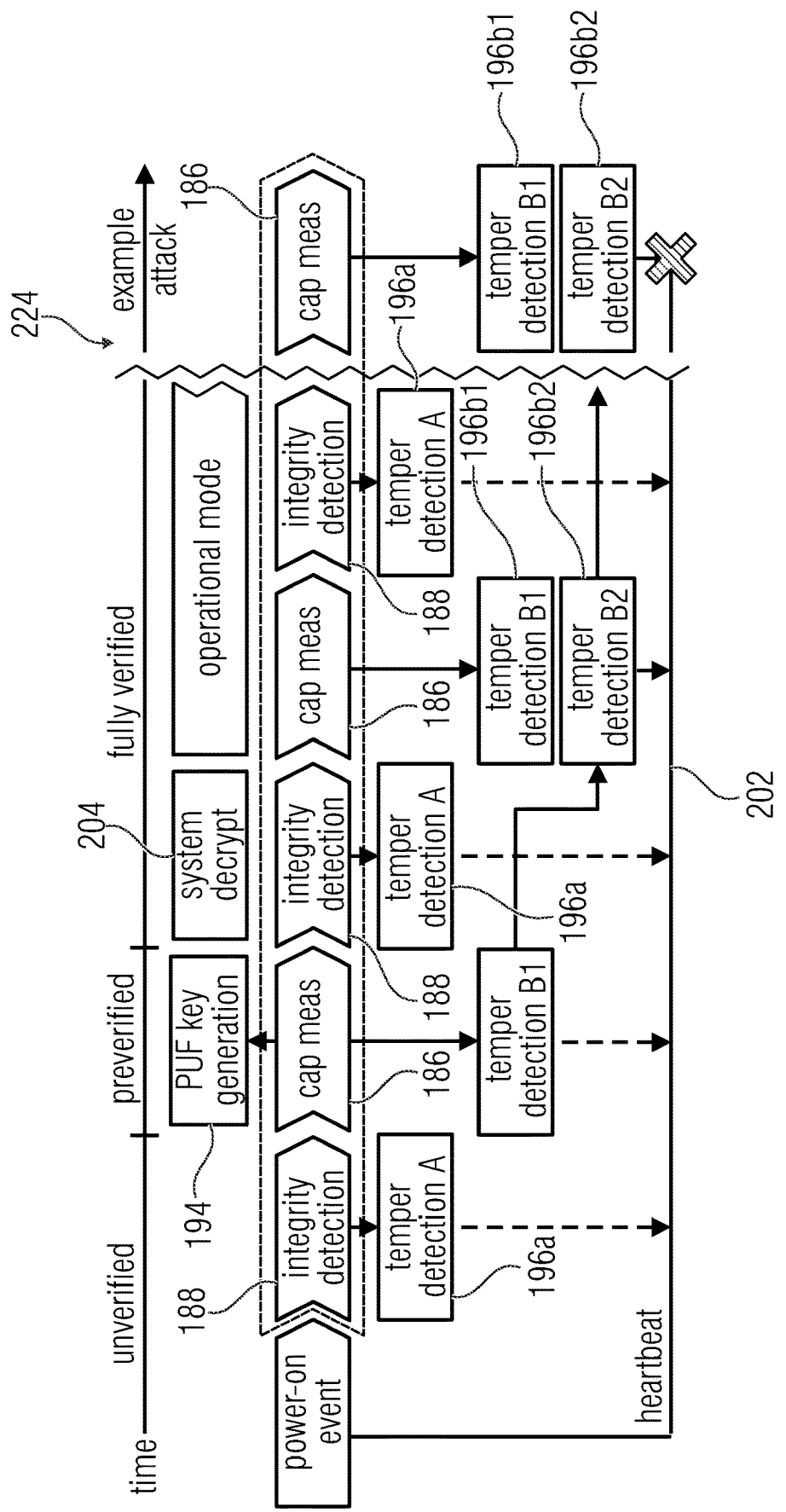
FIG. 25 shows a schematic flowchart of an operation of an apparatus according to an embodiment of the third aspect.

Since the system's boot process is its most critical aspect in terms of security, its mechanisms are briefly outlined as depicted in FIG. 25 which is a schematic flowchart of an operation of an apparatus according to an embodiment such as apparatus 200. Immediately after power-up, two independent heartbeat signals are generated to which the host system synchronizes. This should prevent rapid "one-shot" attempts to directly interrupt the alarm later on. As a first line of defense, an integrity detection is carried out to verify if the electrodes contain short and open circuits or if the circuit's operational amplifiers are in saturation. This may be referred to as Tamper Detection A (TD-A) which is then followed by a capacitive measurement. Both are continuously repeated during runtime, i.e., they take turns. The first capacitive measurement after power-up is considered a reference value and used for the PUF key reconstruction. Simultaneously, the same values are used to start another TD, termed TD-B1 and TD-B2.

TD-B1 limits the valid range of each individual capacitance relative to its reference value, i.e., at $t=T_0$ boundaries for each sensor node are computed once based on the reference value $\pm p$, whereas p is a constant guard parameter. For each subsequent measurement, the then current capacitance value is checked against the computed boundaries: $|\gamma(t) - \gamma(T_0)| < p$. As additional precaution, TD-B2 limits the discrete rate of change, i.e., by computing $|(\gamma(t) - \gamma(t-1))| < q$, for a second security parameter q. Both parameters p and q may be tuned to the specific application profile of the device. The parameter p may have a relation to the width of the quantization being possibly selected to Qw=2*y*sigma_N, wherein sigma_N is noise of the measurement circuit. The width of the interval is defined by the multiplication using y.

As noise is distributed according to a Gaussian distribution, the probability that a value is within an interval may be derived from tables relating ro the Gaussian distribution. For generating a key, the value Qw may be selected small, i.e., having a small width such that a high degree of entropy is extracted from the distribution. This may be combined with using an error correction later. The parameter p may restrict the value range of the node at runtime, it may be suitable to define p=x*Qw, wherein x may be within an interval of 1 to 1000, 1 to 100 or 2<x<10, e.g., when selecting Qw=2*y*sigma_N+2*Drift, wherein Drift may represent a temperature drift of measurement values. Parameter q may, different from parameter p not uniquely determinable analytically in advance. It may be based on the thermal inertia, e.g., in view on how fast a measurement value changes. For example, it may be assumed that q=z*Qw with 1<z<2.

By successfully generating the PUF key, the proper initialization of the TD mechanisms is ensured. This key can then be used to decrypt the firmware of the host or some of its CSPs. If either during power-up or runtime any of these checks fail, a tamper-event is caused that triggers the zero-ization and stops the heartbeat signals. All mechanisms have been designed in an intertwined way to have a layered approach to security.

Thus, in case of an attack 224, the heartbeat 202 may be interrupted (or alternatively generated).

Figure 26A:
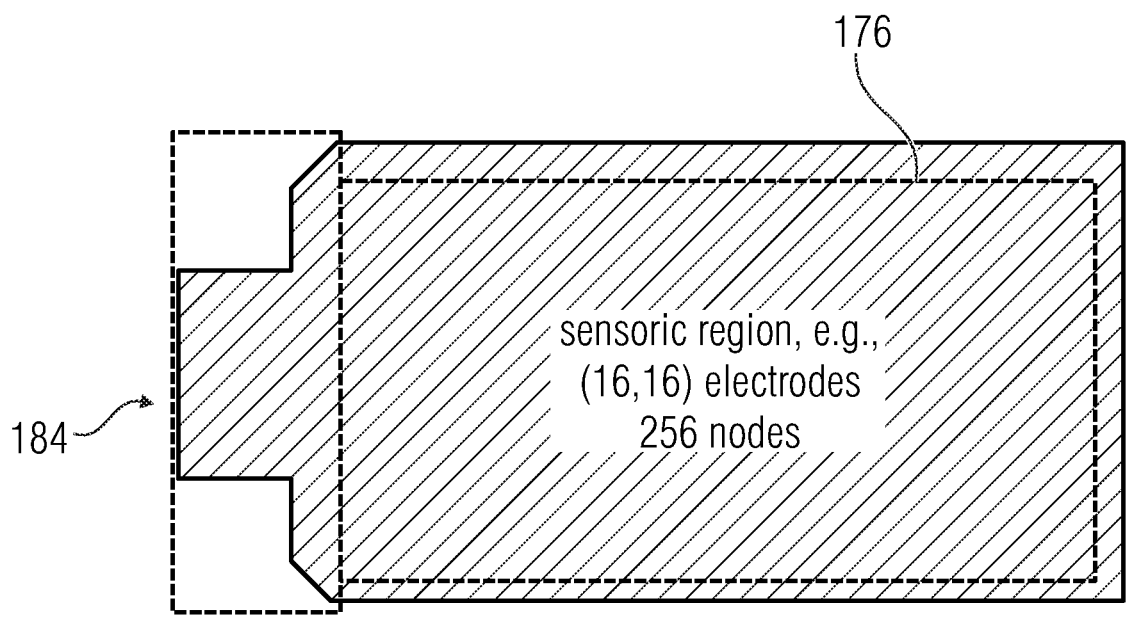
FIG. 26a shows a bottom view of an example PUF-foil according to an embodiment of the second and/or third aspect.
Figure 26B:
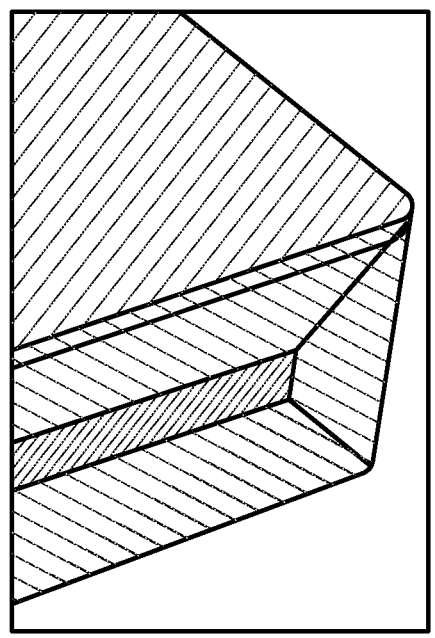
FIG. 26b shows an illustration of a wrapping concept of a PUF-film according to an embodiment around a case.

FIG. 26a shows an example bottom view of an example PUF-foil according to an embodiment of the second and/or third aspect. FIG. 26b illustrates a wrapping concept around a case that contains the protected module. For better visualization of the mesh, the shielding is not attached and the sensoric region 176 does not fully overlap in FIG. 26b as it is implemented in other embodiments. The design properties of the example are:

Physical dimension: 185 mm×90 mm
16×16 electrodes; 256 sensor nodes; n=990 cells each
16×16/2=128 differential sensor nodes Manufacturing Process: The mesh is based on lithographic patterning to have a scalable technology that allows even smaller structures in the future. Using a reel-to-reel process with an infinite-length substrate, copper (Cu) may be deposited on the first electrode layer by sputtering on a polyimide (PI) substrate. Subsequently, this layer with Rx electrodes is reinforced by an additional semi-additive galvanic process, resulting in a Cu layer of 7 µm. This is done to have a defined stop interface while processing the blind vias in the PI substrate by laser ablation. Afterwards, the Tx layer is only sputtered, resulting in a Cu thickness of just 500 nm, while at the same time creating the conductive interconnection between the electrodes on both sides of the PI. The carrier substrate with electrodes is enclosed in a shield on both sides. The resulting height of the layer stack-up is approx. 200 µm, which is important for the flexibility when mounting the envelope.

Measurement Circuit: Custom discrete measurement circuit is used for testing [27]. Its basic operating principle is to use two antiphasic excitation signals for each Tx pair while the other Tx electrodes remain inactive, thereby creating an in-situ differential capacitance inside the envelope. The resulting current on the Rx electrodes is then further processed by analog circuitry before being sampled, filtered, and evaluated by an STM32 microcontroller. The resulting full-scale range is ±73 fF at a theoretical digital resolution of $\Delta_M$=7.3 aF which is however limited by circuit noise of $\sigma_N$=0.19 fF when the envelope is connected. Performing a single differential measurement can be done in 0.6 ms. Since it can be parallelized on the Rx side for each TX pair, this results in (16/2)·0.6 ms=4.8 ms for the overall envelope.

Practical Results

A total of 50 envelopes have been manufactured to confirm our design rationale. Since all measurements were performed with the same circuit, the variation observed in the data is only rooted in the variation of the envelopes. To evaluate the statistical properties, 200 samples are exemplarily over time for each sensor node to compute its noise-free mean. To ensure conservative results, the envelopes were measured laying straight, such that only the variation inside the electrodes is captured. This leads to the following preliminary results:

Nominal mutual capacitance of sensor node: $C^N \approx 18$ pF

PDF[1] of γ: $\mu_s=0.13$ fF, $\sigma_s=6.25$ fF, $\sigma_N=0.19$ fF $\Delta_Q \approx 1.25$ fF=$2 \cdot y \cdot \sigma_N$ (y=3.29)

Cell capacitance: $C_c=18$ pF/990=18.18 fF>$\Delta_Q$

Figure 27A:
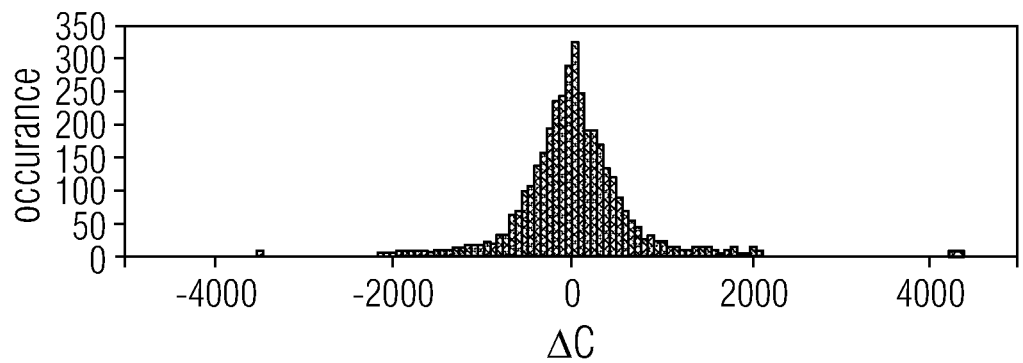
FIG. 27a shows an example PDF of a differential capacitance in accordance with the second and third aspect.

Entropy and Key Generation: FIG. 27a shows an example PDF of γ and contains all sensor nodes from all envelopes. To analyze the entropy of this empirical distribution, an equidistant quantization may be selected for reasons of a uniform tamper-sensitivity across the measurement range [25]. Its bin size ΔQ is chosen as multiples of the noise deviation σN, thereby making the result more robust. For $\Delta_Q \approx 1.25$ fF, the computed Shannon entropy yields 4.4 bit per node. Hence, a total of 128·4.4 bit≈560 bit can be expected from the PUF under ideal conditions. Using the given $\Delta_Q$, an average error rate of ≤0.1% per sensor node may be obtained after quantization at room temperature. However, to compensate for environmental effects such as temperature drift, the number of quantization intervals may be lowered, causing the entropy to drop to 2.5 bit per node. When both envelope and measurement circuit are subject to these environmental influences, this typically results in less than 3 erroneous nodes (out of 128) over the range of −20° C. to +60° C., i.e., in addition to the quantization, an error-correcting code is needed. A well-tailored choice is made by considering the result of each quantization interval as a symbol from a higher-order alphabet. Each symbol is then mapped to a variable-length bit sequence which necessitates the use of an insertion/deletion code as described in [28].

Figure 27B:
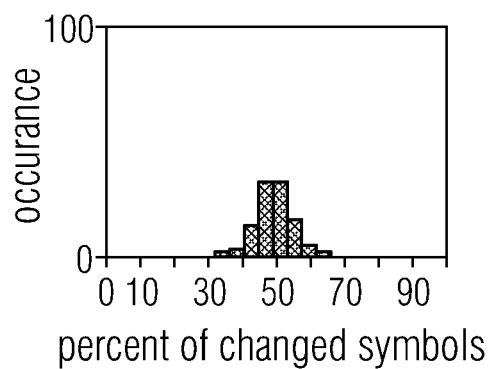

Uniqueness and Reliability: Thus far, uniqueness has not been considered for higher-order alphabets. Hence, to compute the uniqueness based on previous definitions, the aforementioned quantization and bit mapping of symbols may be carried out. The obtained variable-length bit strings are then truncated to the shortest output and the uniqueness computed which results in the plot as shown in FIG. 27b. It is well-centered around 0.5 and indicates a good PUF behavior. The plot includes the result of the reliability at room temperature, too. However, significant differences of embodiments compared to binary-only PUFs, such as the SRAM-PUF, lead to a much better reliability of the quantized data already.

Drilling Attack

Figure 27C:
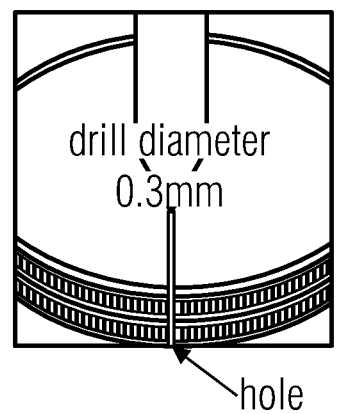
FIG. 27c shows a picture of an example drill attack on an embodiment of the third aspect.
Figure 28:
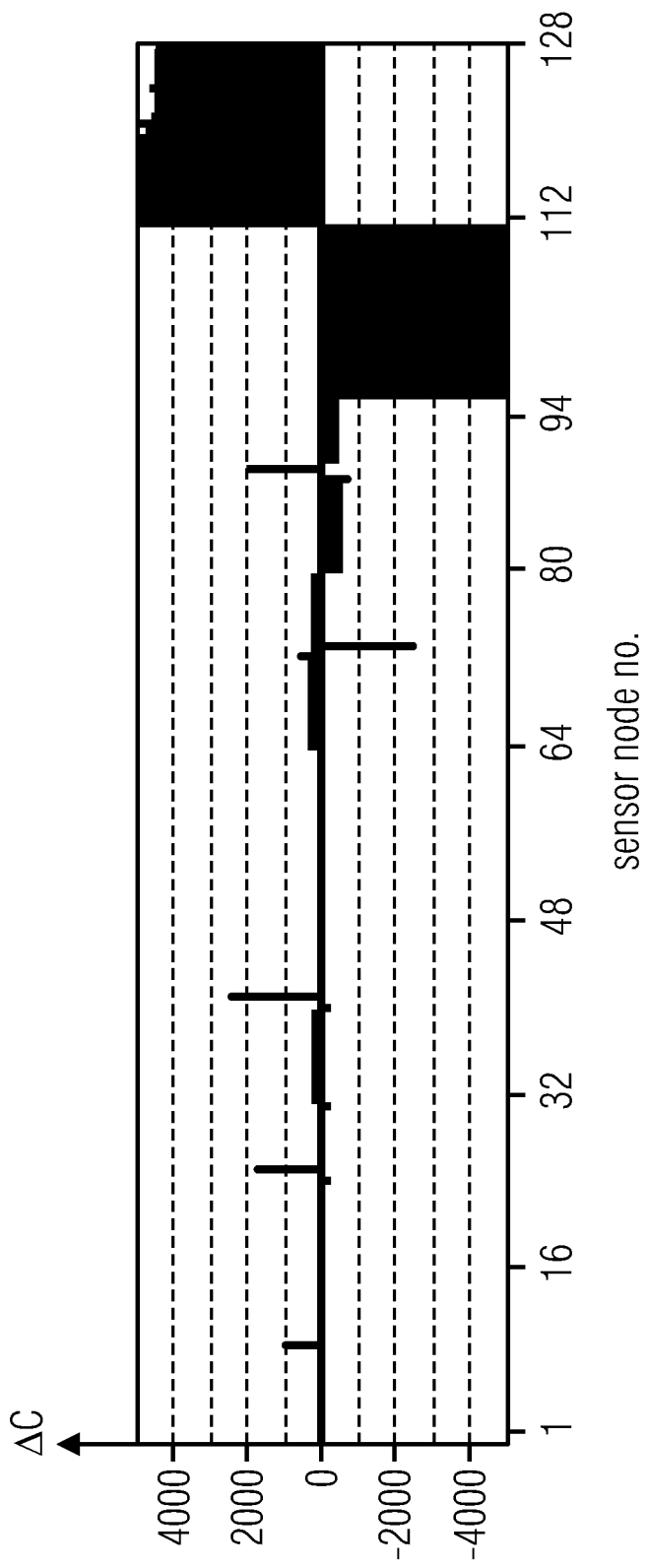
FIG. 28 shows a schematic graph of the change in the differential capacitances measured in the PUF-film after the drill attack of FIG. 27c.

To verify the tamper-evident properties of our enclosure, one of the envelopes was attacked using a 0.3 mm drill as shown in FIG. 27c. As guaranteed by the chosen structure size, one Tx and Rx electrode were destroyed, here, resulting in open-circuits of Tx13 and Rx10. Independent of the PUF-properties, this already allows the system to determine that an attack has taken place. Hence, to study the effects on the PUF, the integrity check first may be disabled. The resulting plot in FIG. 28 shows the difference of the capacitances from before and after the attack. As the Tx pair Tx13 and Tx14 is no longer balanced, a dramatic change for the whole group of nodes is observed. Since Rx10 is destroyed also, it shows up as significant change in all the other Tx groups. As result of the attack, changes occur in the directly neighboring Tx pairs due to the fact that Tx13 can no longer be properly grounded. In total, >32 nodes are observed that shift by ≥1000 points and are therefore considered destroyed, causing 32·2.5 bit=80 bits of entropy to be lost. This loss is not covered by the ECC of the key generation and imposes a significant computational complexity on the attacker.

When taking 16 TX-electrodes and 16 RX-electrodes as an example configuration for a PUF-film, such a capacitive structure may allow for a secure detection of a drilling attack. When taking into account a width of conductive traces of 100 micrometer and a spacing therebetween of 100 micrometer, a drilling attack in the sensoric region leads to the fact that a row/column out of the capacitive matrix is destroyed, as at least one TX-electrode and at least one RX-electrode will be cut. Thus, not only the single overlap region in the matrix will be destroyed but a complete row or column will be destroyed leading to a destruction of in total 23 overlapping regions. 23 is the number resulting from 16 TX-electrodes being differentially evaluated and leading to 8 groups of differentially evaluated TX-groups used to excite 16 RX-electrodes. 31 is, thus, the result of 8 groups plus 16 RX-electrodes-1, wherein -1 considers the overlapping region of column and row so as to avoid double-counting. Larger diameters of drillings lead to more defects allowing for a more easy detection.

c. Thwarting Additional Attacks on a Conceptual Level

The present description at least briefly considers a selection of other attacks and how they have been considered in the design. Hence, some embodiments do not claim full protection against these attacks, instead, they indicate that practically carrying them out would be challenging. Some attacks entail additional countermeasures which are outside the scope of the envelope, e.g., having a sufficiently internally buffered supply to enable zeroization even if an attacker pulls the power during runtime.

Bypassing Tracks: After drilling a hole, an attacker might attempt to repair open circuits. This is impractical for the Tx layer due to its miniscule height and while the Rx layer is more robust, it is covered by the Tx layer which obstructs miniature repairs. Even if broken electrodes could be reconnected, restoring the previous capacitive behavior is hardly feasible due to the small-scale differential capacitance.

Probing Electrodes: An attacker might try to probe electrodes directly to measure their capacitance. This involves access to all electrodes, as properly connecting unused ones is mandatory for the measurement. At the same time, the shield needs to be partially removed at multiple spots, causing the surrounding field to change, thereby falsifying the results. Moreover, even state-of-the-art micro probes [29] add a capacitive load of >20 fF which exceeds the observed variation.

Side-Channel Attacks: Emanations are prevented by the case, shielding, and the supply lines are additionally protected. Moreover, the Tx layer carries only insensitive excitation signals. In contrast, the Rx layer carries sensitive signals in the lower nanoampere range, making it difficult to eavesdrop on them. The measurement itself is otherwise time-constant.

Embodiments of the third aspect present a battery-less tamper-resistant envelope, which contains a fine mesh of electrodes, and its complementary security concept. An evaluation unit checks the integrity of the sensor mesh by detecting short and/or open circuits. Additionally, it measures the capacitances of the mesh. Once its preliminary integrity is confirmed, a cryptographic key may be derived from the capacitive measurements that represent a PUF, to decrypt and authenticate the firmware of the enclosed host system. The battery-less tamper-resistant envelope verifies its integrity, for example, after powering-up similar to a tamper-evident PUF. If the system has not been tampered with, the correct key is derived from the envelope, the system's data is decrypted, and multiple tamper detection (TD) mechanisms start to ensure continuous protection while running. This exceeds known concepts and is a solution towards meeting security standards, such as FIPS 140-2 level 4, without a battery for the security mechanism. To achieve this, embodiments contain an advanced mesh concept to not only detect short and open circuits, but also to measure the capacitances between traces. This may be regarded as a basis to implement the tamper evident PUF and allows for a dual approach with more sensitive integrity checks and secret key derivation. Hence, recovery of the key is only possible from inside the system as long as the envelope as not been tampered with. The challenge in successfully implementing this is, enclosing the PCB in a large-scale physical object while only using small scale intrinsic variations of the PUF-based key derivation to make their extraction by an attacker improbable. Furthermore, a wider range of physical attacks may be taken into account that previously have been outside the scope of battery-backed approaches, as their security mechanism is never powered off. Embodiments provide for several conceptual and practical considerations of such a design, its various components and demonstrate the feasibility thereof. Embodiments of the first, second and third aspect therefore relate to a security architecture based on a hybrid envelope which combines properties of traditional tamper-responding envelopes with PUFs and extends their concept. Furthermore, embodiments relate to a stochastic model of the contained PUF to estimate its entropy and support its design process.

Beside a concept for a PUF-film, the third aspect also relates to protecting a case with a hull. This may include wrapping of a suitable foil, i.e., a PUF-film. Alternatively or in addition the structure described in connection with the second aspect and the third aspect may also be included into the housing of a host system, i.e., according to an embodiment, a housing may comprise the structured circuit layers having the dielectric material there between. In other words, the PUF-film may be a side or a plurality of sides of a housing or may be the complete housing.

Such a case of a host system may comprise a flexible cover or a respective housing construction, having an integrated capacitive matrix of conductive traces. The embodiments may refer to the section of physically securing embedded systems following diverse security standards such as FIPS 140-2, PCI-HSM, common criteria or the like. When compared to known systems needing battery buffering for their surveillance circuits, the present embodiments relate to cases with PUF-structures enabling a battery-less operation of the device.

Embodiments refer to a variation or change of capacitive properties by uncontrollable behavior with respect to their local value and location variations of a composition of the dielectric layer and/or a thickness thereof, e.g., by inserting particles into the dielectric material, because due to manufacturing deviations, sometimes only low variations occur. Embodiments enable to evaluate the variations and to hamper reparability of a damaged structure which would negatively affect the level of protection because, in known systems, the dominant part of the measurement value is a constant value being independent from manufacturing deviations. A property being distinguishable from a capacitive property and which may allow for a unique (one or zero) integrity check is provided. This allows for an unambiguous determination during the manufacturing if the measured variation is based on the manufacturing deviation or if a manufacturing defect occurred. Values to be measured and methods for measuring those values include, in particular a differential capacitive measurement, wherein alternatively or in addition a complex impedance may also be measured as well as other values. Furthermore, the absolute capacitive value may be measured. Known resistance-based foils need a randomization of the layout so as to allow for a suitable level of protection. Such concepts are known for Physical Unclonable Functions.

Embodiments provide for a capacitive foil matrix being coactively evaluable and allowing for an additional detection of short-circuits or cuts of the traces so as to allow for an integrity check. The conductive traces are formed so as to comprise a number of overlaps, wherein the number of overlaps or the equivalent of their overlapping areas and adjacent edges is balanced in the sense of a differential evaluation. Alternatively or in addition, a PUF-foil may comprise a shielding. Materials of the shielding may be metallic or non-metallic, for example, a carbon paste. Alternatively or in addition, embodiments may provide for PUF-films having a layer stack which has, at least in parts, printed materials such as the printed dielectric layer 28. So as to allow for a high variation, different dielectric materials may be included, e.g., granule materials, for example, one, two or more, so as to obtain a high capacitive variation between TX electrodes and RX electrodes. This may be increased by a local varying mixing ratio of the two or more granule materials. I.e., according to embodiments, the dielectric layer comprises at least a first and a second granule material, wherein an average mixing ratio of the first and the second granule material in the dielectric material varies along a lateral direction of the dielectric layer. This positively influences the key generation out of the Physical Unclonable Function by increasing the entropy and further hampers the reparability because an attacker may re-connect electrodes but is unable to re-construct the capacitive behavior of the granule materials dispersed in the dielectric layer.

Embodiments referred to an electrode layout, wherein at the beginning and at the end of an electrode, a further capacitive coupling may be generated, for example by inserting discrete capacitor elements. This allows for a behavior that a disruption of a conductive trace leads to significant differences in the capacitive portion of a measured complex impedance or in the capacitive value itself, because the electrode capacity is no longer balanced.

Even if layouts according to FIG. 8a and/or 9 do not provide for a randomization of the layout, such an additional randomization may be obtained by use of an additional security sensor, i.e., interconnecting circuit 168 so as to physically increase the number of electrodes in the foil artificially. For example, a number of 64 TX electrodes and/or a number of 64 RX electrodes or a higher number may be obtained by using a lower number of pins at the evaluation unit. Those electrodes may be connected with the security sensor and may be combined in one or more levels, for example, pair-wise, wherein this does not prevent to follow the other design rules according to embodiments, for example, the interleaved arrangement of electrodes. For example, this may allow to use 16 pins for each of the TX electrodes and the RX electrodes, wherein this may be achieved by using two interconnecting levels. One or more of those levels may comprise a dynamic programmable pair-wise combination of electrodes so as to allow for a randomization of the layout. This allows for complicating it for the attacker performing a correct association of a position on the PUF-foil to attacked electrode, which hampers the attack additionally.

Embodiments allow implementation of a battery-less technique providing for an effective protection against attackers so as to substitute battery-buffered techniques.

Embodiments of the second and third aspect thus refer to a carrier having circuit structures with a complex impedance and/or an electric capacitance value being evaluable with respect to an integrity in view of short-circuit and/or an open-circuit. PUF-foils according to embodiments may comprise two or more layers of electrodes and/or shielding layers.

A design rule according to embodiments is that traces of a same electrode (conductive trace) are separated from each other by at least different electrode. The PUF-foil wrapped around a casing or the casing carrying the protective concept may be implemented such that the sensoric region covers the device to be protected completely at least once.

According to other embodiments, the device is covered on two sides, for example, an upper side and a lower side or any other different sides, completely.

According to an embodiment, unprotected surfaces may be covered with an additional structure having a complex impedance and/or electrically connecting the sides protected.

A system according to an embodiment may be configured for evaluating or monitoring a correct and untampered blocking or sealing at edges of the apparatus.

Although embodiments described herein refer to electrodes which are accessible at two regions/areas, according to other embodiments, electrodes may be accessible on a more than two regions so as to allow for a higher number of measurement values.

According to embodiments, an apparatus is configured and/or a method is adapted so as to excite a group of electrodes (conductive traces) and analysis a system response on one or more electrodes of a different (disjunctive) group of electrodes. The measurement system for evaluating the structured electrode layers may be part of the protective concept of the housing or may at least be fixedly connected therewith. According to an embodiment, the measurement system, i.e., an apparatus and/or a PUF-film may comprise a configurable interconnecting matrix such that conductive traces may be measured one with another in a random and/or configurable arrangement. Such embodiments are described in connection with the interconnecting circuit 168.

Some embodiments refer to a shielding using a conductive non-metal such as a carbon paste. After wrapping the case with the PUF-film, the shielding layer 62, 62$_1$ and/or 62$_2$ may be covered with a non-metal. A fine mesh of conductive material such as copper may be arranged outside the stack. Alternatively, the obtained stack may be covered by spraying a conductive varnish/lacquer. An order of layers may be changeable, for example the carbon paste and then the conductive material may be arranged or first the shielding may be implemented by the conductive material and afterwards the carbon paste may be arranged. In other words, the shielding may comprise, at least partially, the carbon paste. As carbon paste may comprise a local activity, the conductivity may be enhanced by using a mesh or the like.

A connection of the inner shielding with the housing of the HSM may be obtained by a flexible metal mesh or metal pillow/pad as known from EMC-sealings (electromagnetic compatibility). This may allow for an increased interconnection between the housing and the shielding by use of a low resistance.

Figure 29:
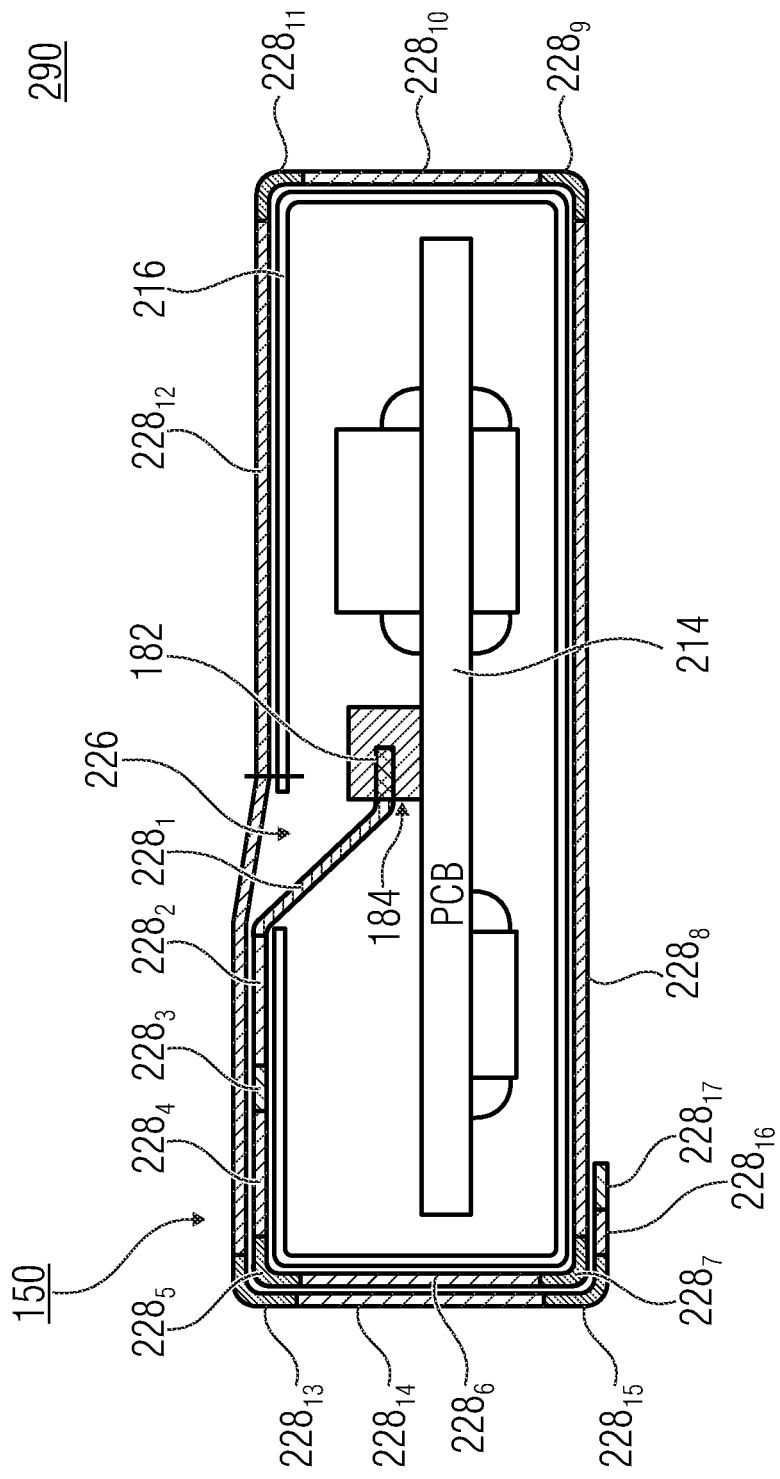
FIG. 29 shows a schematic side view of an apparatus in accordance with the third aspect in which a PUF-film is wrapped around a housing.

FIG. 29 shows a schematic side view of an apparatus 290 in accordance with the third aspect. The apparatus 290 comprises the housing 216 having an opening 226. In the inner of the housing the PCB 214 may be arranged also carrying the evaluation unit 182 being connected to a PUF-film according to an embodiment, e.g., the PUF-film 150 by use of the connector 184. The PUF-foil 150 may comprise different sections 228$_1$ to 228$_{17}$ arranged in a sequential order and allowing for an overlap one to another such that the sensoric region of the PUF-film 150 is present on each location of the housing 216 at least once. At an outermost section 228$_{17}$, an additional adhesive may be arranged so as to hamper or disable the removable of the PUF-film 150.

Figure 30:
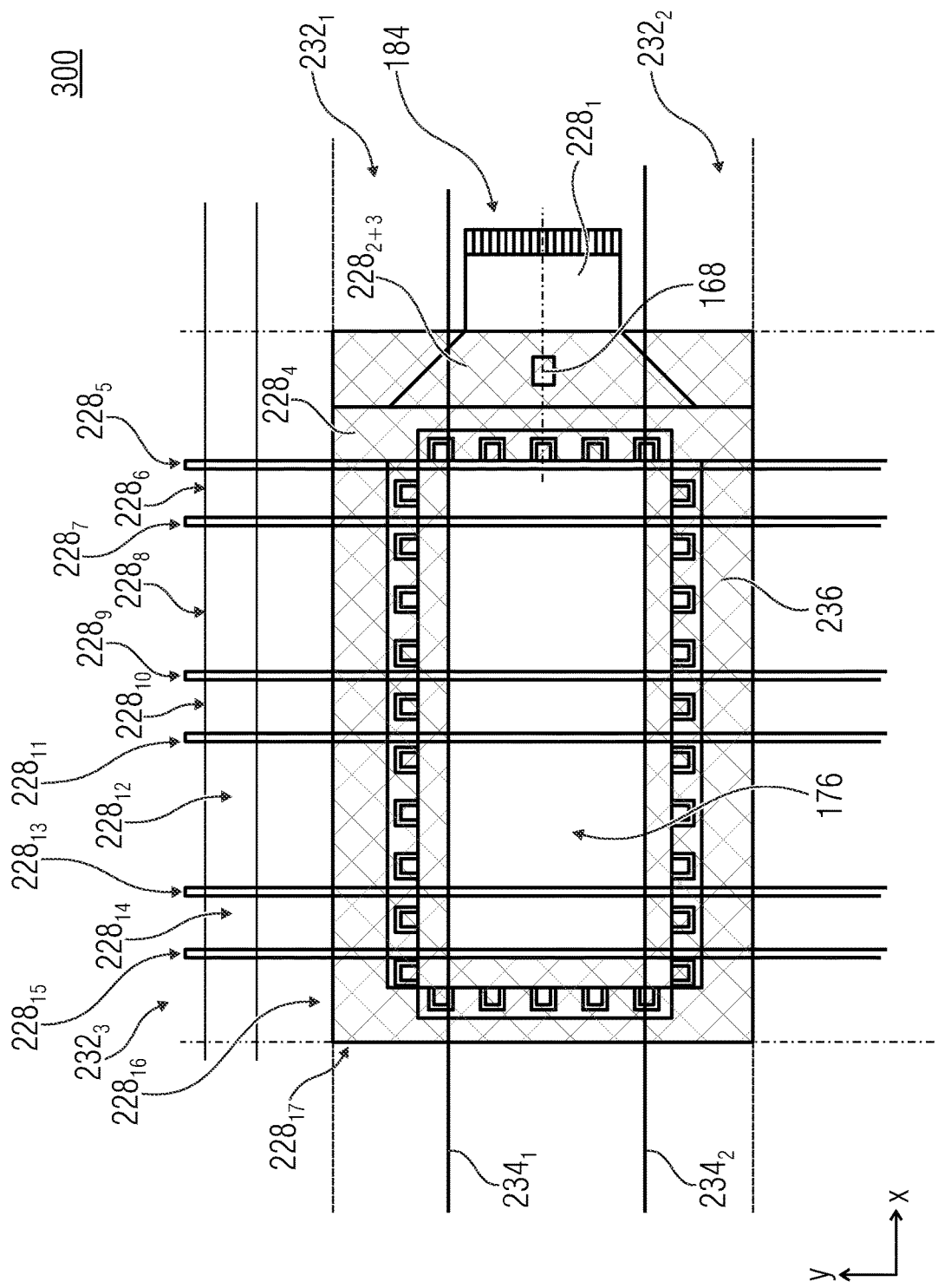
FIG. 30 shows a schematic top view of a PUF-foil according to an embodiment of the third aspect, comprising the functionality of one or more of the other embodiments described herein.

FIG. 30 shows a schematic top view of a PUF-foil 300 according to an embodiment comprising the functionality of one or more of the other embodiments described herein. FIG. 30 is described so as to illustrate the concept of wrapping the PUF-film 300 around a case and insofar corresponds with apparatus 290. Following the connector 184, a first section 228$_1$ is arranged in the PUF-film 300. This section 228$_1$ may be outside the sensoric region and may thus be suitable for carrying or hosting additional circuitries such as the interconnecting circuit 168, sections 228$_5$, 228$_7$, 228$_9$, 228$_{11}$, 228$_{13}$ and 228$_{15}$ may form folding or wrapping edges. Those edges may be arranged in parallel to a first direction y of the PUF-film 300. For covering also the remaining two sides, the PUF-film may be folded or wrapped over perpendicular wrapping lines 234$_1$ and 234$_2$. The sensoric region 176 is enclosed by cross-hatched areas 236.

Following such a concept, the enclosure 216 may completely be protected.

Figure 31:
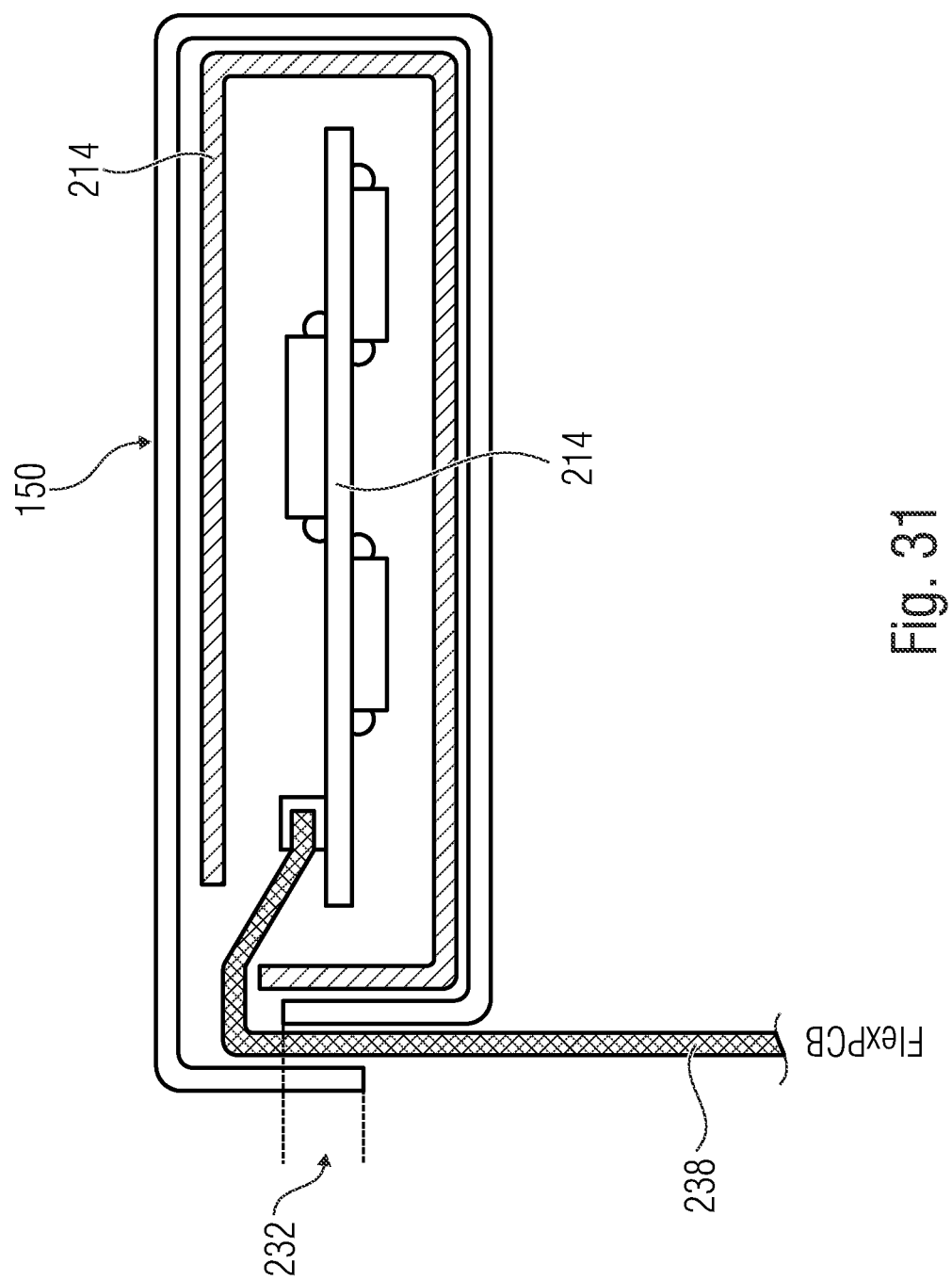
FIG. 31 shows a schematic side view of an apparatus in accordance with the second or third aspect in which the PUF-film is wrapped differently around the housing housing and a special-routed FlexPCB cable provides an interface for the internal board.

FIG. 31 shows a schematic side view of an apparatus 310 in accordance with the second or third aspect in which the PUF-film 150 is wrapped differently around the housing 216. In particular, the overlap 232 is comparatively small so as to allow guiding of wiring 238, e.g., a flexible PCB (Flex PCB) between layers of the PUF-film. So as to avoid bending of the wiring 238 together with an increasing overlap 232, the overlap may also be small. For example, the wiring 238 may be the supply and communication cable 222.

Figure 32:
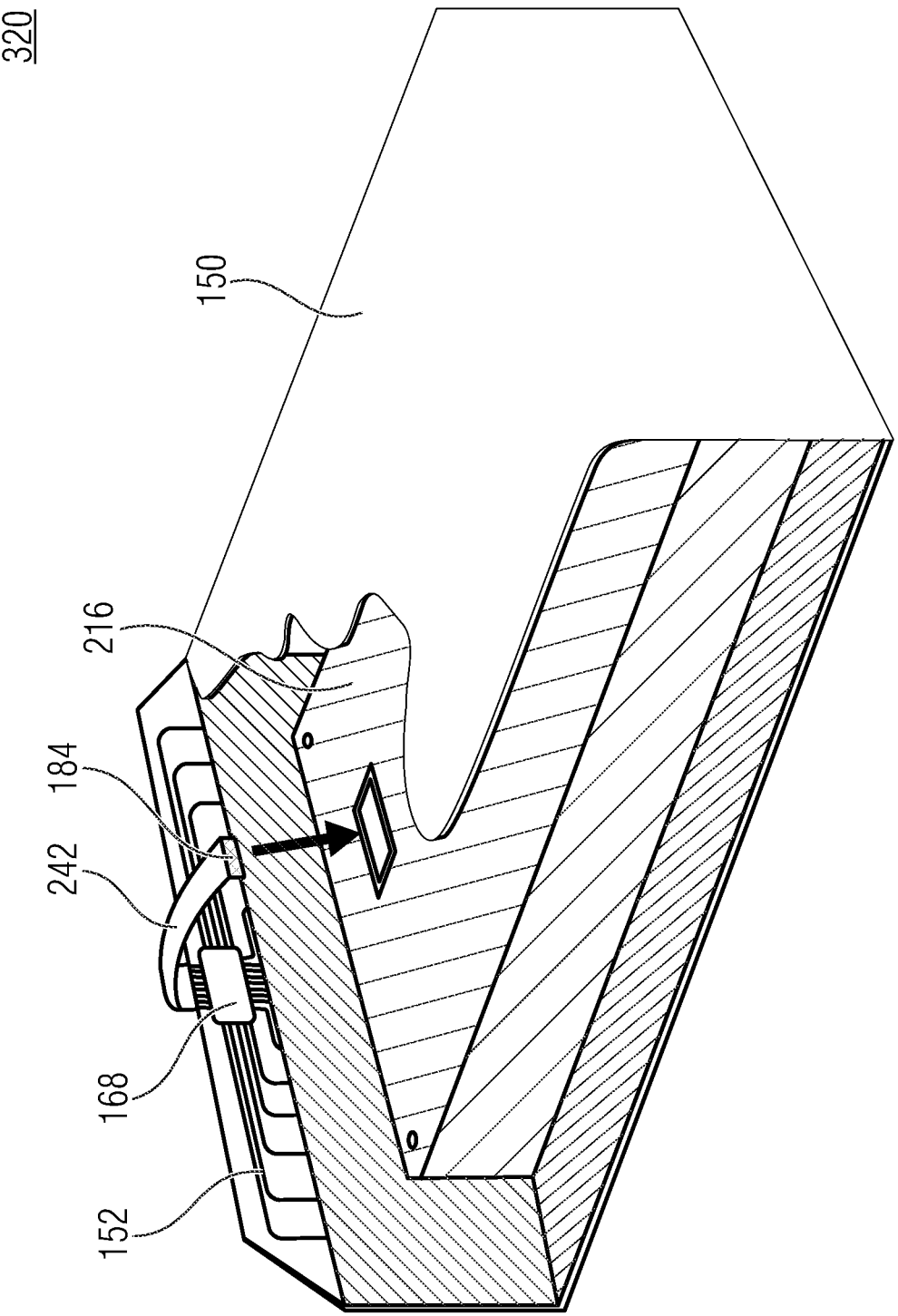
FIG. 32 shows a schematic perspective view of an apparatus according to an embodiment of the second or third aspect, having an interconnecting circuit.

FIG. 32 shows a schematic perspective view of an apparatus 320 according to an embodiment of the second or third aspect. Again, the housing 216 is covered by the PUF-film 150, wherein every other film described herein may be used. The PUF-film 150 comprises, for example, the interconnecting circuit 168 so as to increase a number of conductive traces 152 when compared to a number of traces being controllable at the connector 184. A cable 242 may interconnect the connector 184 with the interconnecting circuit 168. Embodiments of the third aspect allow for detection of a tempering and for a temper-response.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] M. Vai, B. Nahill, J. Kramer, M. Geis, D. Utin, D. Whelihan, and R. Khazan, "Secure architecture for embedded systems," in *IEEE High Performance Extreme Computing Conference (HPEC)*, 2015.

[2] P. Isaacs, T. Morris Jr, M. J. Fisher, and K. Cuthbert, "Tamper Proof, Tamper Evident Encryption Technology." SMTA, 2013.

[3] H. Eren and L. Sandor, "Fringe-Effect Capacitive Proximity Sensors for Tamper Proof Enclosures," in *Sensors for Industry Conference*, 2005, pp. 22-26.

[4] P. Tuyls, G.-J. Schrijen, B. Skoric, J. Van Geloven, N. Verhaegh, and R. Wolters, "Read-proof hardware from protective coatings," in *International Workshop on Cryptographic Hardware and Embedded Systems*. Springer, 2006, pp. 369-383.

[5] L. Wei, C. Song, Y. Liu, J. Zhang, F. Yuan, and Q. Xu, "BoardPUF: Physical unclonable functions for printed circuit board authentication," in *IEEF/ACM International Conference on Computer-Aided Design (ICCAD)*, 2015, pp. 152-158.

[6] S. P. Skorobogatov, "Semi-invasive attacks—A new approach to hardware security analysis," Tech. Rep. UCAM-CL-TR-630, 2005.

[7] S. H. Weingart, "Physical Security Devices for Computer Subsystems: A Survey of Attacks and Defenses," in *CHES*, 2000.

[8] IBM, "IBM 4765 Cryptographic Coprocessor Security Module," 2012.

[9] D. Samyde, S. Skorobogatov, R. Anderson, and J. J. Quisquater, "On a new way to read data from memory," in *First International IEEE Security in Storage Workshop*, 2002. Proceedings., 2002.

[10] C. Herder, M. Yu, F. Koushanfar, and S. Devadas, "Physical Unclonable Functions and Applications," *Proceedings of the IEEE*, vol. 102, 2014.

[11] R. Maes and I. Verbauwhede, "A discussion on the Properties of Physically Unclonable Functions," in *TRUST*, 2010.

[12] C. Helfmeier, D. Nedospasov, C. Tarnovsky, J. S. Krissler, C. Boit, and J.-P. Seifert, "Breaking and entering through the silicon," in *ACM Conference on Computer and Communications Security (CCS)*, 2013.

[13] G. A. Brist, "Design Optimization of Single-Ended and Differential Impedance PCB Transmission Lines," in *PCB West Conference Proceedings*, 2004.

[14] L. K. Baxter, "Capacitive sensors," *Ann Arbor*, vol. 1001, p. 48109, 2000.

[15] D. Merli, D. Schuster, F. Stumpf, and G. Sigi, "Semi-invasive em attack on fpga ro pufs and countermeasures," in *Proceedings of the Workshop on Embedded Systems Security*. ACM, 2011, p. 2.

[16] *THS455J datasheet*, Texas Instruments, 2017.

[17] *LTC6252/LTC6253/LTC6254 datasheet*, Linear Technology Corporation, 2012.

[18] G. Goertzel, "An algorithm for the evaluation of finite trigonometric series," *The American Mathematical Monthly*, vol. 65, no. I, pp. 34-35, 1958.

[19] B. Gassend, D. Clarke, M. v. Dijk, and S. Devadas, "Silicon Physical Random Functions," in *ACM CCS*, 2002.

[20] J. Delvaux, D. Gu, D. Schellekens, and I. Verbauwhede, "Helper data algorithms for PUF-based key generation," *IEEE Transactions on Computer-Aided Design of Integrated Circuits and Systems*, 2015.

[21] P. Tuyls, G.-J. Schrijen, B. Skoric, J. van Geloven, N. Verhaegh, and R. Wolters, "Read-Proof Hardware from Protective Coatings," in *CHES*, ser. LNCS, 2006, vol. 4249.

[22] T. Esbach, W. Fumy, O. Kulikovska, D. Merli, D. Schuster, and F. Stumpf, "A New Security Architecture for Smartcards Utilizing PUFs," in *ISSE Conference*, 2012.

[23] M. Spain, B. Fuller, K. Ingots, and R. Cunningham, "Robust keys from physical unclonable functions," in *IEEE International Symposium on Hardware-Oriented Security and Trust (HOST)*, 2014, pp. 88-92.

[24] M. Vai, B. Nahill, J. Kramer, M. Geis, D. Utin, D. Whelihan, and R. Khazan, "Secure architecture for embedded systems," in *IEEE High Performance Extreme Computing Conference (HPEC)*, 2015.

[25] V. Immler, M. Hennig, L. Kürzinger, and G. Sigl, "Practical Aspects of Quantization and Tamper-Sensitivity for Physically Obfuscated Keys," in *Cryptography and Security in Computing Systems (CS2)*, 2016.

[26] T. M. Cover and J. A. Thomas, *Elements of Information Theory*, 2nd ed. New York: John Wiley & Sons, 2006.

[27] J. Obermaier, V. Immler, M. Hiller, and G. Sigl, "A Measurement System for Capacitive PUF-Based Security Enclosures," in *55th ACM/EDAC/IEEE Design Automation Conference (DAC)*, June 2018.

[28] V. Immler, M. Hiller, Q. Liu, A. Lenz, and A. Wachter-Zeh, "Variable-Length Bit Mapping and Error-Correcting Codes for Higher-Order Alphabet PUFs," in *Security, Privacy, and Applied Cryptography Engineering (SPACE)*, 2017.

[29] GGB Industries Inc., "Picoprobe Model 19C," 2004, available online: www.ggb.com/PdfIndex files/mod18c.pdf, as of Oct. 10, 2016.

What is claimed is:

1. A physically uncloneable function, PUF, film comprising a layer stack, the layer stack comprising: a film substrate, a printed dielectric layer comprising a varying layer thickness in the dielectric layer and a structured electrode layer being arranged at the dielectric layer, wherein the structured electrode layer is influenced with respect to an electric measurement value due to the variable thickness;

wherein the structured electrode layer is a first structured electrode layer, wherein between the film substrate and the dielectric layer at least a part of a second structured electrode layer is arranged, wherein the dielectric layer is printed onto the second structured electrode layer such that the dielectric layer covers the second structured electrode layer in a first region and does not cover the second structured electrode layer in a second region, wherein a material edge of the dielectric layer extends between the first region and the second region, wherein the first structured electrode layer is arranged in the first region and in the second region such that the first structured electrode layer extends over the material edge and is spaced from the second structured electrode layer in the first region by the dielectric layer and is galvanically connected to the second structured electrode layer or arranged in a common plane with the second structured electrode layer in the second region;

wherein the first structured electrode layer and the second structured electrode layer are arranged such that the first structured electrode layer and the second structured electrode layer are connectable in a common connector layer.

2. The PUF-film of claim 1, wherein the second region is enclosed by the first region or is adjacent to the first region and forms an edge region of the first region.

3. The PUF-film of claim 1, wherein the structured electrode layer is a first structured electrode layer, wherein the film substrate comprises a second structured electrode layer comprising a plurality of second conductive traces, wherein a dielectric material of the dielectric layer is printed onto the second structured electrode layer, wherein the first structured electrode layer is arranged such that the first structured electrode layer comprises a plurality of first conductive traces overlapping with the second conductive traces in a plurality of overlapping regions so as to form capacitive elements in the overlapping regions, wherein electric capacitance values of the capacitive elements vary stochastically based on the variation of the thickness of the dielectric layer due to the printing of the dielectric material.

4. The PUF-film claim 1, wherein the electric measurement value comprises one of an electric capacitance value, an electric impedance value, an electric resistance value and an electric inductance value.

5. The PUF-film of claim 1, wherein a relative position of a surface profile of the dielectric layer with respect to the structured electrode layer underlies a stochastic distribution.

6. The PUF-film of claim 1, wherein the dielectric layer comprises at least one granule material, wherein the granule material comprises a different dielectric constant when compared to the dielectric material.

7. The PUF-film of claim 6, wherein the dielectric material provides a polymer matrix for linking particles of the granule material.

8. The PUF-film of claim 1, wherein the structured electrode layer is a first structured electrode layer wherein the film substrate comprises two opposing main sides having a first main side and a second main side and comprises the first structured electrode layer on the first main side and a second structured electrode layer on the second main side wherein the film substrate provides a dielectric layer with respect to the first and second structured electrode layers;

wherein the dielectric layer is printed on the first structured electrode layer.

9. The PUF-film of claim 1, wherein the structured electrode layer is a first structured electrode layer, wherein the film substrate comprises a second structured electrode layer comprising a plurality of second conductive traces, wherein the a dielectric material of the dielectric material is printed onto the second structured electrode layer, wherein the first structured electrode layer is arranged such that the first structured electrode layer comprises a plurality of first conductive traces overlapping with the second conductive traces in a plurality of overlapping regions so as to form capacitive elements in the overlapping regions.

10. The PUF-film of claim 9, wherein the first structured electrode layer is arranged such that at least one of the first conductive traces overlaps with at least two second conductive traces; or such that at least one of the second conductive traces overlaps with at least two first conductive traces.

11. The PUF-film of claim 1, wherein a dielectric material of the dielectric material is a photosensitive material, wherein the photosensitive material is developed in an exposure to form the dielectric material in the exposing region and so as to define a mask of the dielectric material.

12. The PUF-film of claim 1, further comprising:
an electric shield arranged to shield the structured electrode layer.

13. The PUF-film of claim 1, wherein the dielectric material comprises a block-copolymer material.

14. A physically uncloneable function, PUF, film comprising a layer stack, the layer stack comprising: a film substrate, a printed dielectric layer comprising a varying layer thickness in the dielectric layer and a structured electrode layer being arranged at the dielectric layer, wherein the structured electrode layer is influenced with respect to an electric measurement value due to the variable thickness;

wherein the structured electrode layer is a first structured electrode layer, wherein the film substrate comprises a second structured electrode layer comprising a plurality of second conductive traces, wherein the a dielectric material of the dielectric material is printed onto the second structured electrode layer, wherein the first structured electrode layer is arranged such that the first structured electrode layer comprises a plurality of first conductive traces overlapping with the second conductive traces in a plurality of overlapping regions so as to form capacitive elements in the overlapping regions; and wherein the first structured electrode layer is arranged such that at least one of the first conductive traces overlaps with at least two second conductive traces; or such that at least one of the second conductive traces overlaps with at least two first conductive traces.

* * * * *

UNITED STATES PATENT AND TRADEMARK OFFICE
CERTIFICATE OF CORRECTION

PATENT NO. : 11,889,004 B2
APPLICATION NO. : 17/816315
DATED : January 30, 2024
INVENTOR(S) : Martin Koenig It is certified that error appears in the above-identified patent and that said Letters Patent is hereby corrected as shown below:

In the Claims

In Claim 9, Column 62, Line 12, delete "wherein the a dielectric material of the dielectric material" and insert -- wherein a dielectric material of the dielectric layer --

In Claim 14, Column 62, Line 45, delete "wherein the a dielectric material of the dielectric material" and insert -- wherein a dielectric material of the dielectric layer --

Signed and Sealed this
Thirtieth Day of July, 2024

Katherine Kelly Vidal
*Director of the United States Patent and Trademark Office*